United States Patent
Suzuki et al.

(10) Patent No.: US 8,299,193 B2
(45) Date of Patent: *Oct. 30, 2012

(54) FILM OR LAMINATE COMPRISING ETHYLENE-BASED RESIN OR ETHYLENE-BASED RESIN COMPOSITION

(75) Inventors: Masao Suzuki, Ichihara (JP); Yasuo Satoh, Ichihara (JP); Takahiro Akashi, Yokohama (JP); Tsutomu Tasaki, Chiba (JP); Shinya Matsubara, Ichihara (JP); Hideki Bando, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 179 days.

This patent is subject to a terminal disclaimer.

(21) Appl. No.: 12/309,598

(22) PCT Filed: Jul. 31, 2007

(86) PCT No.: PCT/JP2007/065014
§ 371 (c)(1),
(2), (4) Date: Jan. 23, 2009

(87) PCT Pub. No.: WO2008/016059
PCT Pub. Date: Feb. 7, 2008

(65) Prior Publication Data
US 2009/0291285 A1 Nov. 26, 2009

(30) Foreign Application Priority Data

Jul. 31, 2006 (JP) .................. 2006-209238
Jul. 31, 2006 (JP) .................. 2006-209290
Jul. 31, 2006 (JP) .................. 2006-209301
Jul. 31, 2006 (JP) .................. 2006-209304

(51) Int. Cl.
C08F 210/16 (2006.01)
B32B 27/32 (2006.01)
C08J 5/18 (2006.01)

(52) U.S. Cl. .................. 526/348.6; 526/348.1; 428/461; 428/500; 428/513; 428/516; 428/476.1; 428/476.9; 428/483

(58) Field of Classification Search ............... 526/348.1, 526/348.6; 428/461, 500, 513, 516
See application file for complete search history.

(56) References Cited

U.S. PATENT DOCUMENTS

| | | | |
|---|---|---|---|
| 5,741,861 A | 4/1998 | Yamamoto et al. | |
| 5,798,427 A | 8/1998 | Foster et al. | |
| 5,883,205 A | 3/1999 | Tsutsui et al. | |
| 5,916,988 A | 6/1999 | Tsutsui et al. | |
| 6,894,120 B2 | 5/2005 | Takahashi et al. | |
| 7,208,559 B2 | 4/2007 | Satoh et al. | |
| 7,452,946 B2 | 11/2008 | Matsuura et al. | |
| 7,858,723 B2 * | 12/2010 | Satoh et al. | 526/352 |
| 2003/0091849 A1 * | 5/2003 | Tavernier | 428/515 |
| 2006/0199925 A1 * | 9/2006 | Matsuura et al. | 526/114 |
| 2008/0090983 A1 * | 4/2008 | Satoh et al. | 526/348.2 |

FOREIGN PATENT DOCUMENTS

| | | |
|---|---|---|
| CN | 1110662 A | 10/1995 |
| CN | 1791619 A | 6/2006 |
| JP | 2-276807 | 11/1990 |
| JP | 4-213309 | 8/1992 |
| JP | 6-65443 | 3/1994 |
| JP | 7-26079 | 1/1995 |
| JP | 7-145202 | 6/1995 |
| JP | 8-311260 | 11/1996 |
| JP | 2004-217924 | 8/2004 |
| JP | 2005-281542 A | 10/2005 |
| JP | 2006-008836 A | 1/2006 |
| JP | 2006-233208 | 9/2006 |
| WO | WO 93/08221 | 4/1993 |
| WO | WO 2004/104055 A1 * | 12/2004 |
| WO | WO 2006/080578 A1 * | 8/2006 |

OTHER PUBLICATIONS

Hawley's Condensed Chemical Dictionary, 13th Edition, 1997, p. 500.*
Search Report and Written Opinion mailed Dec. 22, 2009 received in Singapore Patent Application No. 200900617-2.
Chinese Office Action mailing date of Jun. 23, 2010 for Chinese Application No. 200780027625.5.
JP Office Action in JP Appln No. 2006-209301 dated May 22, 2012.
JP Office Action in JP Appln No. 2006-209304 dated May 22, 2012.

* cited by examiner

*Primary Examiner* — Roberto Rabago
(74) *Attorney, Agent, or Firm* — Foley & Lardner LLP

(57) ABSTRACT

The present invention provides a film including, in at least a part thereof, a layer comprising an ethylene-based resin, which is a copolymer of ethylene and an α-olefin of 4 to 10 carbon atoms, and satisfies the following requirements (1) to (5) at the same time or an ethylene-based resin composition containing the resin;

(I) the melt flow rate at 190° C. under a load of 2.16 kg is in the range of 0.1 to 50 g/10 min, (II) the density is in the range of 875 to 970 kg/m$^3$, (III) the ratio of a melt tension at 190° C. to a shear viscosity at 200° C. and an angular velocity of 1.0 rad/sec is in the range of $1.00 \times 10^{-4}$ to $9.00 \times 10^{-4}$, (IV) the sum of the number of methyl branches and the number of ethyl branches, each number being based on 1000 carbon atoms and measured by $^{13}$C-NMR, is not more than 1.8, and (V) the zero shear viscosity [$\eta_0(P)$] at 200° C. and the weight-average molecular weight (Mw) as measured by a GPC-viscosity detector method (GPC-VISCO) satisfy the following relational formula (Eq-1):

$$0.01 \times 10^{-13} \times Mw^{3.4} \leq \eta_0 \leq 4.5 \times 10^{-13} \times Mw^{3.4} \quad \text{(Eq-1)}.$$

12 Claims, 1 Drawing Sheet

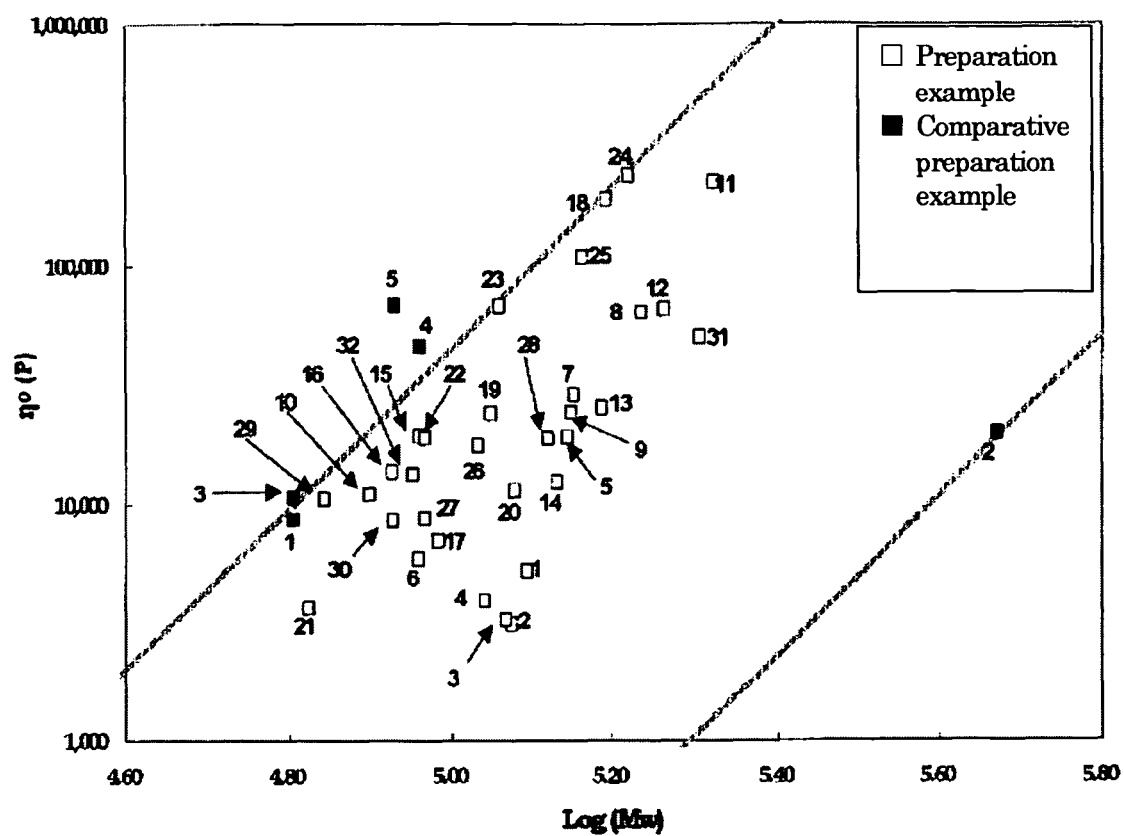

FILM OR LAMINATE COMPRISING ETHYLENE-BASED RESIN OR ETHYLENE-BASED RESIN COMPOSITION

TECHNICAL FIELD

The present invention relates to a film including, in at least a part thereof, a layer comprising an ethylene-based resin or an ethylene-based resin composition containing the resin, and a laminate having a layer comprising an ethylene-based resin or an ethylene-based resin composition containing the resin and a layer other than a layer comprising an olefin-based resin.

BACKGROUND ART

Ethylene-based resins have been molded by various molding processes and applied to various uses. Depending upon these molding processes and uses, properties required for the ethylene-based resins vary. For example, in the case of production of a cast film by T-die molding, there occurs neck-in that the edge of a film shrinks in the central direction. In order to reduce the neck-in to the minimum, an ethylene-based resin having a high melt tension for its molecular weight must be selected. In order to prevent sag or break in blow molding or in order to prevent vibration or break of a bubble in an inflation film, the same properties as above are necessary.

Further, it is known that in the case of production of a cast film by T-die molding, regular variation in thickness, which is called "take-off surge" (sometimes called "draw resonance") and occurs in the take-off direction of a film, is brought about.

In order to solve such problems, a composition of an ethylene-based polymer obtained by the use of a metallocene catalyst and high-pressure low-density polyethylene (patent documents 1 and 2), and an ethylene-1-based polymer prepared by the use of a specific catalyst (patent documents 3 to 6) have been proposed, but it is difficult to efficiently obtain ethylene-based resins excellent not only in molding properties, such as stability of a bubble in the inflating molding and neck-in/take-off surge or low extrusion load in the T-die molding, but also in mechanical strength.

The present inventors have earnestly studied under such circumstances as mentioned above, and as a result, they have found that an ethylene-based resin having specific molecular structure and specific melt properties and an ethylene-based resin composition containing the resin are excellent in molding properties, such as stability of a bubble in the inflating molding and neck-in/take-off surge or low extrusion load in the T-die molding. The present inventors have also found that such an ethylene-based resin and such an ethylene-based resin composition containing the resin are excellent in sealing property and adhesion property to other resins, metals, papers, etc., and that a film obtained therefrom is excellent in mechanical strength and has properties such as low odor property and easy tear property. Thus, the present inventors have achieved the present invention.

Patent document 1: Japanese Patent Laid-Open Publication No. 65443/1994
Patent document 2: Japanese Patent Laid-Open Publication No. 26079/1995
Patent document 3: Japanese Patent Laid-Open Publication No. 276807/1990
Patent document 4: Japanese Patent Laid-Open Publication No. 213309/1992
Patent document 5: pamphlet of International Patent Publication No. 93/08221
Patent document 6: Japanese Patent Laid-Open Publication No. 311260/1996

DISCLOSURE OF THE INVENTION

Problem to be Solved by the Invention

It is an object of the present invention to provide a single-layer or multilayer film excellent in any one of sealing property, adhesion property to other ethylene-based resins, mechanical strength, low odor property and easy tear property.

It is another object of the present invention to provide a laminate excellent in any one of sealing property and adhesion property to other resins, metals, papers and the like.

Means to Solve the Problems

The film according to the present invention includes, in at least a part thereof, a layer comprising an ethylene-based resin (R), which is a copolymer of ethylene and an α-olefin of 4 to 10 carbon atoms and satisfies the following requirements (1) to (5) at the same time or an ethylene-based resin composition (R') containing the resin (R);

(1) the melt flow rate (MFR) at 190° C. under a load of 2.16 kg is in the range of 0.1 to 50 g/10 min, (2) the density (d) is in the range of 875 to 970 kg/m$^3$, (3) the ratio [MT/η*(g/P)] of a melt tension [MT(g)] at 190° C. to a shear viscosity [η*(P)] at 200° C. and at an angular velocity of 1.0 rad/sec is in the range of $1.00 \times 10^{-4}$ to $9.00 \times 10^{-4}$, (4) the sum [(M+E)(/1000C)] of the number of methyl branches [M(/1000C)] and the number of ethyl branches [E(/1000C)], each number being based on 1000 carbon atoms and measured by $^{13}$C-NMR, is not more than 1.8, and (5) the zero shear viscosity [η$_0$(P)] at 200° C. and the weight-average molecular weight (Mw) as measured by a GPC-viscosity detector method (GPC-VISCO) satisfy the following relational formula (Eq-1):

$$0.01 \times 10^{-13} \times Mw^{3.4} \leq \eta_0 \leq 4.5 \times 10^{-13} \times Mw^{3.4} \quad \text{(Eq-1)}$$

The film of the invention is, for example, a film wherein on one surface of the layer comprising the ethylene-based resin (R) or the resin composition (R') is laminated an ethylene-based resin (P1) that is different from the ethylene-based resin (R) or the resin composition (R'), or a film wherein on one surface of the layer comprising the ethylene-based resin (R) or the resin composition (R') is laminated an ethylene-based resin (P1) that is different from the ethylene-based resin (R) or the resin composition (R'), and on the other surface is laminated an ethylene-based resin (P2) that is different from the ethylene-based resin (R) or the resin composition (R') ((P1) and (P2) may be the same or different).

As uses of the film of the invention, there are a film for a sealant, a surface protective film, a low-odor film for food packaging, an easy-tear film, a thick film for heavy-duty packaging or agriculture use having a thickness of not less than 60 μm, a film wherein the layer comprising the ethylene-based resin (R) or the resin composition (R') is an adhesive layer for a surface protective film, etc.

The laminate according to the present invention is a laminate obtained by laminating a layer selected from a paper in the form of a sheet, an engineering plastic layer and an aluminum layer on one surface of a layer comprising the ethylene-based resin (R) or the resin composition (R') through an anchor coating agent, and if necessary, laminating a layer of an ethylene-based resin (P3) that is different from the ethylene-based resin (R) or the resin composition (R') on the other surface, or a laminate obtained by laminating a layer selected from a paper in the form of a sheet, an engineering plastic layer and an aluminum layer on one surface of an ethylene-based resin (P3) that is different from the ethylene-based resin (R) or the resin composition (R') through an anchor coating agent and laminating a layer comprising the ethylene-based resin (R) or the resin composition (R') on the other surface.

In the present invention, the laminate means a laminate including a layer comprising an ethylene-based resin or a resin composition and a layer comprising other than an olefin-based resin.

As uses of the laminate of the invention, there are a liquid packaging material, a packaging material for viscous substance, a laminated paper, an adhesive tape, etc.

Effect of the Invention

For example, the film of the present invention is, excellent in heat-sealing strength as use for a sealant film; excellent in mechanical strength, and there is no fear of exerting an evil influence on the taste of the contained food as a use for a low-odor film for food packaging; excellent in balance of tear strengths in the MD direction and the TD direction as a use for an easy-tear film; and excellent in mechanical strength as a use for heavy-duty packing or agriculture.

For example, the laminate of the present invention is excellent in bag breaking strength and sealing strength as a use for packaging material for liquid/viscous substance; and is excellent in adhesion between the layer comprising the ethylene-based resin (R) or the ethylene-based resin composition (R') and the paper base as a use for a laminated paper.

BRIEF DESCRIPTION OF THE DRAWING

FIG. 1 is a FIGURE in which the weight-average molecular weights (Mw) and the zero shear strengths ($\eta_0$) of the ethylene-based resins disclosed in Preparation Examples 1 to 32 and all the comparative preparation examples are plotted. In the FIGURE, white squares indicate preparation examples, and black squares indicate comparative preparation examples. Number symbols in the FIGURE indicate preparation example numbers or comparative preparation examples numbers. Two straight lines in the FIGURE are borderlines indicating the upper and the lower limits of the parametric formula.

BEST MODE FOR CARRYING OUT THE INVENTION

The film and the laminate according to the present invention are described in detail hereinafter.

The film and the laminate of the invention include, in at least a part thereof, a layer comprising the following ethylene-based resin (R) or the ethylene-based resin composition (R') containing the resin (R).

Ethylene-based Resin (R)

First, the ethylene-based resin (R) for use in the invention is described in detail.

Although the ethylene-based resin (R) may be composed of only one kind of an ethylene-based polymer or may be composed of two or more kinds of ethylene-based polymers, this resin is characterized by necessarily satisfying all of the following requirements (1) to (5). When the ethylene-based resin (R) is composed of only one kind of an ethylene-based polymer, the ethylene-based polymer (R1) is efficiently prepared by the later-described polymerization process. When the ethylene-based resin (R) is composed of two or more kinds of ethylene-based polymers, the ethylene-based polymer (R1) and an ethylene-based polymer (R2) other than the polymer (R1) are preferably contained, and the ethylene-based polymer (R2) is, for example, a copolymer of ethylene and an α-olefin having 4 to 10 carbon atoms obtained by the use of a metallocene catalyst or a Ziegler catalyst or high-pressure-processed low-density polyethylene prepared by a high-pressure radical polymerization process. When the ethylene-based resin is composed of two or more kinds of ethylene-based polymers, the compositional ratio between the ethylene-based polymer (R1) and the ethylene-based polymer (R2) and the type of the ethylene-based polymer (R2) are not specifically restricted so long as blending of (R1) with (R2) is feasible and the blended resin satisfies the requirements (1) to (5) at the same time. Whether blending is carried out or not is a matter properly determined by a person skilled in the art according to the use to which the ethylene-based resin (R) or the ethylene-based resin composition (R') of the invention is applied. In usual, the ethylene-based resin (R) is composed of only the ethylene-based polymer (R1) from the viewpoint that a step of blending or the like can be omitted. However, it is a matter arbitrarily determined according to the use application that high-pressure-processed low-density polyethylene is blended as the ethylene-based polymer (R2) in order to emphasize an effect of, for example, the requirement (3) of the requirements which the ethylene-based polymer (R1) should satisfy, or that a specific ethylene-based polymer (R2) is used in combination to form a blend in the case where novel property that is not inherent in the ethylene-based polymer (R1) is desired to be imparted. When the ethylene-based polymer (R2) is blended, the compositional ratio of the ethylene-based polymer (R1) in the ethylene-based resin (R) is set to be usually not more than 99% by weight, preferably not more than 70% by weight, more preferably not more than 30% by weight.

The ethylene-based resin (R) is characterized by satisfying the aforesaid requirements (1) to (5) at the same time. These requirements (1) to (5) are described below in detail.

Requirement (1)

The melt flow rate (MFR) of the ethylene-based resin (R) at 190° C. under a load of 2.16 kg is in the range of 0.1 to 50 g/10 min, preferably 1.0 to 50 g/10 min, more preferably 3.0 to 30. When the MFR is not less than 0.1 g/10 min, shear viscosity of the ethylene-based resin (R) is not too high, so that the resin is excellent in molding properties, and when the resin is molded into, for example, a film, its appearance is excellent. When the MFR is not more than 50 g/10 min, tensile strength and heat-sealing strength of the ethylene-based resin (R) are excellent. The MFR is a value measured under the conditions of a temperature of 190° C. and a load of 2.16 kg in accordance with ASTM D1238-89.

In general, MFR strongly depends upon the molecular weight. That is to say, as the MFR is decreased, the molecular weight is increased, and as the MFR is increased, the molecular weight is decreased. It is known that the molecular weight of the ethylene-based resin (R) is determined by a compositional ratio of hydrogen to ethylene (hydrogen/ethylene) in the polymerization system for preparing an ethylene-based polymer constituting the ethylene-based resin (e.g., Kazuo Soga, KODANSHA "CATALYTIC OLEFIN POLYMERIZATION", P. 376 (1990)). On this account, by increasing or decreasing the hydrogen/ethylene ratio, it becomes possible to prepare the ethylene-based resin (R) having MFR of the above range.

Requirement (2)

The density (d) of the ethylene-based resin (R) is in the range of 875 to 970 kg/m$^3$, preferably 877 to 965 kg/m$^3$, more preferably 880 to 960 kg/m$^3$. The density (d) is a value of a test sample that is measured by a density gradient tube after the sample is heat-treated at 120° C. for 1 hour and then linearly slowly cooled down to room temperature over a period of 1 hour.

When the density (d) is not less than 875 kg/m$^3$, heat resistance of the ethylene-based resin (R) is excellent, and a film formed from the ethylene-based resin (R) has low surface stickiness. On the other hand, when the density (d) is not more than 970 kg/m$^3$, low-temperature heat-sealing property of the ethylene-based resin (R) is excellent.

In general, density depends upon the $\alpha$-olefin content in the ethylene-based polymer. As the $\alpha$-olefin content is decreased, the density becomes higher, and as the $\alpha$-olefin content is increased, the density becomes lower. It is known that the $\alpha$-olefin content in the ethylene-based polymer is determined by a compositional ratio of an $\alpha$-olefin to ethylene ($\alpha$-olefin/ethylene) in the polymerization system (e.g., Walter Kaminsky, Makromol. Chem. 193, P. 606 (1992)). On this account, by increasing or decreasing the $\alpha$-olefin/ethylene ratio in the preparation of an ethylene-based polymer constituting the ethylene-based resin (R), it becomes possible to control the density of the polymer, and by the use of such a control method, it becomes possible to prepare the ethylene-based resin (R) having a density of the above range.

Requirement (3)

The ratio [MT/$\eta$*(g/P)] of a melt tension [MT(g)] of the ethylene-based resin (R) at 190° C. to a shear viscosity [$\eta$* (P)] thereof at 200° C. and at an angular velocity of 1.0 rad/sec is in the range of $1.00\times10^{-4}$ to $9.00\times10^{-4}$, preferably $2.00\times10^{-4}$ to $7.00\times10^{-4}$, more preferably $2.60\times10^{-4}$ to $5.00\times10^{-4}$. The ethylene-based resin having MT/$\eta$* of not less than $1.00\times10^{-4}$ is excellent in neck-in.

By the preparation under the conditions described in the later-described Preparation Example 31, an ethylene-based polymer having MT/$\eta$* in the vicinity of the lower limit of the above range can be obtained, and by the preparation under the conditions described in Preparation Example 19, an ethylene-based polymer having MT/$\eta$* in the vicinity of the upper limit of the above range can be obtained.

In the present invention, the melt tension (MT) was determined by measuring a stress given when a molten polymer is extended at a given rate. In the measurement, an MT measuring machine manufactured by Toyo Seiki Seisaku-sho, Ltd. was used. The measurement was carried out under the measuring conditions of a resin temperature of 190° C., a melting time of 6 minutes, a barrel diameter of 9.55 mm, an extrusion rate of 15 mm/min, a take-up rate of 24 m/min (when a molten filament is broken, the take-up rate is decreased by 5 m/min each time), a nozzle diameter of 2.095 mm and a nozzle length of 8 mm.

The shear viscosity ($\eta$*) at 200° C. and at an angular velocity of 1.0 rad/sec was determined by measuring an angular velocity [$\omega$ (rad/sec)] variance of a shear viscosity (i*) in the range of $0.02512 \leq \omega \leq 100$ at a measuring temperature of 200° C. In the measurement, a dynamic stress rheometer SR-5000 manufactured by Rheometric Scientific, Inc. was used. As a sample holder, a parallel plate having a diameter of 25 mm was used, and the thickness of the sample was set to about 2.0 mm. As the points of measurements, 5 points were set based on one FIGURE of $\omega$. The strain was properly selected from the range of 3 to 10% so that the torque in the measuring range would be detectable and torque-over should not be brought about. The sample used in the shear viscosity measurement was prepared by press molding a test sample to a thickness of 2 mm by the use of a press molding machine manufactured by Shinto Metal Industries Corporation under the conditions of a preheating temperature of 190° C., a preheating time of 5 minutes, a heating temperature of 190° C., a heating time of 2 minutes, a heating pressure of 100 kg/cm$^2$, a cooling temperature of 20° C., a cooling time of 5 minutes and a cooling pressure of 100 gk/cm$^2$.

Requirement (4)

The sum [(M+E)(/1000C)] of the number of methyl branches [M(/1000C)] and the number of ethyl branches [E(/1000C)] of the ethylene-based resin (R), each number being measured by $^{13}$C-NMR, is not more than 1.8, preferably not more than 1.3, more preferably not more than 0.8, particularly preferably not more than 0.5. In the present invention, the number of methyl branches and the number of ethyl branches are each defined as a number based on 1000 carbon atoms, as described later.

It is known that if short-chain branches such as methyl branches and ethyl branches are present in an ethylene-based resin, the short-chain branches are incorporated into a crystal to widen lattice spacing of the crystal, and therefore, mechanical strength of the resin is lowered (e.g., Zenjiro Osawa, et al., "Kobunshi no jumyo yosoku to chojuka gijutsu" (Estimation of Polymer Life and Technique for Life Extension), p. 481, N.T.S. (2002)). On that account, when the sum (M+E) of the number of methyl branches and the number of ethyl branches is not more than 1.8, mechanical strength of the resulting ethylene-based resin becomes excellent.

The number of methyl branches and the number of ethyl branches in the ethylene-based resin strongly depend upon the polymerization process for preparing an ethylene-based polymer constituting the ethylene-based resin, and the number of methyl branches and the number of ethyl branches in an ethylene-based polymer obtained by high-pressure radical polymerization are larger than those in an ethylene-based polymer obtained by coordination polymerization using a Ziegler catalyst system. In the case of coordination polymerization, the number of methyl branches and the number of ethyl branches in the ethylene-based polymer strongly depend upon a compositional ratio of propylene or 1-butene to ethylene (propylene/ethylene, 1-butene/ethylene). On this account, by increasing or decreasing the 1-butene/ethylene ratio, it becomes possible to prepare the ethylene-based resin having the sum (M+E) of the number of methyl branches and the number of ethyl branches in the above range.

The number of methyl branches and the number of ethyl branches measured by $^{13}$C-NMR are determined in the following manner. In the measurement, an ECP500 model nuclear magnetic resonance apparatus ($^1$H, 500 MHz) manufactured by JEOL Ltd. was used, and the number of integration times was 10,000 to 30,000. As a chemical shift reference, a main chain methylene peak (29.97 ppm) was used. The measurement was carried out by introducing 250 to 400 mg of a sample and 3 ml of a mixed liquid of special grade o-dichlorobenzene available from Wako Pure Chemical Industries, Ltd. and benzene-d$_6$ available from ISOTEC Co., Ltd. (o-dichlorobenzene:benzene-d$_6$=5:1, by volume) into a commercially available NMR measuring quartz glass tube having a diameter of 10 mm, then heating them at 120° C. and homogeneously dispersing them. Assignment of each absorption in the NMR spectrum was carried out in accordance with "Kagaku Ryoiki Zokan No. 141, NMR-Sosetsu to jikken gaido [I] (Chemical Region Extra Issue No. 141, NMR-Review and Experimental Guide [I]), pp. 132-133". The number of methyl branches based on 1,000 carbon atoms was calculated from a ratio of the integrated intensity of absorption (19.9 ppm) of methyl group derived from methyl branch to the integral sum total of absorptions appearing in the range of 5 to 45 ppm. The number of ethyl branches based on 1,000 carbon atoms was calculated from a ratio of the integrated intensity of absorption (10.8 ppm) of ethyl group derived from ethyl branch to the integral sum total of absorptions appearing in the range of 5 to 45 ppm.

Requirement (5)

The zero shear viscosity [$\eta_0(P)$] of the ethylene-based resin (R) at 200° C. and the weight-average molecular weight (Mw) thereof as measured by a GPC-viscosity detector method (GPC-VISCO) satisfy the following relational formula (Eq-1).

$$0.01\times10^{-13}\times Mw^{3.4} \leq \eta_0 \leq 4.5\times10^{-13}\times Mw^{3.4} \quad \text{(Eq-1)}$$

Preferably, they satisfy the following relational formula (Eq-2).

$$0.05\times10^{-13}\times Mw^{3.4} \leq \eta_0 \leq 4.5\times10^{-13}\times Mw^{3.4} \quad \text{(Eq-2)}$$

More preferably, they satisfy the following relational formula (Eq-3).

$$0.10\times10^{-13}\times Mw^{3.4} \leq \eta_0 \leq 3.5\times10^{-13}\times Mw^{3.4} \quad \text{(Eq-3)}$$

Particularly preferably, they satisfy the following relational formula (Eq-4).

$$0.15\times10^{-13}\times Mw^{3.4} \leq \eta_0 \leq 1.8\times10^{-13}\times Mw^{3.4} \quad \text{(Eq-4)}$$

It is known that when the zero shear viscosity [$\eta_0(P)$] is log-log plotted against the weight-average molecular weight (Mw), a resin whose elongation viscosity does not show strain curability, such as a linear ethylene-based polymer having no long-chain branch, conforms to a power rule with a slope of 3.4, while a resin whose elongation viscosity shows strain rate curability, such as high-pressure-processed low-density polyethylene, exhibits a zero shear viscosity [$\eta_0(P)$] that is lower than the rule (C. Gabriel, H. Munstedt, J. Rheol., 47(3), 619 (2003)). When the zero shear viscosity [$\eta_0(P)$] at 200° C. is not more than $4.5\times10^{-13}\times Mw^{3.4}$, the elongation viscosity of the resulting ethylene-based polymer shows strain rate hardening, and therefore, take-off surge does not occur.

That the ethylene-based resin (R) satisfies the above relational formula (Eq-1') and that when $\eta_0$ and Mw of the ethylene-based resin (R) are log-log plotted, log($\eta_0$) and log Mw are present in the region defined by the following relational formula (Eq-1') have the same meanings as each other.

$$3.4 \text{ Log}(Mw)-15.000 \leq \text{Log}(\eta_0) \leq 3.4 \text{ Log}(Mw)-12.3468 \quad \text{(Eq-1')}$$

FIG. 1 is a FIGURE in which log($\eta_0$) and log Mw of all the ethylene-based resins described in the later-described preparation examples are plotted. By the preparation under the conditions described in the later-described Preparation Example 2, an ethylene-based resin wherein the relationship between the zero shear viscosity [$\eta_0(P)$] and the weight-average molecular weight (Mw) defined by the above parametric inequality (Eq-1) is close to the borderline defined by the following formula (Eq-1") of the parametric inequalities (Eq-1') can be obtained. On the other hand, by the preparation under the conditions described in the Preparation Example 29, an ethylene-based resin wherein the relationship therebetween is close to the borderline defined by the following formula (Eq-1''') of the parametric inequalities (Eq-1') can be obtained.

$$\text{Log}(\eta_0)=3.4 \text{ Log}(Mw)-15.0000 \quad \text{(Eq-1'')}$$

$$\text{Log}(\eta_0)=3.4 \text{ Log}(Mw)-12.3468 \quad \text{(Eq-1''')}$$

The zero shear viscosity [$\eta_0(P)$] at 200° C. was determined in the following manner. An angular velocity ($\omega$ (rad/sec)) variance of a shear viscosity ($\eta^*$) at a measuring temperature of 200° C. was measured in the range of $0.02512 \leq \omega \leq 100$. In the measurement, a dynamic stress rheometer SR-5000 manufactured by Rheometric Scientific, Inc. was used. As a sample holder, a parallel plate having a diameter of 25 mm was used, and the sample was prepared with a thickness of about 2.0 mm. As the points of measurements, 5 points were set based on one order of magnitude of $\omega$. The strain was properly selected from the range of 3 to 10% so that the torque in the measuring range would be detectable and torque-over should not be brought about. The sample used in the shear viscosity measurement was prepared by press molding a test sample to a thickness of 2 mm by the use of a press molding machine manufactured by Shinto Metal Industries Corporation under the conditions of a preheating temperature of 190° C., a preheating time of 5 minutes, a heating temperature of 190° C., a heating time of 2 minutes, a heating pressure of 100 kg/cm², a cooling temperature of 20° C., a cooling time of 5 minutes and a cooling pressure of 100 gk/cm².

The zero shear viscosity $\eta_0$ was calculated by fitting the Carreau model of the following mathematical formula (Eq-5) to the observed Theological curve [angular velocity ($\omega$) variance of shear viscosity ($\eta^*$)] by the non-linear least squares method.

$$\eta^*=\eta_0[1+(\lambda\omega)^a]^{(n-1)/a} \quad \text{(Eq-5)}$$

In the above formula (Eq-5), is a parameter having a dimension of time, and n is a power law index of a material. The fitting by the non-linear least squares method is carried out so that d in the following mathematical formula (Eq-6) may become minimum.

$$d = \sum_{w=0.02512}^{100} [\text{Log}_{10}\eta_{exp}(\omega) - \text{Log}_{10}\eta_{calc}(\omega)]^2 \quad \text{(Eq-6)}$$

In the above formula (Eq-6), $\eta_{exp}(\omega)$ is an actual shear viscosity, and $\eta_{calc}(\omega)$ is a shear viscosity calculated from the Carreau model.

The weight-average molecular weight (Mw) by the GPC-VISCO method was measured in the following manner using GPC/V2000 manufactured by Waters Corporation. As a guard column, Shodex AT-G was used, and as analytical columns, two At-806 columns were used. The column temperature was 145° C. As a mobile phase, o-dichlorobenzene and 0.3% by weight of BHT an antioxidant were used. The mobile phase was moved at 1.0 ml/min, and the sample concentration was 0.1% by weight. As detectors, a differential refractometer and a 3-carpillary viscometer were used. As standard polystyrenes, products of Tosoh Corporation were used. Calculation of molecular weight was carried out in the following manner. An actual viscosity was calculated from a viscometer and a refractometer, and by means of actual universal calibration, weight-average molecular weight (Mw) was calculated.

The ethylene-based resin (R) for use in the invention fully exerts the later-described effects in almost all the plastic industrial uses so long as it satisfies the above-mentioned requirements (1) to (5). However, from the viewpoint that sudden troubles about moldability and flowability can be surely prevented, the ethylene-based resin (R) preferably satisfies the following requirement (6) at the same time in addition to the requirements (1) to (5).

Requirement (6)

The intrinsic viscosity ([η] (dl/g)) as measured in decalin at 135° C. and the weight-average molecular weight Mw as measured by the GPC-viscosity detector method (GPC-VISCO) of the ethylene-based resin (R) satisfy the following relational formula (Eq-7).

$$0.80 \times 10^{-4} \times Mw^{0.776} \leq [\eta] \leq 1.65 \times 10^{-4} \times Mw^{0.776} \quad \text{(Eq-7)}$$

More preferably, they satisfy the following relational formula (Eq-8).

$$0.90 \times 10^{-4} \times Mw^{0.776} \leq [\eta] \leq 1.55 \times 10^{-4} \times Mw^{0.776} \quad \text{(Eq-8)}$$

Particularly preferably, they satisfy the following relational formula (Eq-9).

$$0.90 \times 10^{-4} \times Mw^{0.776} \leq [\eta] \leq 1.40 \times 10^{-4} \times Mw^{0.776} \quad \text{(Eq-9)}$$

It is known that when long-chain branches are introduced into an ethylene-based polymer, the ethylene-based polymer has a low intrinsic viscosity [η](dl/g) for its molecular weight as compared with a linear ethylene-based polymer having no long-chain branch (e.g., Walther Burchard, "ADVANCES IN POLYMER SCIENCE", 143, Branched Polymer II, P. 137 (1999)). On that account, in the case where the intrinsic viscosity [η] (dl/g) is not more than $1.65 \times 10^{-4} \times Mw^{0.776}$, the ethylene-based resin (R) also has a large number of long-chain branches, and hence, the resin is excellent in moldability and flowability.

By the preparation under the conditions described in the later-described Preparation Example 31, an ethylene-based resin wherein the relationship between the intrinsic viscosity [[η](dl/g)] and the weight-average molecular weight (Mw) is close to the borderline defined by $0.80 \times 10^{-4} \times Mw^{0.776} = [\eta]$ of the parametric formula (Eq-7) can be obtained. On the other hand, by the preparation under the conditions described in the later-described Preparation Example 21, an ethylene-based resin wherein the relationship therebetween is close to the borderline defined by $[\eta] = 1.65 \times 10^{-4} \times Mw^{0.776}$ of the parametric formula (Eq-7) can be obtained.

The intrinsic viscosity [η](dl/g) was measured in the following manner using a decalin solvent. About 20 mg of a sample was dissolved in 15 ml of decalin, and a specific viscosity $\eta_{SP}$ was measured in an oil bath at 135° C. To this decalin solution was added 5 ml of a decalin solvent to dilute the solution, and a specific viscosity $\eta_{SP}$ was measured similarly. This dilution operation was further repeated twice, and the concentration (C) was extrapolated to 0 to obtain a $\eta_{SP}/C$ value. This $\eta_{SP}/C$ value is defined as an intrinsic viscosity [η]. (see the following formula (Eq-10))

$$[\eta] = lim(\eta_{SP}/C) \, (C \to 0) \quad \text{(Eq-10)}$$

The ethylene-based resin (R) for use in the invention may be composed of only the ethylene-based polymer (R1) that is an essential constituent, or as previously described, the ethylene-based polymer (R2) may coexist so long as the ethylene-based resin (R) satisfies the aforesaid requirements (1) to (5) at the same time. The process for preparing the ethylene-based polymer (R1) that is an essential constituent of the ethylene-based resin (R) of the invention is described in detail hereinafter.

Process for Preparing Ethylene-based Polymer (R1)

The ethylene-based polymer (R1) for use in the invention can be efficiently prepared by polymerizing ethylene and at least one α-olefin selected from α-olefins of 4 to 10 carbon atoms in the presence of:

a particulate catalyst component (sometimes called "solid catalyst component (K)" for short in the following description) obtained from (S) a solid carrier, (A) at least one compound selected from a metallocene compound (a-1) comprising an element of group 4 of the periodic table represented by the following formula (I) and a transition metal compound (a-2) comprising an element of group 4 of the periodic table represented by the following formula (II), (B) a metallocene compound comprising an element of group 4 of the periodic table represented by the following formula (III), and (C) at least one compound selected from the group consisting of (c-1) an organometallic compound, (c-2) an organoaluminum oxy-compound, and (c-3) a compound which reacts with the component (A) and/or the component (B) to form an ion pair, and (D) an organoaluminum compound as needed.

Details of the order of contact of the above components in the preparation of the solid catalyst component (K) are described later, but in general, the following methods (a) and (b) are preferably adopted from the viewpoint of ease of contact operation.

(a) A method comprising mixing-contacting the component (s) with the component (C) and then contacting the resulting contact product with a mixture of the component (A) and the component (B) to prepare the solid catalyst component (K).

(b) A method comprising mixing-contacting the component (s) with the component (C), then mixing-contacting the resulting contact product with the component (A) to prepare a solid catalyst component (K-1), separately mixing-contacting the component (S) with the component (C), then mixing-contacting the resulting contact product with the component (B) to prepare a solid catalyst component (K-2), and blending the solid catalyst component (K-1) with the solid catalyst component (K-2) to prepare the solid catalyst component (K).

Examples of the α-olefins of 4 to 10 carbon atoms include 1-butene, 1-hexene, 4-methyl-1-pentene, 1-octene and 1-decene. An α-olefin of 6 to 10 carbon atoms is preferable, and 1-hexene is more preferable. Combination of two or more different kinds of α-olefins of 4 to 10 carbon atoms can be also used. When 1-butene is used as the α-olefin, combination with an α-olefin of 6 to 10 carbon atoms is preferable.

Next, the components (A), (B), (C) and (D) are described in detail.

Component (A)

The component (A) is composed of the compound (a-1) only, or composed of the compound (a-2) only, or composed of a combination of the compound (a-1) and the compound (a-2).

The metallocene compound (a-1) is a metallocene compound comprising an element of group 4 of the periodic table represented by the following formula (I).

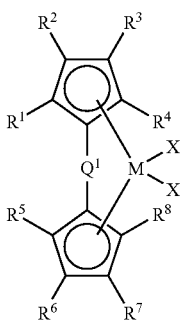

(I)

In the formula (I), $R^1$ to $R^8$ are each a group selected from the group consisting of a hydrogen atom and a hydrocarbon group having 1 to 20 carbon atoms (alkyl group, cycloalkyl group, alkenyl group, aryl group, arylalkyl group) and may be the same or different, $Q^1$ is a group selected from the group consisting of an alkylene group having 1 to 20 carbon atoms, an alkylidene group and a silicon-containing group, each X is independently a group selected from a hydrogen atom, a halogen atom, a hydrocarbon group having 1 to 20 carbon atoms, a halogen-containing hydrocarbon group having 1 to 20 carbon atoms, a silicon-containing group, an oxygen-containing group, a sulfur-containing group, a nitrogen-containing group and a phosphorus-containing group, and M is titanium, zirconium or hafnium.

As preferred metallocene compounds (a-1), metallocene compounds crosslinked with dimethylsilylene group are selected, and as particularly preferred compounds, dimethylsilylenebis(cyclopentadienyl)zirconium dichloride, dimethylsilylenebis(2-methylcyclopentadienyl)zirconium dichloride, dimethylsilylenebis(3-methylcyclopentadienyl) zirconium dichloride, dimethylsilylenebis(2-n-butylcyclopentadienyl)zirconium dichloride and dimethylsilylenebis(3-n-butylcyclopentadienyl)zirconium dichloride are selected. The compound (a-1) used in the later-described preparation examples is a compound represented by the following formula (A-1) or the following formula (A-2), but in the present invention, the compound (a-1) is in no way limited to these two compounds.

(A-1)

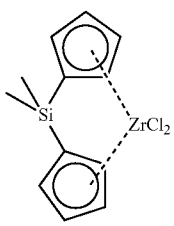

(A-2)

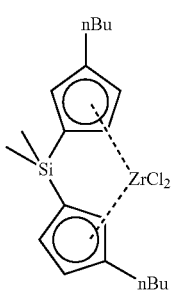

The transition metal compound (a-2) is a transition metal compound comprising an element of group 4 of the periodic table represented by the following formula (II).

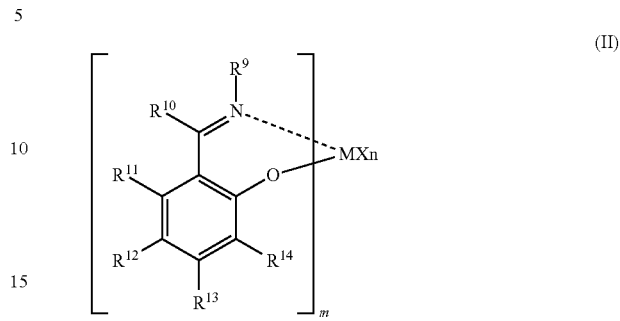

(II)

In the formula (II), M represents a transition metal atom of group 4 of the periodic table, m represents an integer of 1 to 4, $R^9$ is represented by the following formula (II-1) or (II-2), $R^{10}$ to $R^{14}$ may be the same as or different from one another and represent each a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, and two or more of them may be bonded to each other to form a ring. When m is 2, two groups of the groups represented by $R^{10}$ to $R^{14}$ may be bonded (however, $R^9$ and $R^9$ are not bonded to each other). Symbol n is a number satisfying a valence of M, X represents a group selected from a hydrogen atom, a halogen atom, a hydrocarbon group having 1 to 20 carbon atom(s), a halogen-containing hydrocarbon group having 1 to 20 carbon atom(s), a silicon-containing group, an oxygen-containing group, a sulfur-containing group, a nitrogen-containing group and a phosphorus-containing group, and when n is not less than 2, plural groups represented by X may be the same as or different from each other, and plural groups represented by X may be bonded to each other to form a ring.

(II-1)

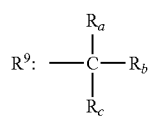

In the formula, Ra represents a hydrogen atom, an aliphatic hydrocarbon group or an alicyclic hydrocarbon group, and Rb and Rc represent each a hydrogen atom or a methyl group and may be the same as or different from each other.

(II-2)

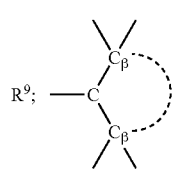

In the formula, the broken line indicates that two Cβ are directly bonded or two Cβ are bonded through a hydrocarbon group of 1 or more carbon atoms.

Of the transition metal compounds (a-2), a compound in which $R^9$ in the formula (II) is methyl, ethyl, n-propyl, n-hexyl, n-octadecyl, cyclohexyl, cycloheptyl, cyclooctyl, 4-tert-butylcyclohexyl, methylenecyclohexyl, isopropyl, 1-methylhexyl or 1,5-dimethylhexyl is preferably employed. The compound (a-2) used in the later-described preparation examples is a compound represented by the following formula (A-3), but in the present invention, the compound (a-2) is in no way limited to this compound.

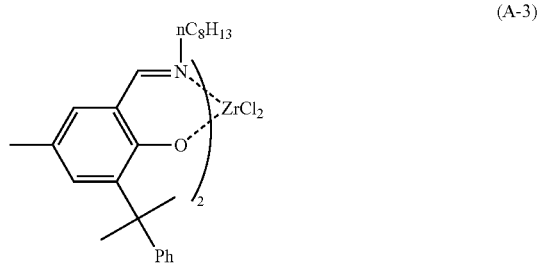

Component (B)

The component (B) is a metallocene compound comprising an element of group 4 in the periodic table represented by the following formula (III).

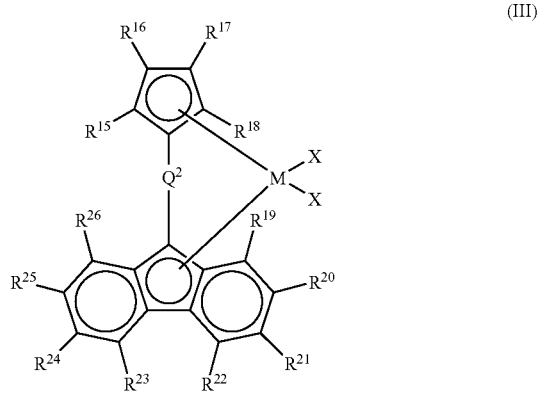

In the formula (III), $R^9$ to $R^{20}$ may be the same as or different from one another and represent each a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, and two or more of them may be bonded to each other to form a ring. $Q^2$ is a divalent group to bond two ligands and is a hydrocarbon group having 1 to 20 carbon atom(s), a halogen-containing hydrocarbon group having 1 to 20 carbon atom(s), a silicon-containing group or a germanium- or tin-containing group. Each X is independently a group selected from a hydrogen atom, a halogen atom, a hydrocarbon group having 1 to 20 carbon atom(s), a halogen-containing hydrocarbon group having 1 to 20 carbon atom(s), a silicon-containing group, an oxygen-containing group, a sulfur-containing group, a nitrogen-containing group and a phosphorus-containing group, and M is a transition metal selected from titanium, zirconium and hafnium.

Preferred examples of the components (B) include isopropylidene(cyclopentadienyl)(fluorenyl)zirconium dichloride, isopropylidene(cyclopentadienyl)(2,7-di-tert-butylfluorenyl)zirconium dichloride, isopropylidene(cyclopentadienyl)(3,6-di-tert-butylfluorenyl)zirconium dichloride, isopropylidene(cyclopentadienyl)(octamethyloctahydrido-dibenzfluorenyl)zirconium dichloride, cyclohexylidene(cyclopentadienyl)(fluorenyl)zirconium dichloride, cyclohexylidene(cyclopentadienyl)(2,7-di-tert-butylfluorenyl)zirconium dichloride, cyclohexylidene(cyclopentadienyl)(3,6-di-tert-butylfluorenyl)zirconium dichloride, cyclohexylidene(cyclopentadienyl)(octamethyloctahydrido-dibenzfluorenyl)zirconium dichloride, dimethylsilyl(cyclopentadienyl)(fluorenyl)zirconium dichloride, dimethylsilyl(cyclopentadienyl)(2,7-di-tert-butylfluorenyl)zirconium dichloride, dimethylsilyl(cyclopentadienyl)(3,6-di-tert-butylfluorenyl)zirconium dichloride, dimethylsilyl(cyclopentadienyl)(octamethyloctahydrido-dibenzfluorenyl)zirconium dichloride, isopropylidene(indenyl)(fluorenyl)zirconium dichloride, isopropylidene(indenyl)(2,7-di-tert-butylfluorenyl)zirconium dichloride, isopropylidene(indenyl)(3,6-di-tert-butylfluorenyl)zirconium dichloride, isopropylidene(indenyl)(octamethyloctahydrido-dibenzfluorenyl)zirconium dichloride, cyclohexylidene(indenyl)(fluorenyl)zirconium dichloride, cyclohexylidene(indenyl)(2,7-di-tert-butylfluorenyl)zirconium dichloride, cyclohexylidene(indenyl)(3,6-di-tert-butylfluorenyl)zirconium dichloride, cyclohexylidene(indenyl)(octamethyloctahydrido-dibenzfluorenyl)zirconium dichloride, dimethylsilyl(indenyl)(fluorenyl)zirconium dichloride, dimethylsilyl(indenyl)(2,7-di-tert-butylfluorenyl)zirconium dichloride, dimethylsilyl(indenyl)(3,6-di-tert-butylfluorenyl)zirconium dichloride, and dimethylsilyl(indenyl)(octamethyloctahydrido-dibenzfluorenyl)zirconium dichloride. The component (B) used in the later-described preparation examples is a metallocene compound represented by the following formula (B-1), the following formula (B-2) or the following formula (B-3), but in the present invention, the component (B) is in no way limited to this compound.

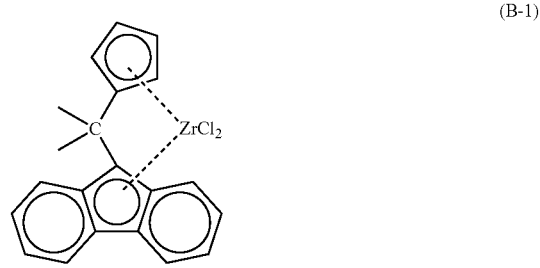

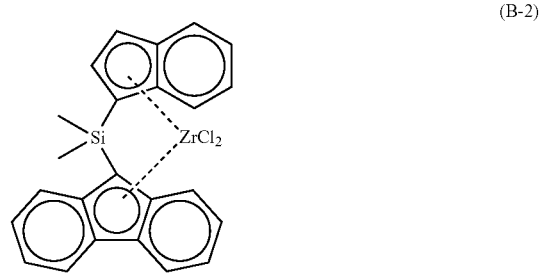

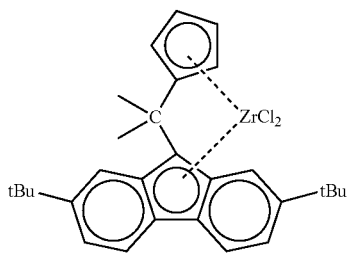
(B-3)

Component (C)

The component (C) is at least one compound selected from (c-1) an organometallic compound, (c-2) an organoaluminum oxy-compound and (c-3) a compound, which reacts with the component (A) and/or the component (B) to form an ion pair. As these compounds, compounds disclosed in Japanese Patent Laid-Open Publication No. 315109/1999 and EP0874005A1 by the present applicant can be used without any restriction, but preferred embodiments are described below.

As the organometallic compound (c-1), an organoaluminum compound is preferable. Such organoaluminum compounds are used singly or in combination of two or more kinds.

As the organoaluminum oxy-compound (c-2), an organoaluminum oxy-compound prepared from trialkylalumium or tricycloalkylaluminum is preferable, and an organoaluminum oxy-compound prepared from trimethylaluminum or triisobutylaluminum is particularly preferable. Such organoaluminum oxy-compounds are used singly or in combination of two or more kinds.

As the compound (c-3) which reacts with the component (A) and/or the component (B) to form an ion pair, Lewis acid, ionic compound, borane compound and carborane compound, which are described in Japanese Patent Laid-Open Publication No. 501950/1989, Japanese Patent Laid-Open Publication No. 502036/1989, Japanese Patent Laid-Open Publication No. 179005/1991, Japanese Patent Laid-Open Publication No. 179006/1991, Japanese Patent Laid-Open Publication No. 207703/1991, Japanese Patent-Laid-Open Publication No. 207704/1991 and U.S. Pat. No. 5,321,106 etc.; further, heteropoly compound, and isopoly compound can be used without any restriction.

The component (C) used in the later-described preparation examples is an organoaluminum oxy-compound (methylaluminoxane) prepared from trimethylaluminum, which is the above compound (c-2).

Component (D)

As the component (D), which is used as an arbitrary component in the preparation of the ethylene-based polymer (R1), the same organoaluminum compound as the aforesaid component (c-1) is used. In the later-described preparation examples, triisobutylaluminum is used, but in the present invention, the component (D) is in no way limited to this compound.

Component (S)

The solid catalyst component used in the preparation of the ethylene-based polymer (R1) is characterized in that the component (A), the component (B) and the component (C) are supported on a solid carrier (S).

The solid carrier (S) is an inorganic or organic compound and is a granular or particulate solid.

As the inorganic compound, porous oxide, inorganic halide, clay, clay mineral or an ion-exchangeable layer compound is preferable, and porous oxide is more preferable.

Although such porous oxides differ from one another in properties depending upon their types and the preparation process, the carrier preferably used in the invention desirably has a particle diameter of 1 to 300 μm, preferably 3 to 200 μm, a specific surface area of 50 to 1000 m$^2$/g, preferably 100 to 800 m$^2$/g, and a pore volume of 0.3 to 3.0 cm$^3$/g. Such a carrier is used after calcination at 80 to 1000° C., preferably 100 to 800° C., as needed.

The carriers used in the later-described preparation examples are two kinds of silica, one of which has a mean particle diameter of 12 μm and the other of which has a mean particle diameter of 50 μm.

Preparation of Solid Catalyst Component

Next, a process for preparing the solid catalyst component from the component (S), the component (A), the component (B) and the component (C) is described.

The solid catalyst component (K) can be prepared by mixing-contacting the component (A), the component (B), the component (C) and the component (S) with one another in inert hydrocarbon.

In this case, the order of mixing the above components is arbitrarily determined, but preferred examples of methods to contact them include:

(i) a method comprising mixing-contacting the component (S) with the component (C), then mixing-contacting the resulting contact product with the component (A) to prepare a particulate catalyst component (K-1), separately mixing-contacting the component (S) with the component (C), then mixing-contacting the resulting contact product with the component (B) to prepare a solid catalyst component (K-2), and blending the solid catalyst component (K-1) with the solid catalyst component (K-2) to prepare the solid catalyst component (K), (ii) a method comprising mixing-contacting the component (A) with the component (C), then contacting the resulting contact product with the component (S) to prepare a particulate catalyst component (K-1), separately mixing-contacting the component (B) with the component (C), then contacting the resulting contact product with the component (S) to prepare a solid catalyst component (K-2), and blending the solid catalyst component (K-1) with the solid catalyst component (K-2) to prepare the solid catalyst component (K), (iii) a method comprising mixing-contacting the component (S) with the component (C), then contacting the resulting contact product with the component (A) and thereafter contacting the resulting contact product with the component (B) to prepare the particulate catalyst component (K), (iv) a method comprising mixing-contacting the component (S) with the component (C), then contacting the resulting contact product with the component (B) and thereafter contacting the resulting contact product with the component (A) to prepare the particulate catalyst component (K), (v) a method comprising mixing-contacting the component (S) with the component (C) and then contacting the resulting contact product with a mixture of the component (A) and the component (B) to prepare the particulate catalyst component (K), and (vi) a method comprising contacting a mixture of the component (A) and the component (B) with the component (C) and then contacting the resulting contact product with the component (S) to prepare the particulate catalyst component (K).

Of the above methods, the contact methods (i) and (v) are particularly preferable, as previously described. The solid catalyst component (K), the solid catalyst component (K-1) and the solid catalyst component (K-2) obtained by the above contact methods may be added as they are to the polymerization system in the polymerization, or may be used as prepolymerized catalyst components obtained by prepolymerizing an olefin onto them in advance. In the prepolymerization, ethylene or an olefin containing ethylene as a main component is used, and the amount of a polymer formed in prepolymerization is in the range of 0.01 to 1,000 g, preferably 0.1 to 800 g, more preferably 0.2 to 500 g, based on 1 g of the solid catalyst component.

The solvent used in the preparation of the solid catalyst component is, for example, an inert hydrocarbon solvent, and specific examples thereof include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures thereof. The time for pre-contacting the component (A) with the component (B) is in the range of usually 0 to 5 hours, preferably 0 to 1 hour, particularly preferably 0 to 30 minutes, and the time for subsequently contacting the resulting contact product with a contact product of the component (C) with the solid carrier (S) is in the range of usually 0 to 24 hours, preferably 0 to 5 hours, particularly preferably 0 to 2 hours. These procedures for supporting catalyst are carried out at a temperature of usually −50 to 200° C., preferably −50 to 50° C., particularly preferably 0 to 40° C.

Polymerization Conditions

The ratio of the component (A) to the component (B) varies depending upon the molecular weight and the molecular weight distribution of the desired ethylene-based polymer, but in usual, the ratio of the component (A) to the component (B) is determined so that the ratio $[W_A/W_B]$ of the weight $(W_A)$ of the resulting polymer attributable to the component (A) to the weight $(W_B)$ of the resulting polymer attributable to the component (B) may become 40/60 to 95/5, preferably 50/50 to 95/5, particularly preferably 60/40 to 95/5. Regarding the component (A) and the component (B) used in the later-described preparation examples, the molar ratio of the component (A) to the component (B) [molar quantity of component (A)/molar quantity of component (B)] is approx. 0.1 to 50.

All the transition metal atoms (M) in the component (A) and the component (B) supported on the carrier (S) can be determined by an inductively coupled plasma emission analytical method (ICP analytical method).

The component (c-1) is used in such an amount that the molar ratio [(c-1)/M] of the component (c-1) to all the transition metal atoms (M) in the component (A) and the component (B) becomes usually 0.01 to 100,000, preferably 0.05 to 50,000. The component (c-2) is used in such an amount that the molar ratio [(c-2)/M] of aluminum atoms in the component (c-2) to all the transition metal atoms (M) in the component (A) and the component (B) becomes usually 10 to 500,000, preferably 20 to 100,000. The component (c-3) is used in such an amount that the molar ratio [(c-3)/M] of the component (c-3) to all the transition metal atoms (M) in the component (A) and the component (B) becomes usually 1 to 10, preferably 1 to 5.

The ethylene-based polymer (R1) is obtained by polymerizing or copolymerizing ethylene and an α-olefin having 4 to 10 carbon atoms in the presence of the above-mentioned solid catalyst component.

The polymerization can be carried out by any of a liquid phase polymerization process, such as solution polymerization or suspension polymerization, and a gas phase polymerization, but preferable is a suspension polymerization process or a gas phase polymerization process.

Specific examples of the inert hydrocarbon media used in the liquid phase polymerization process include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures thereof. The olefin itself can be also used as a solvent.

In the polymerization using such a polymerization catalyst as above, the component (A) and the component (B) are used in such amounts that the total thereof becomes usually $10^{-12}$ to $10^{-1}$ mol, preferably $10^{-8}$ to $10^{-2}$ mol, based on 1 liter of the reaction volume.

The temperature of the polymerization using such a polymerization catalyst is in the range of usually −50 to +200° C., preferably 0 to 170° C., particularly preferably 60 to 170° C. The polymerization pressure is in the range of usually atmospheric pressure to 100 kg/cm$^2$, preferably atmospheric pressure to 50 kg/cm$^2$, and the polymerization reaction can be carried out by any of a batch process, a semi-continuous process and a continuous process. It is also possible to carry out the polymerization in two or more steps different in reaction conditions.

The molecular weight of the resulting ethylene-based polymer (R1) can be controlled by allowing hydrogen to exist in the polymerization system or by changing the polymerization temperature.

For the purpose of smoothly promoting the polymerization, an antioxidant, an antifouling agent or the like may be used in combination or may be supported on the carrier.

The olefin types employable in the preparation of the ethylene-based polymer (R1) are as previously described, but the following olefins can be used in combination without any restriction so long as the ethylene-based resin (R) satisfies the requirements (1) to (5) at the same time. That is to say, there can be mentioned cycloolefins having 3 to 30 carbon atoms, preferably 5 to 20 carbon atoms, such as cyclopentene, cycloheptene, norbornene, 5-methyl-2-norbornene and tetracyclododecene; polar monomers, such as acrylic acid, methacrylic acid, fumaric acid and maleic anhydride; α,β-unsaturated carboxylic esters, such as methyl acrylate, ethyl acrylate, methyl methacrylate, ethyl methacrylate and methacrylic acid; vinyl esters, such as vinyl acetate and vinyl propionate; unsaturated glycidyls, such as glycidyl acrylate and glycidyl methacrylate; halogenated olefins, such as vinyl fluoride and vinyl chloride; vinylcyclohexane, diene or polyene; aromatic vinyl compounds, such as styrene; functional group-containing styrene derivatives, such as divinylbenzene; etc.

Ethylene-based Polymer (R2)

The ethylene-based polymer (R2), which is an arbitrary component constituting the ethylene-based resin (R), is defined as an ethylene-based polymer which does not satisfy one or more of the aforesaid requirements (1) to (5). Examples of such ethylene-based polymers (R2) include low-density polyethylene prepared by the use of Ziegler-Natta catalyst, such as Ultozex 15150J and Ultozex 20100J (trade names, available from Prime Polymer Co., Ltd.), low-density polyethylene prepared by the use of metallocene catalyst, such as Evolue SP1540 and Evolue SP2040 (trade names, available from Prime Polymer Co., Ltd.), and high-pressureprocessed low-density polyethylene, such as Mirason 11P and Mirason 14P (trade names, available from Prime Polymer Co., Ltd.). In the later-described Preparation Example 32, an example using an ethylene/4-methyl-1-pentene copolymer (trade name: Ultozex UZ15150J) manufactured by Prime Polymer Co., Ltd. is shown. The compositional ratio of the ethylene-based polymer (R1) in the ethylene-based resin (R) is usually not more than 99% by weight, preferably not more than 70% by weight, more preferably not more than 30% by weight.

Ethylene-based Resin Composition (R')

By blending the ethylene-based resin (R) with a thermoplastic resin (R3) other than the ethylene-based polymer (R1) and the ethylene-based polymer (R2), a composition (ethylene-based resin composition (R')) excellent in molding properties and mechanical strength may be formed. The blending ratio ((R)/(R3)) of the ethylene-based resin (R) to the thermoplastic resin (R3) is in the range of usually 99.9/0.1 to 0.1/99.9, preferably 99.9/0.1 to 30/70, more preferably 99.9/0.1 to 70/30. The ethylene-based resin composition (R') preferably satisfies the aforesaid requirements (1) to (5) even in the case where the composition contains the thermoplastic resin (R3) and the later-described additives.

Thermoplastic Resin (R3)

Examples of the thermoplastic resins (R3) include crystalline thermoplastic resins, such as polyolefin, polyamide, polyester and polacetal; non-crystalline thermoplastic resins, such as polystyrene, acrylonitrile/butadiene/styrene copolymer (ABS), polycarbonate, polyphenylene oxide and polacrylate; and polyvinyl chloride.

Specific examples of the polyolefins include propylene-based polymer, butene-based polymer, 4-methyl-1-pentene-based polymer, 3-methyl-1-butene-based polymer and hexene-based polymer. Of these, propylene-based polymer and 4-methyl-1-pentene-based polymer are preferable.

Specific examples of the polyamides include aliphatic polyamides, such as nylon-6, nylon-66, nylon-10, nylon-12 and nylon-46, and aromatic polyamides prepared from aromatic dicarboxylic acids and aliphatic diamines.

Specific examples of the polyesters include aromatic polyesters, such as polyethylene terephthalate, polyethylene naphthalate and polybutylene terephthalate; polycaprolactone; and polyhydroxy butyrate.

Specific examples of the polyacetals include polyformaldehyde (polyoxymethylene), polyacetaldehyde, polypropionaldehyde and polybutylaldehyde. Of these, polyformaldehyde is particularly preferable.

The polystyrene may be a homopolymer of styrene, or may be a binary polymer of styrene and acrylonitrile, methyl methacrylate or α-methylstyrene.

As the ABS, ABS containing constituent units derived from acrylonitrile in amounts of 20 to 35% by mol, constituent units derived from butadiene in amounts of 20 to 30% by mol and constituent units derived from styrene in amounts of 40 to 60% by mol is preferably employed.

Examples of the polycarbonates include polymers obtained from bis(4-hydroxyphenyl)methane, 1,1-bis(4-hydroxyphenyl)ethane, 2,2-bis(4-hydroxyphenyl)propane and 2,2-bis(4-hydroxyphenyl)butane. Of these, polycarbonate obtained from 2,2-bis(4-hydroxyphenyl)propane is particularly preferable.

As the polyphenylene oxide, poly(2,6-dimethyl-1,4-phenylene oxide) is preferably employed.

As the polyacrylate, polymethyl methacrylate or polybutyl acrylate is preferably employed.

Such thermoplastic resins (R3) as described above may be used singly or in combination of two or more kinds.

Additives

To the ethylene-based resin (R) and to the ethylene-based resin composition (R'), additives, such as weathering stabilizer, heat stabilizer, antistatic agent, anti-slip agent, anti-blocking agent, anti-fogging agent, lubricant, pigment, dye, nucleating agent, plasticizer, anti-aging agent, hydrochloric acid absorbent and antioxidant, may be added within limits not detrimental to the objects of the present invention.

Molding Method

The ethylene-based resin (R) or the ethylene-based resin composition (R') is processed by general film molding, blow molding, injection molding or extrusion molding. Examples of the film molding methods include extrusion lamination molding, T-die film molding and inflation molding (air-cooling, water-cooling, multistep cooling, high-speed processing). The ethylene-based resin (R) or the ethylene-based resin composition (R') is excellent in stability of a bubble of a molten film, and vibration of the film hardly occurs, so that the resulting molded product is hardly wrinkled. Therefore, the resin or the resin composition is favorable for the inflation molding.

In general, when an ethylene resin is extruded at low temperatures, the resin pressure and the motor load become greater, and molding becomes difficult. However, since molding of the ethylene-based resin (R) or the ethylene-based resin composition (R') at low temperatures is easily made, deterioration of resin that is liable to occur at high temperatures can be inhibited, and the amounts of various stabilizers for preventing deterioration, such as antioxidant, can be consequently depressed. On this account, it becomes possible to reduce the amounts of stabilizers and deterioration products of the resin, such substances being regarded as causes of odor. Therefore, odor is hardly developed from the resulting molded product, and a low-odor film can be realized. The deterioration products of the resin include carboxylic acids formed by oxidation of low-molecular weight components, and such substances are considered to affect taste badly. On that account, when foods are treated as the contents of films or bags obtained from the resin, not only the stabilizers but also the deterioration products of the resin can affect taste of foods badly. Since the ethylene-based resin (R) or the ethylene-based resin composition (R') can reduce the amounts of the stabilizers and the deterioration products of the resin, a film having reduced bad effect on the taste can be obtained.

Further, since the ethylene-based resin (R) or the ethylene-based resin composition (R') can be extruded under low resin pressure and low motor load, a large amount of the ethylene resin required for forming a thick film can be readily extruded. Furthermore, since the ethylene-based resin (R) or the ethylene-based resin composition (R') has excellent bubble stability of a molten film, unevenness of film thickness hardly occurs, and a film having an even thickness can be obtained. Moreover, since the ethylene-based resin (R) or the ethylene-based resin composition (R') is excellent not only in such molding properties but also in mechanical strength, break of a film in the film production can be inhibited. Accordingly, the resin or the resin composition is favorable for a thick film.

Film

The film of the invention is a film including, in at least a part thereof, a layer composed of the ethylene-based resin (R) or the ethylene-based resin composition (R'). The film of the invention includes a film of a single layer composed of the ethylene-based resin (R) or the ethylene-based resin composition (R'), and a multilayer film including a layer composed of the ethylene-based resin (R) or the ethylene-based resin composition (R'). The multilayer film is, for example, a film wherein on one surface of a layer composed of the ethylene-based resin (R) or the ethylene-based resin composition (R') is laminated an ethylene-based resin (P1) that is different from the ethylene-based resin (R) or the ethylene-based resin composition (R'), or a film wherein on one surface of a layer composed of the ethylene-based resin (R) or the ethylene-based resin composition (R') is laminated an ethylene-based resin (P1) that is different from the ethylene-based resin (R) or the ethylene-based resin composition (R') and on the other surface is laminated an ethylene-based resin (P2) that is different from the ethylene-based resin (R) or the ethylene-based resin composition (R') ((P1) and (P2) may be the same or different). The film of the invention may have other layers in addition to the layer composed of the ethylene-based resin (R) or the ethylene-based resin composition (R'), the layer composed of the ethylene-based resin (P1) and the layer composed of the ethylene-based resin (P2), and the layer structure of the film can be properly determined according to the use purpose.

Examples of the ethylene-based resins (P1) and (P2) include ethylene-based resins which are resins other than the ethylene-based resin (R) and are used for conventional film molding, such as high-density polyethylene, medium-density polyethylene, high-pressure-processed low-density polyethylene, linear low-density polyethylene and an ethylene/propylene copolymer. The ethylene-based resins (P1) and (P2) may be each composed of two or more ethylene-based resins, and for example, a resin composed of high-pressure-processed low-density polyethylene and linear low-density polyethylene is employable.

The thickness of the film of the invention can be properly determined according to the use application and the like, and from the viewpoint of keeping transparency and flexibility, the thickness is preferably not more than 300 µm, more preferably not more than 250 µm, still more preferably not more than 200 µm. On the other hand, taking mechanical properties into account, the thickness of all the layers is preferably not less than 5 µm, more preferably not less than 10 µm, still more preferably not less than 15 µm. In the case of a thick film, the film thickness is usually not less than 60 µm, preferably 60 to 200 µm, more preferably 60 to 180 µm, still more preferably 80 to 150 µm. If the film thickness is less than the lower limit of the above range, film strength is low and a desired film may not be obtained. If the film thickness exceeds the upper limit of the above range, the resin pressure or the motor load increases, or stability of a bubble is bad, resulting in a fear of occurrence of wrinkles or uneven thickness of the film.

When the film of the invention is a multilayer film, the layer composed of the ethylene-based resin (R) or the ethylene-based resin composition (R') may be a base layer or may be a sealing layer. In the case of a base layer, the layer is preferably composed of the ethylene-based resin (R'), and in the case of a sealing layer, the layer is preferably composed of the ethylene-based resin composition (R). When the ethylene-based resin (R) or the ethylene-based resin composition (R') is used for a sealing layer, the thickness of the sealing layer is properly determined according to the use application and the like. However, the thickness of the sealing layer is preferably about 5 to 100 µm. The sealing layer composed of the ethylene-based resin (R) or the ethylene-based resin composition (R') is excellent in heat-sealing strength, and even if the heat-sealing temperature is relatively low, the layer exhibits high heat-sealing strength.

When the film of the invention is a single-layer film, the film can be produced by, for example, inflation film molding or T-die cast film molding. When the film of the invention is a multilayer film, the film can be produced by a method comprising extrusion laminating the ethylene-based resin (R) or the ethylene-based resin composition (R') on a base film composed of, for example, the ethylene-based resin (P1), a method comprising molding the ethylene-based resin (R) or the ethylene-based resin composition (R') into a base film by inflation film molding or T-die cast film molding and then applying an adhesive onto the base film (for example, the adhesive is dissolved in a solvent, then applied and dried, or the adhesive is applied in a molten state), a method comprising co-extruding the ethylene-based resin (R) or the ethylene-based resin composition (R') and an adhesive by co-extrusion inflation film molding or co-extrusion T-die cast film molding, or the like.

As uses of the film of the invention, there can be mentioned a film for a sealant, a surface protective film, a low-odor film for food packaging, an easy-tear film, a thick film for heavy-duty packaging or agriculture having a thickness of not less than 60 µm, a film, in which a layer composed of the ethylene-based resin (R) or the ethylene-based resin composition (R') is an adhesive layer for a surface protective film, etc.

The film for a sealant comprises a base layer composed of, for example, the ethylene-based resin (P1) and a sealing layer composed of the ethylene-based resin (R) or the ethylene-based resin composition (R'). A liquid packaging container can be produced from the film for a sealant by cutting the film to an appropriate size, then superposing the one cut film upon the other so that the sealant surfaces may be in contact with each other, and heat-sealing their peripheral portions. Such liquid packaging containers are preferably used as packaging containers of various liquids, such as liquid soup, liquid seasonings, juice, liquor and water, and products containing liquids, such as pickles and retort foods.

The surface protective film is a film having an adhesive layer on one surface of a base layer, and has a layer composed of, for example, the ethylene-based resin (P1) and a layer composed of the ethylene-based resin (R) or the ethylene-based resin composition (R'). Any of these layers may be a base layer or may be an adhesive layer.

The low-odor film for food packaging is, for example, a film of a single layer composed of the ethylene-based resin (R) or the ethylene-based resin composition (R'). In the low-odor film of the invention, the possibility that the taste of foods as the contents is impaired by the odor of the film is little, and hence, this film is favorable as a food packaging film, wherein concern is a fear of exerting influence on the taste. Examples of the films for food packaging include moist food packaging bag, liquid soup package, laminated raw fabric, laminated bag for foods, special-shaped liquid packaging bag (standing pouch or the like), standardized bag, laminated printed standardized bag, heavy-duty bag, wrapping film, sugar bag, oily substance packaging bag, bag for noodle packaging, bag for refrigeration, bag for sweets packaging, bag for bread packaging, retort bag, pickles bag, sandwich bag, potable water bag, part-coat bag and bag for use in electronic oven. For forming bags from the films for food packaging, conventional processing methods such as cutting and heat sealing are employable.

The easy-tear film is, for example, a film of a single layer composed of the ethylene-based resin (R) or the ethylene-based resin composition (R'). The easy-tear film of the invention is excellent in easy tear property, and the value (MD/TD) obtained by dividing Elmendorf tear strength in the MD direction of the film by Elmendorf tear strength in the TD direction thereof is preferably not less than 0.3 but not more than 1.0, more preferably not less than 0.4 but not more than 1.0. When the MD/TD value is in the above range, a difference between the tear strength in the MD direction and the tear strength in the TD direction becomes small, and the film is excellent in balance of tear strengths in the both directions. Hence, the film can be easily torn not only in the MD direction, the TD direction and the oblique direction but also in the random direction. When the film is produced by the inflation molding, the take-off direction of the film is referred to as "MD direction", and the direction vertical to the take-off direction is referred as "TD direction".

If the easy-tear film of the invention is used as a packaging material requiring tear property, the packaging material can be easily opened or cut open in the random direction, and the contents can be easily taken out, so that the film of the invention is favorable. The packaging material of the invention is desired to have a notch of about 1 to 10 mm in an arbitrary direction at the edge. Since the easy-tear film of the invention is excellent in tear property in the random direction, the above notch has a function of leading to the arbitrary one direction in the tearing operation, and therefore, when the film is torn with hand, the packaging material can be more easily opened or cut open. Examples of the packaging materials include those similar to the aforesaid films for food packaging, flower packaging film, packaging films or bags for foods, sweets and medicines, such as medicine bag, cut tape, standing pouch, tube, and tear-off cap. For producing a packaging material such as a bag from the easy-tear film, conventional processing methods such as cutting and heat sealing are employable. Since the easy-tear film of the invention has easy tear property in the random direction, it is unnecessary to take the direction of the film into account in such processing methods, and hence, the easy-tear film is convenient.

The thick film is, for example, a film of a single layer composed of the ethylene-based resin (R) or the ethylene-based resin composition (R'). If the thick film of the invention is used as a packaging material for a heavyweight substance, a packaging material having endurance against the gravity load of the contents and capable of inhibiting breakage or elongation can be produced, and hence, the film of the invention is favorable. The packaging material for a heavyweight substance of the invention is usually used for packaging the contents having a weight of 1 to 1000 kg, and examples of the shapes include a packaging film and a packaging bag. Specifically, there can be mentioned packaging materials for foods such as rice and grains, packaging materials for stationeries and miscellaneous goods, packaging materials for industrial materials, packaging materials for building materials, etc. The thick film of the invention produced using the ethylene-based resin (R) or the ethylene-based resin composition (R') can have a satisfactory width, and the specific width of the film as an agricultural film sheet is usually not less than 500 mm but not more than 20000 mm, preferably not less than 1000 mm but not more than 15000 mm. If the film width is less than the lower limit of the above range, a film having a desired width may not be obtained, and if the film width exceeds the upper limit of the above range, stability of a bubble becomes poor, and there is a possibility of occurrence of wrinkles and uneven thickness of the film. Examples of the agricultural film sheets include films for home vegetable garden, film sheets for growing in greenhouse, film sheets for growing in plastic tunnel, sheets for compost, and agricultural windbreaking/waterproof sheets.

Laminate

The laminate of the invention is a laminate obtained by laminating a layer selected from a paper in the form of a sheet, an engineering plastic layer and an aluminum layer on one surface of a layer composed of the ethylene-based resin (R) or the resin composition (R') through an anchor coating agent, and as needed, laminating a layer of an ethylene-based resin (P3) that is different from the ethylene-based resin (R) or the resin composition (R') on the other surface, or a laminate obtained by laminating a layer selected from a paper in the form of a sheet, an engineering plastic layer and an aluminum layer on one surface of an ethylene-based resin (P3) that is different from the ethylene-based resin (R) or the resin composition (R') through an anchor coating agent and laminating a layer composed of the ethylene-based resin (R) or the resin composition (R') on the other surface.

Examples of the anchor coating agents include hitherto publicly known agents, such as ester-based agent, urethane-based agent, acrylic-based agent, ethyleneimine-based agent and isocyanate-based agent.

Examples of the papers include cast-coated paper, art paper, coat paper, craft paper, woodfree paper and synthetic paper, and they can be properly used according to the use application and the purpose.

Examples of the engineering plastics include polyamide (PA), polycarbonate (PC), polyethylene terephthalate (PET), polybutylene terephthalate (PBT), polyacetal (POM), polyphenylene ether (including modified polyphenylene ether), polysulfone (PSF), polyether sulfone (PEA), polyphenylene sulfide, polyallylate (U polymer), polyamidoimide, polyether ketone (PEK), polyether ether ketone (PEEK), polyimide (PI) and liquid crystal polyester.

Examples of the ethylene-based resins (P3) include the same resins as the aforesaid ethylene-based resins (P1) and (P2).

The thickness of the laminate of the invention is not specifically restricted, but from the viewpoint of keeping flexibility, the thickness is preferably not more than 300 μm, more preferably not more than 250 μm, still more preferably not more than 200 μm. On the other hand, taking mechanical properties into account, the total thickness of the layers is preferably not less than 5 μm, more preferably not less than 10 μm, still more preferably not less than 15 μm. When the ethylene-based resin (R) or the ethylene-based resin composition (R') is used for a sealing layer of the laminate, the thickness of the sealing layer is properly determined according to the use application and the like, but it is preferably about 5 to 100 μm. The sealing layer composed of the ethylene-based resin (R) or the ethylene-based resin composition (R') is excellent in heat-sealing strength, and even if the heat-sealing temperature is a relatively low temperature, the sealing layer exhibits high heat-sealing strength.

The laminate of the invention can be produced by a hitherto publicly known process, and when the laminate has a layer composed of the ethylene-based resin (R) or the resin composition (R') and a layer composed of the ethylene-based resin (P3), the laminate can be produced by, for example, a process comprising coating a base material with an anchor coating material; thereafter evaporating the solvent by a dryer; then extrusion laminating the ethylene-based resin (P3) on the surface having been coated with the anchor coating agent; and further extrusion laminating the ethylene-based resin (R) or the resin composition (R') thereon, or extrusion laminating the ethylene-based resin (R) or the resin composition (R') on the surface having been coated with the anchor coating agent and further extrusion laminating the ethylene-based resin (P3) thereon.

As uses of the laminate of the invention, there can be mentioned a liquid packaging material, a viscous substance packaging material, a laminated paper, an adhesive tape, etc.

The liquid/viscous substance packaging material can be produced by cutting the laminate to an appropriate size, superposing one laminate upon the other so that the sealant surfaces may be in contact with each other and heat-sealing their peripheral portions. Such liquid/viscous substance packaging containers are preferably used as packaging containers of various liquids, such as liquid soup, liquid seasonings, juice, liquor and water, and products containing liquids, such as pickles and retort foods.

EXAMPLES

The present invention is further described with reference to the following examples, but it should be construed that the invention is in no way limited to those examples. Of the analytical methods and the evaluation methods for the ethylene-based resins used in the present invention, methods that are not described hereinbefore are as follows.

[m1] Number-average Molecular Weight (Mn), Z-average Molecular Weight (Mz), Ratio (Mw/Mn) of Weight-average Molecular Weight to Number-average Molecular Weight, Ratio (Mz/Mw) of Z-average Molecular Weight to Weight-average Molecular Weight Number-average molecular weight (Mn), Z-average molecular weight (Mz), ratio (Mw/Mn) of weight-average molecular weight to number-average molecular weight, and ratio (Mz/Mw) of Z-average molecular weight to weight-average molecular weight were measured in the following manner using GPC/V2000 manufactured by Waters Corporation. As a guard column, Shodex AT-G was used, and as analytical columns, two AT-806 columns were used. The column temperature was 145° C. As a mobile phase, o-dichlorobenzene and 0.3% by weight of BHT as an antioxidant were used. The mobile phase was moved at 1.0 ml/min, and the sample concentration was 0.1% by weight. As detectors, a differential refractometer and a 3-carpillary viscometer were used. As standard polystyrenes, products of Tosoh Corporation were used. Calculation of molecular weight was carried out in the following manner. An actual viscosity was calculated from a viscometer and a refractometer, and by means of actual universal calibration, weight-average molecular weight was calculated.

[m2] Neck-in

The resulting ethylene-based polymer was extrusion laminated on a craft paper of 50 g/m², which was a base material, by the use of a laminator, manufactured by Sumitomo Heavy Industries, Ltd., having an extruder of 65 mm diameter and a T-die of 500 mm die width under the following conditions.

Air gap: 130 mm
Under-die resin temperature: 295° C.
Take-off rate: 80 m/min, 120 m/min, 200 m/min
Film thickness: 20 μm in the case of take-off rate of 80 m/min, 13 μm in the case of take-off rate of 120 m/min, 8 μm in the case of take-off rate of 200 m/min When the width of the T-die is represented by $L_0$ and the width of the film laminated on the craft paper at each take-off rate is represented by L, the neck-in is calculated from $L_0$-L.

[m3] Film Breaking Rate, Take-off Surge Occurrence Rate

The resulting ethylene-based polymer was extrusion laminated on a craft paper of 50 g/m², which was a base material by the use of a laminator (manufactured by Sumitomo Heavy Industries, Ltd.) having an extruder of 65 mm diameter and a T-die of 500 mm die width under the conditions of an air gap of 130 mm and an under-die resin temperature of 295° C. The extrusion rate was determined so that the film thickness at a take-off rate of 80 m/min would become 20 μm.

The take-off rate was increased, and the take-off rate at which the molten film was broken was regarded as a film breaking rate. Further, the take-off rate was increased, and neck-in was measured 5 times at each take-off rate. The take-off rate at which a neck-in value that is out of the range of the mean neck-in ±1.5 mm was measured twice or more was regarded as a take-off surge occurrence rate.

[m4] Resin Pressure, Motor Load

The resulting ethylene-based polymer was extrusion laminated on a craft paper of 50 g/m², which was a base material by the use of a laminator (manufactured by Sumitomo Heavy Industries, Ltd.) having an extruder of 65 mm diameter and a T-die of 500 mm die width under the conditions of an air gap of 130 mm, an under-die resin temperature of 295° C. and a take-off rate of 80 m/min. In the extrusion lamination, a resin pressure at the crosshead part and a load of a motor to drive the extruder screw were measured. Smaller values of the motor load and the resin pressure indicate that the molding properties are more excellent and preferable. As the molding temperature is lowered, the motor load and the resin pressure become greater, and this is usually undesirable.

[m5] Heat-sealing Strength

The resulting ethylene-based polymer was extrusion laminated on a base material by the use of a laminator, manufactured by Sumitomo Heavy Industries, Ltd., having an extruder of 65 mm diameter and a T-die of 500 mm die width under the conditions of an air gap of 130 mm, an under-die resin temperature of 295° C. and a take-off rate of 80 m/min so that the film thickness would become 25 μm. As the base material, a laminate obtained by coating one surface of a biaxially stretched nylon film (trade name: Emblem ONM, available from Unitika Ltd.) of 15 μm thickness with a urethane-based anchor coating agent and then extrusion laminating an ethylene-based mixed resin, obtained by blending 50 parts by weight of linear low-density polyethylene obtained by the use of a Ziegler catalyst with 50 parts by weight of high-pressure-processed low-density polyethylene, in a thickness of 25 μm was used. The above extrusion lamination of the ethylene-based polymer was carried out on the side of the ethylene-based mixed resin layer of the above laminate.

Heat-sealing strength between the ethylene-based polymer layers of these extrusion laminated films were measured and evaluated in accordance with the following method.

A one-side heated bar sealer was used.
Heat-sealing pressure: 2 kg/cm²
Heat-sealing time: 0.5 second
Width of sealing bar: 10 mm
Width of test specimen: 15 mm
Peel angle: 180 degrees
Peel rate: 30 mm/min

[m6] Granulation Method

Using the resulting ethylene-based polymer and a single-screw extruder having a screw diameter of 65 mm (manufactured by Placo Co., Ltd.), a resin composition was obtained by melt kneading at a preset temperature of 180° C. and a screw rotational speed of 50 rpm. Then, the resin composition was extruded into strands, and the strands were cut with a cutter to obtain pellets.

[m7] Evaluation of Adhesion to Paper

To the ethylene-based polymer layer of the resulting laminated paper, a fabric tape for packaging having a width of 40 mm was applied. Then, the tape was peeled by a given force, and the condition of the laminated paper was evaluated.

Picking: A state that the laminated film at the peeled part suffers stringing little or interfacial separation does not occur, and besides, peeling is difficult and the paper base is broken.

Polymer separation: A state that the laminated film at the peeled part extends well or interfacial separation occurs, and the laminated film is relatively easily peeled without breakage of the paper base.

[m8] Bag Breaking Strength

Two laminates were superposed on one another in such a manner that their sealant layer surfaces (ethylene-based layers) faced each other, and they were heat-sealed on all sides under the conditions of a heat-sealing temperature of 140° C., a heat-sealing pressure of 2 kg/cm$^2$, a heat-sealing time of 0.5 second and a seal bar of 10 mm to prepare a bag of 90 mm×120 mm. The bag breaking strength of the prepared bag thus obtained was measured (under a static pressure) in the following manner.

Using a universal testing machine manufactured by Intesco Co., Ltd., a pressure was applied to the sample (bag) interposed between flat plates on a load cell, and when the bag was broken, the pressure was read out. The compression rate was 10 mm/min, the filled material in the bag was water, and the amount of the filled material was 100 cm$^3$.

[m9] Density (d)

Using a hydraulic hot press, manufactured by Shinto Metal Industries Corporation, preset at 190° C., a sheet of 0.5 mm thickness was produced under a pressure of 100 kg/cm$^2$ (shape of spacer: 9-piece molding of 45 mm×45 mm×0.5 mm-thickness in a plate of 240 mm×240 mm×0.5 mm-thickness), and then using a different hydraulic hot press, manufactured by Shinto Metal Industries Corporation, preset at 20° C., the sheet was compressed under a pressure of 100 kg/cm$^2$ to cool it, whereby a test sample was prepared. As the hot plate, SUS plates of 5 mm thickness were used. The pressed sheet was heat treated at 120° C. for 1 hour and linearly slowly cooled down to room temperature over a period of 1 hour, and the density was measured by a density gradient tube.

[m10] About Molding Properties (1) About Bubble Stability

When film molding was being carried out by inflation molding, the bubble was visually observed, and the bubble stability was evaluated by the following criteria.

AA: (a) The bubble is extremely stable and no vibration is observed.

BB: (b) The bubble is stable and vibration is little.

CC: (c) The bubble stability is a little bad and vibration is observed.

DD: (d) Film production is difficult because the bubble is not stable and does not rise or vibration is vigorous to cause many wrinkles.

As the stability approaches to "AA", molding properties are more excellent and preferable.

(2) About Motor Load and Resin Pressure

Motor load and resin pressure in the extruder of the inflation molding machine are set forth.

A smaller value indicates that the molding properties are more excellent and preferable. As the molding temperature is lowered, the motor load and the resin pressure become greater, and this is usually undesirable. If the resin pressure exceeds 500 kg/cm$^2$, molding is impossible, and this is regarded as overload.

[m11] Low Odor Property (Taste)

In a film prepared in the following "Inflation molding (single layer)", commercially available mineral water (Suntory Natural Water, available from Suntory Limited.) (200 ml) was filled to give an all-side sealed bag (20×20 cm). This bag was heated for 72 hours in a hot oven kept at 70° C., and thereafter, the bag was subjected to taste test by 5 panelists. The mineral water which tasted better than the mineral water without heat treating was given +1 point; the mineral water which tasted a little worse than the mineral water without heat treating was given 0 point; and the mineral water which tasted worse than the mineral water without heat treating was given −1 point. The evaluation was carried out based on the total point. The evaluation criteria are as follows.

AA: total point of 4 or more

BB: 2≦total point<4

CC: total point of 1 or less

As the evaluation result approaches to "AA", odor becomes lower, and therefore, this indicates that the film hardly exert evil influence on the taste of the contents and is favorable.

[m12] Hand Tear Property

In a film prepared by the molding machine and the molding conditions of the following Inflation molding (single layer), a notch of 5 mm was made in the TD direction, and the film was torn with hand by about 10 cm to carry out organoleptic evaluation.

AA: (a) The film is particularly easily torn.

BB: (b) The film is easily torn.

CC: (c) The film is torn with slight difficulty.

DD: (d) The film is torn with difficulty.

[m13] Melt Tension

Melt tension (MT) was measured by a melt tension tester manufactured by Toyo Seiki Seisaku-sho, Ltd. The measuring conditions are as follows.

Measuring Conditions

Nozzle used: L=8.000 mm, D=2.095 mm

Measuring temperature: 190° C.

Resin extrusion rate: 15 mm/min

Resin take-off rate: 24 m/min

[m14] Film Property Measuring Conditions (1) Measurement of Haze (Transparency, Unit: %)

Haze was measured in accordance with ASTM D1003. Internal haze was measured in the following manner. A film was placed in a cell filled with cyclohexanol, and thereafter, internal haze was measured using a haze meter similarly to the measurement of haze.

(2) Measurement of Elmendorf Tear Strength (Unit: N/cm)

Elmendorf tear strength was measured under the following conditions in accordance with ASTM D1922.

Using a light load tear tester (manufactured by Toyo Seiki Seisaku-sho, Ltd., provided with capacity weight B of 79 g at the left end of pendulum), a rectangular test specimen having a length of 63.5 mm (longer side) in the tear direction and a width of 50 mm (shorter side) in the direction perpendicular to the tear direction was cut out from the film, and a notch of 12.7 mm was made at the center of the shorter side from the edge. Thus, plural test specimens were prepared. Thereafter, plural test specimens were superposed upon one another so that the indicator (needle) of the tester would be held in the range of 20 to 80, and a pretest was carried out. After the number of test specimens used in the measurement was adjusted, tear test was carried out, and the tear strength (N/cm) was determined by the following formula. The measuring range (R) of the tester was 200.

$$T=(A\times0.001\times9.81\times R/100)/(t)$$

T: tear strength (N/cm)

A: value (g) indicated by indicator t: total thickness (cm) of test specimens superposed Preparation Example 1

Preparation of Solid Component (S-1)

In a reactor having an internal volume of 260 liters and equipped with a stirrer, 10 kg of silica ($SiO_2$, mean particle diameter: 12 μm) having been dried at 250° C. for 10 hours was suspended in 90.5 liters of toluene in a nitrogen atmosphere, and then the suspension was cooled down to 0 to 5° C. To this suspension, 45.5 liters of a toluene solution of methylalumoxane (3.0 mmol/ml in terms of Al atom) were added dropwise over a period of 30 minutes. During the addition, the temperature in the system was maintained at 0 to 5° C. Successively, the reaction was carried out at 0 to 5° C. for 30 minutes, then the temperature was raised up to 95 to 100° C. over a period of about 1.5 hours, and the reaction was consecutively carried out at 95 to 100° C. for 4 hours. Thereafter, the temperature was lowered down to room temperature, and the supernatant liquid was removed by decantation. The solid component thus obtained was washed with toluene twice, and then toluene was added to give a total amount of 129 liters. Thus, a toluene slurry of the solid component (S-1) was prepared. A part of the resulting solid component was withdrawn, and the concentration was examined. As a result, the slurry concentration was 137.5 g/liter, and the Al concentration was 1.1 mol/liter.

Preparation of Solid Catalyst Component (X-1), Ethylene-based Resin [R1]

In a reactor having an internal volume of 114 liters and equipped with a stirrer, 21.0 liters of toluene and 15.8 liters (2400 g in terms of solid component) of the toluene slurry of the solid component (S-1) prepared above were placed in a nitrogen atmosphere. On the other hand, in a reactor having an internal volume of 100 liters and equipped with a stirrer, 31.0 liters of toluene were placed in a nitrogen atmosphere. Then, with stirring, 10.0 liters of a toluene solution of a metallocene compound (A-1) (8.25 mmol/liter in terms of Zr atom) were introduced, and subsequently, 2.0 liters of a toluene solution of a metallocene compound (B-1) (2.17 mmol in terms of Zr atom) were introduced, followed by mixing for several minutes ((A-1)/(B-1) molar ratio=95/5). Subsequently, the mixed solution thus prepared was forcedly fed to the aforesaid reactor filled with the toluene slurry of the solid component (S-1) in advance. After the forced feeding, the reaction was carried out at an internal temperature of 20 to 25° C. for 1 hour. Thereafter, the supernatant liquid was removed by decantation. The solid catalyst component thus obtained was washed with hexane three times, and then hexane was added to give a total amount of 56 liters. Thus, a hexane slurry of the solid catalyst component (X-1) was prepared.

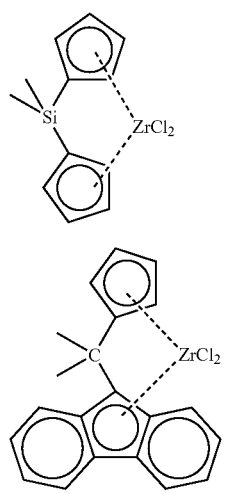

Preparation of Prepolymerized Catalyst (XP-1)

Successively, the hexane slurry of the solid catalyst component (X-1) obtained above was cooled down to 10° C., and then ethylene was continuously fed to the system for several minutes at atmospheric pressure. During the feeding, the temperature in the system was maintained at 10 to 15° C. Thereafter, 2.8 mol of triisobutylaluminum (TIBAL) and 157 ml of 1-hexene were added. After the addition of 1-hexene, ethylene was fed again at 1.8 kg/hr to initiate prepolymerization.

After 40 minutes from the initiation of prepolymerization, the temperature in the system rose up to 24° C., and thereafter, the temperature in the system was maintained at 24 to 26° C. After 70 minutes from the initiation of prepolymerization, 79.0 ml of 1-hexene was added, and also after 140 minutes, 79.0 ml of 1-hexene was added.

After 220 minutes from the initiation of prepolymerization, feed of ethylene was stopped, and the system was replaced with nitrogen to terminate prepolymerization. Thereafter, the supernatant liquid was removed by decantation. The prepolymerized catalyst thus obtained was washed with hexane six times to obtain a prepolymerized catalyst (XP-1) in which 2.87 g of a polymer was produced based on 1 g of the solid catalyst component. A part of the resulting prepolymerized catalyst component was dried, and the composition was examined. As a result, 0.72 mg of Zr atom was contained based of 1 g of the solid catalyst component.

Polymerization

In a perfect stirring-mixing type polymerization tank having an internal volume of 290 liters, preparation of an ethylene-based polymer was carried out using the above prepolymerized catalyst (XP-1).

To the polymerization tank were continuously fed so that each feed rate becomes the following; a hexane solvent at 45 l/hr, the prepolymerized catalyst (XP-1) at 0.44 mmol/hr in terms of Zr atom, triisobutylaluminum at 20.0 mmol/hr, ethylene at 6.6 kg/hr and 1-hexene at 500 g/hr. And the polymer slurry was continuously drawn out of the polymerization tank so that the amount of the solvent in the polymerization tank would become constant. Polymerization was carried out under the conditions of a total pressure of 0.8 MPa-G, a polymerization temperature of 80° C. and a residence time of 2.6 hr. From the polymer slurry continuously drawn out of the polymerization tank, unreacted ethylene was substantially removed by a flush drum. Thereafter, hexane was removed from the polymer slurry by a solvent separation device, and the polymer was dried, whereby an ethylene-based polymer was obtained at 4.4 kg/hr (see Table 1).

To the resulting ethylene-based polymer, Irganox 1076 (product of Ciba Specialty Chemicals Inc.) and Irgafos 168 (product of Ciba Specialty Chemicals Inc.) were added as heat stabilizers so that the amounts thereof would become 0.1% by weight and 0.1% by weight, respectively, and the mixture was melt kneaded by the use of a single screw extruder having a screw diameter of 65 mm (manufactured by Placo Co., Ltd.) under the conditions of a preset temperature of 180° C. and a screw rotational speed of 50 rpm. Thereafter, the resulting kneaded mixture was extruded into strands, and the strands were cut with a cutter to give pellets as test samples. The samples were subjected to physical property measurements and extrusion lamination molding. The results are set forth in Table 5 and Table 10.

Preparation Example 2 to Preparation Example 4

Polymerization

An ethylene-based polymer was obtained in the same manner as in Preparation Example 1, except that the polymerization conditions were changed to the conditions shown in Table 1 (see Table 1). Using the resulting ethylene-based polymer, test samples were prepared in the same manner as in Preparation Example 1. The samples were subjected to physical property measurements and extrusion lamination molding. The results are set forth in Table 5 and Table 10.

Preparation Example 5

Preparation of Solid Catalyst Component (X-2)

To a reactor having an internal volume of 114 liters and equipped with a stirrer, 18.6 liters of toluene and 7.9 liters (1200 g in terms of solid component) of the toluene slurry of the solid component (S-1) prepared above were added in a nitrogen atmosphere. On the other hand, in a reactor having an internal volume of 100 liters and equipped with a stirrer, 14.5 liters of toluene were placed in a nitrogen atmosphere. Then, with stirring, 5.0 liters of a toluene solution of the metallocene compound (A-1) (7.8 mmol/liter in terms of Zr atom) were introduced, and subsequently, 2.0 liters of a toluene solution of the metallocene compound (B-1) (2.17 mmol/liter in terms of Zr atom) were further introduced, followed by mixing for several minutes ((A-1)/(B-1) molar ratio=85/15).

Subsequently, the mixed solution thus prepared was forcedly fed to the aforesaid reactor filled with the toluene slurry of the solid component (S-1) in advance. After the forced feeding, the reaction was carried out at an internal temperature of 20 to 25° C. for 1 hour. Thereafter, the supernatant liquid was removed by decantation. The solid catalyst component thus obtained was washed with hexane three times, and then hexane was added to give a total amount of 30 liters. Thus, a hexane slurry of the solid catalyst component (X-2) was prepared.

Preparation of Prepolymerized Catalyst (XP-2)

Successively, the hexane slurry of the solid catalyst component (X-2) obtained above was cooled down to 10° C., and then ethylene was continuously fed to the system for several minutes at atmospheric pressure. During the feeding, the temperature in the system was maintained at 10 to 15° C. Thereafter, 1.6 mol of triisobutylaluminum and 80 ml of 1-hexene were added.

After the addition of 1-hexene, ethylene was fed again at 1.8 kg/hr to initiate prepolymerization. After 25 minutes from the initiation of prepolymerization, the temperature in the system rose up to 24° C., and thereafter, the temperature in the system was maintained at 24 to 26° C. After 35 minutes from the initiation of prepolymerization, 39.0 ml of 1-hexene was added, and also after 60 minutes, 39.0 ml of 1-hexene was added.

After 85 minutes from the initiation of prepolymerization, feed of ethylene was stopped, and the system was replaced with nitrogen to terminate prepolymerization. Thereafter, the supernatant liquid was removed by decantation. The prepolymerized catalyst thus obtained was washed with hexane four times to obtain a prepolymerized catalyst (XP-2) in which 2.93 g of a polymer was produced based on 1 g of the solid catalyst component. A part of the resulting prepolymerized catalyst component was dried, and the composition was examined. As a result, 0.72 mg of Zr atom was contained based of 1 g of the solid catalyst component.

Polymerization

An ethylene-based polymer was obtained in the same manner as in Preparation Example 1, except that the prepolymerized catalyst (XP-2) was used and the polymerization conditions were changed to the conditions shown in Table 1. Using the resulting ethylene-based polymer, test samples were prepared in the same manner as in Preparation Example 1. The samples were subjected to physical property measurements and extrusion lamination molding. The results are set forth in Table 5 and Table 10.

Preparation Example 6 to Preparation Example 8

Polymerization

An ethylene-based polymer was obtained in the same manner as in Preparation Example 5, except that the polymerization conditions were changed to the conditions shown in Table 1. Using the resulting ethylene-based polymer, test samples were prepared in the same manner as in Preparation Example 1. The samples were subjected to physical property measurements and extrusion lamination molding. The results are set forth in Table 5 and Table 10 (in Preparation Example 6, property measurements only were carried out).

Preparation Example 9

Polymerization

An ethylene-based polymer was obtained in the same manner as in Preparation Example 5, except that the polymerization conditions were changed to the conditions shown in Table 1. However, when the density of the polymer became lower than 935 kg/m$^3$, the supernatant liquid of the polymer slurry drawn out of the polymerization tank became cloudy, and after 8 hours since the density of the polymer reached 920 kg/m$^3$, the polymer and the solvent did not separate from each other, and the slurry properties were deteriorated. Therefore, the continuous operation was stopped. Using the ethylene-based polymer obtained before the operation was stopped, test samples were prepared in the same manner as in Preparation Example 1. The samples were subjected to physical property measurements and extrusion lamination molding. The results are set forth in Table 5 and Table 10.

Preparation Example 10

Preparation of Solid Component (S-2)

In a stream of nitrogen, 30 g of silica (SiO$_2$, mean particle diameter: 50 μm) having been dried at 250° C. for 10 hours was suspended in 460 ml of toluene, and then the suspension was cooled down to 0° C. To this suspension, 140 ml of a toluene solution of methylalumoxane (1.52 mmol/ml in terms of Al atom) was added dropwise over a period of 1 hour. During the addition, the temperature in the system was maintained at 0 to 2° C. Successively, the reaction was carried out at 0° C. for 30 minutes, then the temperature was raised up to 95° C. over a period of 1.5 hours, and the reaction was carried out at this temperature for 4 hours. Thereafter, the temperature was lowered down to 60° C., and the supernatant liquid was removed by decantation. The solid component thus obtained was washed with toluene three times, and then toluene was added to prepare a toluene slurry of a solid component (S-2). A part of the resulting solid component (S-2) was withdrawn, and the concentration was examined. As a result, the slurry concentration was 0.1665 g/ml, and the Al concentration was 0.697 mmol/ml.

Preparation of Solid Catalyst Component (X-3)

In a 200 ml glass flask replaced with nitrogen, 50 ml of toluene was placed, and with stirring, the toluene slurry of the solid component (S-2) (1.0 g in terms of solid part) prepared above was introduced. Next, a previously prepared mixed liquid of 11.2 ml of a toluene solution of the metallocene compound (A-1) (0.0015 mmol/ml in terms of Zr atom) and 2.8 ml of a toluene solution of the metallocene compound (B-1) (0.0015 mmol/ml in terms of Zr atom) was added dropwise, and the reaction was carried out at room temperature for 1 hour. Thereafter, the supernatant liquid was removed by decantation, and the remainder was washed with decane twice to give a decane slurry (solid catalyst component (X-3)). The mixing molar ratio of the metallocene compound (A-1) to the metallocene compound (B-1) in the preparation of the solid catalyst component was 80/20 ((A-1)/(B-1)). A part of the resulting decane slurry of the solid catalyst component (X-3) was withdrawn, and the concentration was examined. As a result, the Zr concentration was 0.037 mg/ml, and the Al concentration was 2.27 mg/ml.

Polymerization

In a SUS autoclave having an internal volume of 1 liter and thoroughly replaced with nitrogen, 500 ml of purified heptane was placed, and ethylene was flowed through to saturate the liquid phase and the gas phase with ethylene. Next, the system was replaced with a hydrogen-ethylene mixed gas (hydrogen concentration: 0.45% by volume), and thereafter, 10 ml of 1-hexene, 0.375 mmol of triisobutylaluminum and 0.01 mmol, in terms of zirconium, of the solid catalyst component (X-3) were introduced in this order. The temperature was raised to 80° C., and polymerization was carried out at 0.78 MPa-G for 90 minutes. The resulting polymer was vacuum dried for 10 hours to obtain 87.4 g of an ethylene-based polymer. The conditions for preparing the polymer obtained in Preparation Example 10 are described in Table 2.

In order to prepare test samples, to the resulting ethylene-based polymer were added Irganox 1076 (product of Ciba Specialty Chemicals Inc.) and Irgafos 168 (product of Ciba Specialty Chemicals Inc.) as heat stabilizers so that the amounts thereof would become 0.1% by weight and 0.1% by weight, respectively, and the mixture was melt kneaded by the use of a lab-plastomill, manufactured by Toyo Seiki Seisaku-sho, Ltd., at a resin temperature of 180° C. and a screw rotational speed of 50 rpm for 5 minutes. This molten polymer was cooled by the use of a press molding machine, manufactured by Shinto Metal Industries Corporation, under the conditions of a cooling temperature of 20° C., a cooling time of 5 minutes and a cooling pressure of 100 kg/cm$^2$. The samples were subjected to physical property measurements. The results are set forth in Table 6.

Preparation Example 11

Preparation of Solid Catalyst Component (X-4)

In a 200 ml glass flask replaced with nitrogen, 38.9 ml of toluene was placed, and with stirring, the toluene slurry of the solid component (S-1) (2.0 g in terms of solid part) prepared in Preparation Example 1 was introduced. Next, a previously prepared mixed liquid of 34.4 ml of a toluene solution of the metallocene compound (A-1) (0.002 mmol/ml in terms of Zr atom) and 3.6 ml of a toluene solution of the metallocene compound (B-1) (0.001 mmol/ml in terms of Zr atom) was added dropwise, and the reaction was carried out at room temperature for 1 hour. Thereafter, the supernatant liquid was removed by decantation, and the remainder was washed with decane twice to give a decane slurry (solid catalyst component (X-4)). The mixing molar ratio of the metallocene compound (A-1) to the metallocene compound (B-1) in the preparation of the solid catalyst component was 95/5 ((A-1)/(B-1)). A part of the resulting decane slurry of the solid catalyst component (X-4) was withdrawn, and the concentration was examined. As a result, the Zr concentration was 0.062 mg/ml, and the Al concentration was 3.64 mg/ml.

Polymerization

Polymerization was carried out in the same manner as in polymerization of Preparation Example 10, except that a hydrogen-ethylene mixed gas (hydrogen concentration: 0.2% by volume) and 0.0025 mmol (in terms of zirconium) of the solid catalyst component (X-4) were used. The resulting polymer was vacuum dried for 10 hours to obtain 71.1 g of an ethylene-based polymer. The conditions for preparing the polymer obtained in Preparation Example 11 were described in Table 2. Using the resulting ethylene-based polymer, test samples were prepared in the same manner as in Preparation Example 10. The samples were subjected to physical property measurements. The results are set forth in Table 6.

Preparation Example 12

Preparation of Solid Catalyst Component (X-5)

In a 200 ml glass flask replaced with nitrogen, 50 ml of toluene was placed, and with stirring, the toluene slurry of the solid component (S-1) (2.0 g in terms of solid part) prepared above was introduced. Next, a previously prepared mixed liquid of 44.0 ml of a toluene solution of the metallocene compound (A-1) (0.0015 mmol/ml in terms of Zr atom) and 1.83 ml of a toluene solution of the metallocene compound (B-1) (0.0015 mmol/ml in terms of Zr atom) was added dropwise, and the reaction was carried out at room temperature for 1 hour. Thereafter, the supernatant liquid was removed by decantation, and the remainder was washed with decane twice to give a decane slurry (solid catalyst component (X-5)). The mixing molar ratio ((A-1)/(B-1)) of the metallocene compound (A-1) to the metallocene compound (B-1) in the preparation of the solid catalyst component was 96/4. A part of the resulting decane slurry of the solid catalyst component (X-5) was withdrawn, and the concentration was examined. As a result, the Zr concentration was 0.061 mg/ml, and the Al concentration was 3.71 mg/ml.

Polymerization

Polymerization was carried out in the same manner as in polymerization of Preparation Example 10, except that a hydrogen-ethylene mixed gas (hydrogen concentration: 0.1% by volume) and 0.0025 mmol (in terms of zirconium) of the solid catalyst component (X-5) were used. The resulting polymer was vacuum dried for 10 hours to obtain 46.2 g of an ethylene-based polymer. The conditions for preparing the polymer obtained in Preparation Example 12 were described in Table 2. Using the resulting ethylene-based polymer, test samples were prepared in the same manner as in Preparation Example 10. The samples were subjected to physical property measurements. The results are set forth in Table 6.

Preparation Example 13

Polymerization was carried out in the same manner as in polymerization of Preparation Example 12, except that a hydrogen-ethylene mixed gas (hydrogen concentration: 0.2% by volume) was used. The resulting polymer was vacuum dried for 10 hours to obtain 52.2 g of an ethylene-based polymer. The conditions for preparing the polymer obtained in Preparation Example 13 were described in Table 2. Using the resulting ethylene-based polymer, test samples were prepared in the same manner as in Preparation Example 10. The samples were subjected to physical property measurements. The results are set forth in Table 6.

Preparation Example 14

Polymerization was carried out in the same manner as in polymerization of Preparation Example 12, except that a hydrogen-ethylene mixed gas (hydrogen concentration: 0.25% by volume) was used. The resulting polymer was vacuum dried for 10 hours to obtain 58.6 g of an ethylene-based polymer. The conditions for preparing the polymer obtained in Preparation Example 14 were described in Table 2. Using the resulting ethylene-based polymer, test samples were prepared in the same manner as in Preparation Example 10. The samples were subjected to physical property measurements. The results are set forth in Table 6.

Preparation Example 15

Preparation of Solid Catalyst Component (X-6)
A solid catalyst component (X-6) was prepared in the same manner as in preparation of solid catalyst component (X-5) of Preparation Example 12, except that the amount of the toluene slurry of the solid component (S-1) introduced was changed to 1.9 g in terms of solid part, and 40.3 ml of the toluene solution of the metallocene compound (A-1) (0.0015 mmol/ml in terms of Zr atom) and 5.50 ml of the toluene solution of the metallocene compound (B-1) (0.0015 mmol/ml in terms of Zr atom) were used. The mixing molar ratio ((A-1)/(B-1)) of the metallocene compound (A-1) to the metallocene compound (B-1) in the preparation of the solid catalyst component was 88/12. A part of the resulting decane slurry of the solid catalyst component (X-6) was withdrawn, and the concentration was examined. As a result, the Zr concentration was 0.059 mg/ml, and the Al concentration was 3.43 mg/ml.
Polymerization
Polymerization was carried out in the same manner as in polymerization of Preparation Example 10, except that a hydrogen-ethylene mixed gas (hydrogen concentration: 0.75% by volume) and 0.0025 mmol, in terms of zirconium, of the solid catalyst component (X-6) were used. The resulting polymer was vacuum dried for 10 hours to obtain 71.3 g of an ethylene-based polymer. The conditions for preparing the polymer obtained in Preparation Example 15 were described in Table 2. Using the resulting ethylene-based polymer, test samples were prepared in the same manner as in Preparation Example 10. The samples were subjected to physical property measurements. The results are set forth in Table 6.

Preparation Example 16

Polymerization was carried out in the same manner as in polymerization of Preparation Example 15, except that a hydrogen-ethylene mixed gas (hydrogen concentration: 0.83% by volume) was used. The resulting polymer was vacuum dried for 10 hours to obtain 65.9 g of an ethylene-based polymer. The conditions for preparing the polymer obtained in Preparation Example 16 were described in Table 2. Using the resulting ethylene-based polymer, test samples were prepared in the same manner as in Preparation Example 10. The samples were subjected to physical property measurements. The results are set forth in Table 6.

Preparation Example 17

Preparation of Solid Catalyst Component (X-7)
A solid catalyst component (X-7) was prepared in the same manner as in preparation of solid catalyst component (X-5) of Preparation Example 12, except that the amount of the toluene slurry of the solid component (S-1) introduced was changed to 1.0 g in terms of solid part, and 16.6 ml of the toluene solution of the metallocene compound (A-1) (0.002 mmol/ml in terms of Zr atom) and 2.89 ml of the toluene solution of the metallocene compound (B-1) (0.001 mmol/ml in terms of Zr atom) were used. The mixing molar ratio ((A-1)/(B-1)) of the metallocene compound (A-1) to the metallocene compound (B-1) in the preparation of the solid catalyst component was 92/8. A part of the resulting decane slurry of the solid catalyst component (X-7) was withdrawn, and the concentration was examined. As a result, the Zr concentration was 0.058 mg/ml, and the Al concentration was 3.52 mg/ml.
Polymerization
Polymerization was carried out in the same manner as in polymerization of Preparation Example 10, except that a hydrogen-ethylene mixed gas (hydrogen concentration: 0.65% by volume) was used, the amount of 1-hexene was changed to 3 ml, and 0.0026 mmol, in terms of zirconium, of the solid catalyst component (X-7) was used. The resulting polymer was vacuum dried for 10 hours to obtain 63.9 g of an ethylene-based polymer. The conditions for preparing the polymer obtained in Preparation Example 17 were described in Table 3. Using the resulting ethylene-based polymer, test samples were prepared in the same manner as in Preparation Example 10. The samples were subjected to physical property measurements. The results are set forth in Table 7.

Preparation Example 18

Preparation of Solid Catalyst Component (X-8)
A solid catalyst component (X-8) was prepared in the same manner as in preparation of solid catalyst component (X-5) of Preparation Example 12, except that 32.5 ml of the toluene solution of the metallocene compound (A-1) (0.002 mmol/ml in terms of Zr atom) and 7.23 ml of the toluene solution of the metallocene compound (B-1) (0.001 mmol/ml in terms of Zr atom) were used. The mixing molar ratio ((A-1)/(B-1)) of the metallocene compound (A-1) to the metallocene compound (B-1) in the preparation of the solid catalyst component was 90/10. A part of the resulting decane slurry of the solid catalyst component (X-8) was withdrawn, and the concentration was examined. As a result, the Zr concentration was 0.065 mg/ml, and the Al concentration was 3.77 mg/ml.
Polymerization
Polymerization was carried out in the same manner as in polymerization of Preparation Example 10, except that the polymerization temperature was changed to 70° C., a hydrogen-ethylene mixed gas (hydrogen concentration: 0.064% by volume) was used, the amount of 1-hexene was changed to 30 ml, and 0.0026 mmol, in terms of zirconium, of the solid catalyst component (X-8) was used. The resulting polymer was vacuum dried for 10 hours to obtain 92.9 g of an ethylene-based polymer. The conditions for preparing the polymer obtained in Preparation Example 18 were described in Table 3. Using the resulting ethylene-based polymer, test samples were prepared in the same manner as in Preparation Example 10. The samples were subjected to physical property measurements. The results are set forth in Table 7.

Preparation Example 19

Polymerization was carried out in the same manner as in polymerization of Preparation Example 18, except that 0.1 g of the solid catalyst component (X-7) was used. The resulting polymer was vacuum dried for 10 hours to obtain 44.5 g of an ethylene-based polymer. The conditions for preparing the polymer obtained in Preparation Example 19 were described in Table 3. Using the resulting ethylene-based polymer, test samples were prepared in the same manner as in Preparation Example 10. The samples were subjected to physical property measurements. The results are set forth in Table 7.

Preparation Example 20

Preparation of Prepolymerized Catalyst (XP-4)
In a 200 ml glass flask replaced with nitrogen, 52.7 ml of hexane was placed, and the hexane slurry of the solid catalyst component (X-4) (4.0 g in terms of solid part) prepared above was introduced. Next, the system was cooled down to 10° C., then 5.32 mmol of TIBAL and 0.535 ml of 1-hexene were added, and feed of ethylene was started at 30 l/hr at atmospheric pressure. Polymerization was carried out at 25° C. until the integrated absorption quantity of ethylene by the solid catalyst component became 10.3 liters, and after the polymerization was completed, the system was replaced with nitrogen. Thus, prepolymerizaion was completed. Thereafter, the supernatant liquid was removed by decantation, and the remainder was washed with decane three times to give a decane slurry. Thus, a prepolymerized catalyst (XP-4) was prepared. A part of the resulting decane slurry of the prepolymerized catalyst (XP-4) was withdrawn, and the concentration was examined. As a result, the Zr concentration was 0.067 mg/ml, and the Al concentration was 4.77 mg/ml.

Polymerization

Polymerization was carried out in the same manner as in polymerization of Preparation Example 10, except that the polymerization temperature was changed to 70° C., an ethylene gas was used, the amount of 1-hexene was changed to 30 ml, and 0.0026 mmol, in terms of zirconium, of the prepolymerized catalyst (XP-4) was used. The resulting polymer was vacuum dried for 10 hours to obtain 60.8 g of an ethylene-based polymer. The conditions for preparing the polymer obtained in Preparation Example 20 were described in Table 3. Using the resulting ethylene-based polymer, test samples were prepared in the same manner as in Preparation Example 10. The samples were subjected to physical property measurements. The results are set forth in Table 7.

Preparation Example 21

Preparation of Prepolymerized Catalyst (XP-9)

A solid catalyst component (X-9) was prepared in the same manner as in preparation of solid catalyst component (X-5) of Preparation Example 12, except that 14.5 ml of the toluene solution of the metallocene compound (A-1) (0.004 mmol/ml in terms of Zr atom) and 7.23 ml of the toluene solution of the metallocene compound (B-1) (0.002 mmol/ml in terms of Zr atom) were used. The mixing molar ratio ((A-1)/(B-1)) of the metallocene compound (A-1) to the metallocene compound (B-1) in the preparation of the solid catalyst component was 80/20. Successively, a decane slurry of a prepolymerized catalyst (XP-9) was prepared in the same manner as in preparation of prepolymerized catalyst (XP-4) of Preparation Example 20. A part of the resulting decane slurry of the prepolymerized catalyst (XP-9) was withdrawn, and the concentration was examined. As a result, the Zr concentration was 0.062 mg/ml, and the Al concentration was 4.16 mg/ml.

Polymerization

Polymerization was carried out in the same manner as in polymerization of Preparation Example 10, except that the polymerization temperature was changed to 50° C., an ethylene gas was used, the amount of 1-hexene was changed to 50 ml, and 0.0012 mmol (in terms of zirconium) of the prepolymerized catalyst (XP-9) was used. The resulting polymer was vacuum dried for 10 hours to obtain 25.6 g of an ethylene-based polymer. The conditions for preparing the polymer obtained in Preparation Example 21 were described in Table 3. Using the resulting ethylene-based polymer, test samples were prepared in the same manner as in Preparation Example 10. The samples were subjected to physical property measurements. The results are set forth in Table 7.

Preparation Example 22

Preparation of Prepolymerized Catalyst (XP-10)

A solid catalyst component (X-10) was prepared in the same manner as in preparation of solid catalyst component (X-5) of Preparation Example 12, except that 12.7 ml of the toluene solution of the metallocene compound (A-1) (0.004 mmol/ml in terms of Zr atom) and 10.8 ml of the toluene solution of the metallocene compound (B-1) (0.002 mmol/ml in terms of Zr atom) were used. The mixing molar ratio ((A-1)/(B-1)) of the metallocene compound (A-1) to the metallocene compound (B-1) in the preparation of the solid catalyst component was 70/30. Successively, a decane slurry of a prepolymerized catalyst (XP-10) was prepared in the same manner as in preparation of prepolymerized catalyst (XP-4) of Preparation Example 20. A part of the resulting decane slurry of the prepolymerized catalyst (XP-10) was withdrawn, and the concentration was examined. As a result, the Zr concentration was 0.060 mg/ml, and the Al concentration was 4.12 mg/ml.

Polymerization

Polymerization was carried out in the same manner as in polymerization of Preparation Example 10, except that the polymerization temperature was changed to 50° C., an ethylene gas was used, the amount of 1-hexene was changed to 50 ml, and 0.002 mmol, in terms of zirconium, of the prepolymerized catalyst (XP-10) was used. The resulting polymer was vacuum dried for 10 hours to obtain 56.6 g of an ethylene-based polymer. The conditions for preparing the polymer obtained in Preparation Example 22 were described in Table 3. Using the resulting ethylene-based polymer, test samples were prepared in the same manner as in Preparation Example 10. The samples were subjected to physical property measurements. The results are set forth in Table 7.

Preparation Example 23

Polymerization was carried out in the same manner as in polymerization of Preparation Example 22, except that the amount of 1-hexene was changed to 40 ml. The resulting polymer was vacuum dried for 10 hours to obtain 50.3 g of an ethylene-based polymer.

The conditions for preparing the polymer obtained in Preparation Example 23 were described in Table 3. Using the resulting ethylene-based polymer, test samples were prepared in the same manner as in Preparation Example 10. The samples were subjected to physical property measurements. The results are set forth in Table 7.

Preparation Example 24

Preparation of Prepolymerized Catalyst (XP-11)

A solid catalyst component (X-11) was prepared in the same manner as in preparation of solid catalyst component (X-5) of Preparation Example 12, except that 18.1 ml of the toluene solution of the metallocene compound (A-1) (0.004 mmol/ml in terms of Zr atom) only was used. Successively, a decane slurry of a prepolymerized catalyst (XP-11) was prepared in the same manner as in preparation of prepolymerized catalyst (XP-4) of Preparation Example 20. A part of the resulting decane slurry of the prepolymerized catalyst (XP-11) was withdrawn, and the concentration was examined. As a result, the Zr concentration was 0.065 mg/ml, and the Al concentration was 5.46 mg/ml.

Preparation of Prepolymerized Catalyst (XP-12)

A solid catalyst component (X-12) was prepared in the same manner as in preparation of solid catalyst component (X-5) of Preparation Example 12, except that 18.1 ml of the toluene solution of the metallocene compound (B-1) (0.004 mmol/ml in terms of Zr atom) only was used. Successively, a decane slurry of a prepolymerized catalyst (XP-12) was prepared in the same manner as in preparation of prepolymerized catalyst (XP-4) of Preparation Example 20. A part of the resulting decane slurry of the prepolymerized catalyst (XP-12) was withdrawn, and the concentration was examined. As a result, the Zr concentration was 0.063 mg/ml, and the Al concentration was 3.72 mg/ml.

Polymerization

In a SUS autoclave having an internal volume of 1 liter and thoroughly replaced with nitrogen, 500 ml of purified heptane was placed, and ethylene was flowed through to saturate the liquid phase and the gas phase with ethylene. Next, the system was replaced with a hydrogen-ethylene mixed gas (hydrogen concentration: 0.20% by volume). Thereafter, 3 ml of 1-hexene and 0.375 mmol of triisobutylaluminum were added, and further, 0.0025 mmol, in terms of zirconium, of the prepolymerized catalyst (XP-11) and 0.00028 mmol, in terms of zirconium, of the prepolymerized catalyst (XP-12) were introduced (prepolymerized catalyst (XP-11)/prepolymerized catalyst (XP-12) molar ratio in terms of zirconium=90/10). The temperature was raised to 80° C., and polymerization was carried out at 0.78 MPa-G for 90 minutes. The resulting polymer was vacuum dried for 10 hours to obtain 55.3 g of an ethylene-based polymer. The conditions for preparing the polymer obtained in Preparation Example 24 were described in Table 3. Using the resulting ethylene-based polymer, test samples were prepared in the same manner as in Preparation Example 10. The samples were subjected to physical property measurements. The results are set forth in Table 7.

Preparation Example 25

Polymerization was carried out in the same manner as in polymerization of Preparation Example 24, except that the polymerization temperature was changed to 70° C., an ethylene gas was used, and the amount of 1-hexene was changed to 30 ml. The resulting polymer was vacuum dried for 10 hours to obtain 76.8 g of an ethylene-based polymer. The conditions for preparing the polymer obtained in Preparation Example 25 are described in Table 4. Using the resulting ethylene-based polymer, test samples were prepared in the same manner as in Preparation Example 10. The samples were subjected to physical property measurements. The results are set forth in Table 8.

Preparation Example 26

Polymerization was carried out in the same manner as in polymerization of Preparation Example 25, except that a hydrogen-ethylene mixed gas (hydrogen concentration: 0.20% by volume) was used instead of the ethylene gas. The resulting polymer was vacuum dried for 10 hours to obtain 62.8 g of an ethylene-based polymer. The conditions for preparing the polymer obtained in Preparation Example 26 were described in Table 4. Using the resulting ethylene-based polymer, test samples were prepared in the same manner as in Preparation Example 10. The samples were subjected to physical property measurements. The results are set forth in Table 8.

Preparation Example 27

Polymerization was carried out in the same manner as in polymerization of Preparation Example 25, except that a hydrogen-ethylene mixed gas (hydrogen concentration: 0.31% by volume) was used instead of the ethylene gas. The resulting polymer was vacuum dried for 10 hours to obtain 72.3 g of an ethylene-based polymer. The conditions for preparing the polymer obtained in Preparation Example 27 were described in Table 4. Using the resulting ethylene-based polymer, test samples were prepared in the same manner as in Preparation Example 10. The samples were subjected to physical property measurements. The results are set forth in Table 8.

Preparation Example 28

In a SUS autoclave having an internal volume of 1 liter and thoroughly replaced with nitrogen, 500 ml of purified heptane was placed, and ethylene was flowed through to replace the system with ethylene. Next, 30 ml of 1-hexene and 0.375 mmol of triisobutylaluminum were added, and further, 0.00238 mmol (in terms of zirconium) of the prepolymerized catalyst (XP-11) and 0.00013 mmol (in terms of zirconium) of the prepolymerized catalyst (XP-12) were introduced (prepolymerized catalyst (XP-11)/prepolymerized catalyst (XP-12) molar ratio in terms of zirconium=95/5). The temperature was raised to 70° C., and polymerization was carried out at 0.78 MPa-G for 90 minutes. The resulting polymer was vacuum dried for 10 hours to obtain 60.9 g of an ethylene-based polymer. The conditions for preparing the polymer obtained in Preparation Example 28 were described in Table 4. Using the resulting ethylene-based polymer, test samples were prepared in the same manner as in Preparation Example 10. The samples were subjected to physical property measurements. The results are set forth in Table 8.

Preparation Example 29

Preparation of Solid Catalyst Component (X-13)

In a 200 ml glass flask replaced with nitrogen, 50 ml of toluene was placed, and with stirring, the toluene slurry of the solid component (S-2) (2.0 g in terms of solid part) prepared above was introduced. Next, a previously prepared mixed liquid of 37.6 ml of a toluene solution of the metallocene compound (A-1) (0.001 mmol/ml in terms of Zr atom) and 4.18 ml of a toluene solution of a metallocene compound (B-2) (0.001 mmol/ml in terms of Zr atom) was added dropwise, and the reaction was carried out at room temperature for 1 hour. Thereafter, the supernatant liquid was removed by decantation, and the remainder was washed with decane twice to give a decane slurry (solid catalyst component (X-13)). The mixing molar ratio ((A-1)/(B-2)) of the metallocene compound (A-1) to the metallocene compound (B-2) in the preparation of the solid catalyst component was 90/10.

A part of the resulting decane slurry of the solid catalyst component (X-13) was withdrawn, and the concentration was examined. As a result, the Zr concentration was 0.035 mg/ml, and the Al concentration was 2.46 mg/ml.

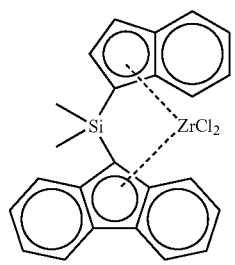

(B-2)

Polymerization

Polymerization was carried out in the same manner as in polymerization of Preparation Example 10, except that a hydrogen-ethylene mixed gas (hydrogen concentration: 0.31% by volume) and 0.003 mmol, in terms of zirconium, of the solid catalyst component (X-13) were used. The resulting polymer was vacuum dried for 10 hours to obtain 38.4 g of an ethylene-based polymer. The conditions for preparing the polymer obtained in Preparation Example 29 were described in Table 4. Using the resulting ethylene-based polymer, test samples were prepared in the same manner as in Preparation Example 10. The samples were subjected to physical property measurements. The results are set forth in Table 8.

Preparation Example 30

Preparation of Solid Catalyst Component (X-14)

In a 200 ml glass flask replaced with nitrogen, 50 ml of toluene was placed, and with stirring, the toluene slurry of the solid component (S-2) (1.0 g in terms of solid part) prepared above was introduced. Next, a previously prepared mixed liquid of 2.25 ml of a toluene solution of a metallocene compound (A-2) (0.002 mmol/ml in terms of Zr atom) and 9.01 ml of a toluene solution of the metallocene compound (B-1) (0.002 mmol/ml in terms of Zr atom) was added dropwise, and the reaction was carried out at room temperature for 1 hour. Thereafter, the supernatant liquid was removed by decantation, and the remainder was washed with decane twice to give a decane slurry (solid catalyst component (X-14)). The mixing molar ratio ((A-2)/(B-1)) of the metallocene compound (A-2) to the metallocene compound (B-1) in the preparation of the solid catalyst component was 20/80. A part of the resulting decane slurry of the solid catalyst component (X-14) was withdrawn, and the concentration was examined. As a result, the Zr concentration was 0.015 mg/ml, and the Al concentration was 1.27 mg/ml.

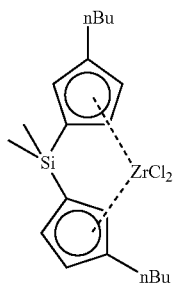

(A-2)

Polymerization

Polymerization was carried out in the same manner as in polymerization of Preparation Example 10, except that an ethylene gas was used, the polymerization temperature was changed to 70° C., and 0.0005 mmol, in terms of zirconium of the solid catalyst component (X-14) was used. The resulting polymer was vacuum dried for 10 hours to obtain 72.0 g of an ethylene-based polymer. The conditions for preparing the polymer obtained in Preparation Example 30 were described in Table 4. Using the resulting ethylene-based polymer, test samples were prepared in the same manner as in Preparation Example 10. The samples were subjected to physical property measurements. The results are set forth in Table 8.

Preparation Example 31

Preparation of Solid Catalyst Component (X-15)

In a 200 ml glass flask replaced with nitrogen, 50 ml of toluene was placed, and with stirring, the toluene slurry of the solid component (S-2) (1.0 g in terms of solid part) prepared above was introduced. Next, a previously prepared mixed liquid of 4.18 ml of a toluene solution of a transition metal compound (A-3) (0.001 mmol/ml in terms of Zr atom) and 11.15 ml of a toluene solution of the metallocene compound (B-1) (0.0015 mmol/ml in terms of Zr atom) was added dropwise, and the reaction was carried out at room temperature for 1 hour. Thereafter, the supernatant liquid was removed by decantation, and the remainder was washed with decane twice to give a decane slurry (solid catalyst component (X-15)). The mixing molar ratio ((A-3)/(B-1)) of the transition metal compound (A-3) to the metallocene compound (B-1) in the preparation of the solid catalyst component was 20/80. A part of the resulting decane slurry of the solid-catalyst component (X-15) was withdrawn, and the concentration was examined. As a result, the Zr concentration was 0.034 mg/ml, and the Al concentration was 2.17 mg/ml.

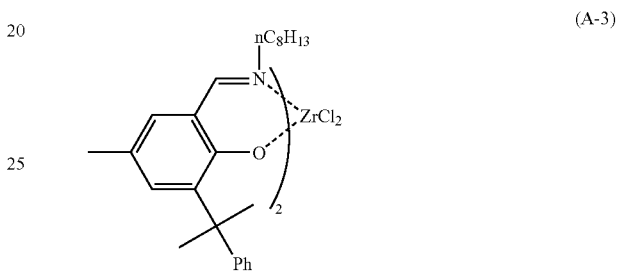

(A-3)

Polymerization

Polymerization was carried out in the same manner as in polymerization of Preparation Example 10, except that a hydrogen-ethylene mixed gas (hydrogen concentration: 0.02% by volume) and 0.001 mmol, in terms of zirconium, of the solid catalyst component (X-15) were used. The resulting polymer was vacuum dried for 10 hours to obtain 67.7 g of an ethylene-based polymer. The conditions for preparing the polymer obtained in Preparation Example 31 were described in Table 4. Using the resulting ethylene-based polymer, test samples were prepared in the same manner as in Preparation Example 10. The samples were subjected to physical property measurements. The results are set forth in Table 8.

Comparative Preparation Example 1

Product pellets of a commercially available ethylene/4-methyl-1-pentene copolymer (trade name: Ultozex 20100J), which is available from Prime Polymer Co., Ltd. and is prepared by a solution polymerization process were used as test samples, and the test samples were subjected to physical property evaluation and extrusion lamination molding. The results are set forth in Table 9 and Table 10.

Regarding MT/η*, Comparative Preparation Example 1 does not meet the requirement described in claim 1. On this account, this comparative preparation example has larger neck-in than that of the preparation examples.

Comparative Preparation Example 2

Product pellets of a commercially available polyethylene (trade name: Mirason 11), which is available from Prime Polymer Co., Ltd. and is prepared by a high-pressure radical polymerization process were used as test samples, and the test samples were subjected to physical property evaluation and extrusion lamination molding. The results are set forth in Table 9 and Table 10.

Regarding the sum of the number (M+E) of methyl branches and the number of ethyl branches, Comparative Preparation Example 2 does not meet the requirement described in claim 1. On this account, this comparative preparation example is inferior to the preparation examples in heat-sealing strength.

Comparative Preparation Example 3

Preparation of Solid Component (S-3)

In a reactor having an internal volume of 180 liters and equipped with a stirrer, 10 kg of silica ($SiO_2$) having been dried at 250° C. for 10 hours was suspended in 77 liters of toluene in a nitrogen atmosphere, and then the suspension was cooled down to 0 to 5° C. To this suspension, 39.5 liters of a toluene solution of methylalumoxane (1.79 mmol/ml in terms of Al atom) were added dropwise over a period of 1 hour. During the addition, the temperature in the system was maintained at 0 to 5° C. Successively, the reaction was carried out at 0 to 5° C. for 30 minutes, then the temperature was raised up to 95 to 100° C. over a period of 1.5 hours, and the reaction was carried out at this temperature for 4 hours. Thereafter, the temperature was lowered down to 55 to 60° C., and the supernatant liquid was removed by decantation. The solid component thus obtained was washed with toluene four times, and then toluene was added to give a total amount of 166.3 liters. Thus, a toluene slurry of a solid component (S-3) was prepared. A part of the resulting solid component (S-3) was withdrawn, and the concentration was examined. As a result, the slurry concentration was 84.6 g/liter, and the Al concentration was 0.422 mol/liter.

Preparation of Solid Catalyst Component (X-16)

Next, in a reactor having an internal volume of 114 liters and equipped with a stirrer, 11.8 liters (1000 g in terms of solid component) of the toluene slurry of the solid component (S-3) prepared above were placed in a nitrogen atmosphere, then with stirring, 14.7 liters of a toluene solution of ethylenebis(indenyl)zirconium dichloride (0.0017 mmol/ml in terms of Zr atom) were added dropwise at 78 to 80° C. over a period of 30 minutes, and the reaction was carried out at this temperature for 2 hours. Thereafter, the supernatant liquid was removed, and the remainder was washed with hexane twice. Then, hexane was added to give a total amount of 25 liters. Thus, a hexane slurry of a solid catalyst component (X-16) was prepared.

Preparation of Prepolymerized Catalyst (XP-16)

The hexane slurry of the solid catalyst component (X-16) obtained above was cooled down to 5° C., and then ethylene was continuously fed to the system at atmospheric pressure. During the feeding, the temperature in the system was maintained at 10 to 15° C. Thereafter, 1.9 liters of a hexane solution of triisobutylaluminum (40.0 mmol/l in terms of Al atom) and 65.3 ml of 1-hexene were added to initiate prepolymerization. After 1 hour, the temperature in the system rose up to 35° C., and thereafter, the temperature in the system was maintained at 34 to 35° C. After 70 minutes from the initiation of prepolymerization, 65.3 ml of 1-hexene was added again.

After 4 hours from the initiation of prepolymerization, the system was replaced with nitrogen to terminate prepolymerization. Then, the supernatant liquid was removed, and the remainder was washed with hexane four times to obtain a prepolymerized catalyst (XP-16) in which 3 g of a polymer was produced based on 1 g of the solid catalyst component (X-16). Thereafter, the temperature in the system was raised up to 34 to 35° C., and 10 liters of a hexane solution of Emargen 108 (polyoxyethylene lauryl ether product of Kao Corporation) (Emargen concentration: 1.9 g/liter) were added. The mixture was stirred at this temperature for 2 hours to obtain a prepolymerized catalyst (XPV-16) in which Emargen was supported on the prepolymerized catalyst (XP-16).

Polymerization

Using a continuous fluidized bed gas phase polymerization apparatus, copolymerization of ethylene and 1-hexene was carried out under the conditions of a total pressure of 2.0 MPa-G, a polymerization temperature of 70° C. and a gas linear velocity of 0.8 m/sec. The prepolymerized catalyst (XPV-16) prepared above was dried and continuously fed at 25 to 30 g/hr. In order to maintain the gas composition constant during the polymerization, ethylene, 1-hexene, hydrogen and nitrogen were continuously fed (gas composition: 1-hexene/ethylene=1.1 to $1.3 \times 10^{-2}$, ethylene concentration=71.4%). The yield of the resulting ethylene-based polymer was 5.3 kg/hr.

Using the resulting ethylene-based polymer, test samples were prepared in the same manner as in Preparation Example 1. The samples were subjected to physical property measurements and extrusion lamination molding. The results are set forth in Table 9 and Table 10.

Regarding MT/η*, Comparative Preparation Example 3 does not meet the requirement described in claim 1. On this account, this comparative preparation example has larger neck-in than that of the preparation examples. Further, regarding the relationship between the zero shear viscosity ($\eta_0$) and the weight-average molecular weight (Mw), Comparative Preparation Example 3 does not meet the requirement described in claim 1. On this account, this comparative preparation example suffers occurrence of take-off surge unlike the preparation examples.

Comparative Preparation Example 4

Preparation of Solid Catalyst Component (X-17)

In a 200 ml glass flask replaced with nitrogen, 100 ml of toluene was placed and stirred. Then, the toluene slurry of the solid component (S-3) (2.0 g in terms of solid part) prepared above was introduced. Next, 32.1 ml of a toluene solution of $Me_2Si(Ind)_2ZrCl_2$ (component A) (0.0015 mmol/ml in terms of Zr atom) was added dropwise, and the reaction was carried out at room temperature for 1 hour. Thereafter, the supernatant liquid was removed by decantation, and the remainder was washed with decane twice to give 100 ml of a decane slurry (solid catalyst component (X-17)). A part of the resulting solid catalyst component (X-17) was withdrawn, and the concentration was examined. As a result, the Zr concentration was 0.043 mg/ml, and the Al concentration was 2.49 mg/ml.

Polymerization

In a SUS autoclave having an internal volume of 1 liter and thoroughly replaced with nitrogen, 500 ml of purified heptane was placed, and ethylene was flowed through to saturate the liquid phase and the gas phase with ethylene. Next, the system was replaced with a hydrogen-ethylene mixed gas (hydrogen concentration: 0.54% by volume). Thereafter, 15 ml of 1-hexene, 0.375 mmol of triisobutylaluminum and 0.5 g of the solid catalyst component (X-17) were introduced in this order. The temperature was raised to 80° C., and polymerization was carried out at 0.78 MPa-G for 90 minutes. The resulting polymer was vacuum dried for 10 hours to obtain 86.7 g of an ethylene-based polymer.

Using the resulting ethylene-based polymer, test samples were prepared in the same manner as in Preparation Example 10. The samples were subjected to physical property measurements. The results are set forth in Table 9.

Comparative Preparation Example 5

Product pellets of a commercially available ethylene/1-octene copolymer (trade name: Affinity PF-1140), which is available from Dow Chemical Company and is prepared by a solution polymerization process, were used as test samples, and the test samples were subjected to physical property evaluation. The results are set forth in Table 9.

Regarding MT/η*, Comparative Preparation Examples 4 and 5 do not meet the requirement described in claim 1. On this account, it is presumed that these comparative preparation examples have larger neck-in than that of the preparation examples. Further, regarding the relationship between the zero shear viscosity ($\eta_0$) and the weight-average molecular weight (Mw), Comparative Preparation Examples 4 and 5 do not meet the requirement described in claim 1. On this account, it is presumed that these comparative preparation examples suffer occurrence of take-off surge unlike the preparation examples.

TABLE 1

| | | | Preparation Example No. | | | | | | | |
|---|---|---|---|---|---|---|---|---|---|---|
| | | | 1 | 2 | 3 | 4 | 5 | 6 | 7 | 8 | 9 |
| | Solid catalyst *1 | | XP-1 | XP-1 | XP-1 | XP-1 | XP-2 | XP-2 | XP-2 | XP-2 | XP-2 |
| | Component (A) *1 | | A-1 | A-1 | A-1 | A-1 | A-1 | A-1 | A-1 | A-1 | A-1 |
| | Component (B) *1 | | B-1 | B-1 | B-1 | B-1 | B-1 | B-1 | B-1 | B-1 | B-1 |
| | Component (A)/Component (B) | molar ratio | 95/5 | 95/5 | 95/5 | 95/5 | 85/15 | 85/15 | 85/15 | 85/15 | 85/15 |
| Polymerization conditions | Catalytic amount | mmol/hr | 0.44 | 0.32 | 0.32 | 0.29 | 0.36 | 0.26 | 0.13 | 0.14 | 0.1 |
| | Ethylene | kg/hr | 6.6 | 8 | 8 | 8 | 8 | 5 | 5 | 5 | 5 |
| | TIBAL | mmol/hr | 20 | 20 | 20 | 20 | 20 | 20 | 20 | 20 | 20 |
| | 1-Hexene | g/hr | 500 | 650 | 700 | 1100 | 650 | 450 | 900 | 450 | 1900 |
| | Polymerization temperature | °C. | 80 | 80 | 80 | 80 | 80 | 80 | 80 | 80 | 65 |
| | Polymerization pressure | MPa-G | 0.8 | 0.8 | 0.8 | 0.8 | 0.8 | 0.8 | 1 | 1 | 1 |
| | Residence time | hr | 2.6 | 2.5 | 2.5 | 2.5 | 2.5 | 2.7 | 2.7 | 2.7 | 2.7 |
| | Gas phase H/E | molar ratio | — | — | — | — | 0.0065 | 0.02 | 0.008 | 0.002 | 0.015 |
| Yield of polymer (kg/hr) | | | 4.4 | 5.9 | 5.6 | 6.2 | 5.5 | 3.1 | 3 | 3.3 | 3.1 |

*1: The symbols described in the working examples were used as they were.

TABLE 2

| | | | Preparation Example No. | | | | | | |
|---|---|---|---|---|---|---|---|---|---|
| | | | 10 | 11 | 12 | 13 | 14 | 15 | 16 |
| | Solid catalyst *1 | | X-3 | X-4 | X-5 | X-5 | X-5 | X-6 | X-6 |
| | Component (A) *1 | | A-1 | A-1 | A-1 | A-1 | A-1 | A-1 | A-1 |
| | Component (B) *1 | | B-1 | B-1 | B-1 | B-1 | B-1 | B-1 | B-1 |
| | Component (A)/Component (B) | molar ratio | 80/20 | 95/5 | 96/4 | 96/4 | 96/4 | 88/12 | 88/12 |
| Polymerization conditions | Catalytic amount | mmol | 0.01 | 0.0025 | 0.0025 | 0.0025 | 0.0025 | 0.0025 | 0.0025 |
| | $H_2$ concentration | vol % | 0.45 | 0.2 | 0.1 | 0.2 | 0.25 | 0.75 | 0.83 |
| | 1-Hexene | ml | 10 | 10 | 10 | 10 | 10 | 10 | 10 |
| | Polymerization temperature | °C. | 80 | 80 | 80 | 80 | 80 | 80 | 80 |
| | Polymerization pressure | MPa-G | 0.78 | 0.78 | 0.78 | 0.78 | 0.78 | 0.78 | 0.78 |
| | Polymerization time | min. | 90 | 90 | 90 | 90 | 90 | 90 | 90 |
| Yield of polymer | | g | 87.4 | 71.4 | 46.2 | 52.2 | 58.6 | 71.3 | 65.9 |

*1: The symbols described in the working examples were used as they were.

TABLE 3

| | | | Preparation Example No. | | | | | | | |
|---|---|---|---|---|---|---|---|---|---|---|
| | | | 17 | 18 | 19 | 20 | 21 | 22 | 23 | 24 |
| | Solid catalyst *1 | | X-7 | X-8 | X-7 | XP-4 | XP-9 | XP-10 | XP-10 | XP-11/XP-12 |
| | Component (A) *1 | | A-1 | A-1 | A-1 | A-1 | A-1 | A-1 | A-1 | A-1 |
| | Component (B) *1 | | B-1 | B-1 | B-1 | B-1 | B-1 | B-1 | B-1 | B-1 |
| | Component (A)/Component (B) | molar ratio | 92/8 | 90/10 | 92/8 | 95/5 | 80/20 | 70/30 | 70/30 | 90/10 |
| Polymerization conditions | Catalytic amount | mmol | 0.0026 | 0.0026 | 0.0031 | 0.0026 | 0.0012 | 0.002 | 0.002 | 0.0028 |
| | $H_2$ concentration | vol % | 0.65 | 0.064 | 0.064 | 0 | 0 | 0 | 0 | 0.2 |
| | 1-Hexene | ml | 3 | 30 | 30 | 30 | 50 | 50 | 40 | 3 |
| | Polymerization temperature | °C. | 80 | 70 | 70 | 70 | 50 | 50 | 50 | 80 |
| | Polymerization pressure | MPa-G | 0.78 | 0.78 | 0.78 | 0.78 | 0.78 | 0.78 | 0.78 | 0.78 |

TABLE 3-continued

|  |  | Preparation Example No. | | | | | | | |
| --- | --- | --- | --- | --- | --- | --- | --- | --- | --- |
|  |  | 17 | 18 | 19 | 20 | 21 | 22 | 23 | 24 |
| Polymerization time | min | 90 | 90 | 90 | 90 | 90 | 90 | 90 | 90 |
| Yield of polymer | g | 63.9 | 92.9 | 44.5 | 60.8 | 25.6 | 56.6 | 50.3 | 55.3 |

*1: The symbols described in the working examples were used as they were.

TABLE 4

|  |  |  | Preparation Example No. | | | | | | |
| --- | --- | --- | --- | --- | --- | --- | --- | --- | --- |
|  |  |  | 25 | 26 | 27 | 28 | 29 | 30 | 31 |
|  | Solid catalyst *1 |  | XP-11/XP-12 | XP-11/XP-12 | XP-11/XP-12 | XP-11/XP-12 | XP-13 | XP-14 | XP-15 |
|  | Component (A) *1 |  | A-1 | A-1 | A-1 | A-1 | A-1 | A-2 | A-3 |
|  | Component (B) *1 |  | B-1 | B-1 | B-1 | B-1 | B-2 | B-1 | B-1 |
|  | Component (A)/Component (B) | molar ratio | 90/10 | 90/10 | 90/10 | 95/5 | 90/10 | 20/80 | 20/80 |
| Polymerization conditions | Catalytic amount | mmol | 0.0028 | 0.0028 | 0.0028 | 0.0025 | 0.003 | 0.0005 | 0.001 |
|  | $H_2$ concentration | vol % | 0 | 0.2 | 0.31 | 0 | 0.31 | 0 | 0.02 |
|  | 1-Hexene | ml | 30 | 30 | 30 | 30 | 10 | 30 | 10 |
|  | Polymerization temperature | °C. | 70 | 70 | 70 | 70 | 80 | 70 | 80 |
|  | Polymerization pressure | MPa-G | 0.78 | 0.78 | 0.78 | 0.78 | 0.78 | 0.78 | 0.78 |
|  | Polymerization time | min. | 90 | 90 | 90 | 90 | 90 | 90 | 90 |
| Yield of polymer | | g | 76.8 | 62.8 | 72.3 | 60.9 | 38.4 | 72 | 67.7 |

*1: The symbols described in the working examples were used as they were.

TABLE 5

|  |  | Preparation Example No. | | | | | | | | |
| --- | --- | --- | --- | --- | --- | --- | --- | --- | --- | --- |
|  |  | 1 | 2 | 3 | 4 | 5 | 6 | 7 | 8 | 9 |
| Type of comonomer |  | 1-Hexene | 1-Hexene | 1-Hexene | 1-Hexene | 1-Hexene | 1-Hexene | 1-Hexene | 1-Hexene | 1-Hexene |
| MFR | g/10 min | 24.7 | 33.0 | 32.0 | 31.0 | 12.2 | 27.4 | 10.7 | 5.1 | 11.5 |
| Density | kg/m$^3$ | 947 | 943 | 941 | 937 | 941 | 946 | 937 | 942 | 920 |
| [η] | dl/g | 1.09 | 1.01 | 0.98 | 0.95 | 1.10 | 0.82 | 1.08 | 1.45 | 1.09 |
| MT | g | 1.07 | 0.99 | 1.00 | 0.98 | 2.21 | 0.86 | 2.47 | 4.24 | 2.52 |
| η* | P | 3,760 | 2,360 | 2,500 | 3,150 | 9,700 | 4,340 | 11,830 | 23,300 | 11,200 |
| (MT/η*) × 10$^4$ | g/P | 2.84 | 4.19 | 4.02 | 3.11 | 2.28 | 1.98 | 2.08 | 1.82 | 2.25 |
| M + E *1 | /1000 C. | 0.6 | 0.6 | 0.7 | 0.4 | 0.5 | 0.5 | 0.6 | 0.6 | 0.4 |
| η$_0$ | P | 5,200 | 3,110 | 3,240 | 3,900 | 19,100 | 5,880 | 28,800 | 64,100 | 24,300 |
| GPC Mn |  | 15,000 | 13,500 | 13,200 | 12,500 | 11,200 | 8,770 | 11,400 | 16,800 | 11,300 |
| Mw |  | 124,000 | 119,000 | 117,000 | 110,000 | 140,000 | 91,300 | 142,000 | 173,000 | 141,000 |
| Mz |  | 1,130,000 | 1,410,000 | 1,190,000 | 1,060,000 | 1,240,000 | 738,000 | 1,280,000 | 1,430,000 | 1,250,000.00 |
| Mw/Mn |  | 8.29 | 8.83 | 8.87 | 8.81 | 12.50 | 10.41 | 12.49 | 10.31 | 12.48 |
| Mz/Mw |  | 9.09 | 11.83 | 10.18 | 9.61 | 8.86 | 8.09 | 8.99 | 8.27 | 8.87 |
| *2 |  | 93,500 | 81,300 | 76,700 | 62,200 | 141,000 | 33,000 | 148,200 | 290,100 | 144,700 |
| *3 |  | 210 | 180 | 170 | 140 | 310 | 70 | 330 | 640 | 320 |

*1: sum of Me branches and Et branches, minimum limit of detection (0.02/1000 C.)
*2: value of $4.5 \times 10^{-13} \times Mw^{3.4}$
*3: value of $0.01 \times 10^{-13} \times Mw^{3.4}$

TABLE 6

|  |  | Preparation Example No. | | | | | | |
| --- | --- | --- | --- | --- | --- | --- | --- | --- |
|  |  | 10 | 11 | 12 | 13 | 14 | 15 | 16 |
| Type of comonomer |  | 1-Hexene | 1-Hexene | 1-Hexene | 1-Hexene | 1-Hexene | 1-Hexene | 1-Hexene |
| MFR | g/10 min | 26.3 | 1.8 | 4.8 | 11.5 | 19.1 | 10.9 | 16.6 |
| Density | kg/m$^3$ | 949 | 940 | 941 | 941 | 944 | 940 | 941 |
| [η] | dl/g | 0.91 | 1.36 | 1.27 | 1.12 | 1.01 | 1.07 | 0.99 |

TABLE 6-continued

| | | \multicolumn{7}{c}{Preparation Example No.} |
|---|---|---|---|---|---|---|---|---|
| | | 10 | 11 | 12 | 13 | 14 | 15 | 16 |
| MT | g | 1.80 | 14.50 | 9.10 | 5.15 | 3.10 | 2.42 | 1.69 |
| $\eta^*$ | P | 6,290 | 43,160 | 20,100 | 11,040 | 7,100 | 10,920 | 8,270 |
| $(MT/\eta^*) \times 10^4$ | g/P | 2.86 | 3.36 | 4.53 | 4.67 | 4.36 | 2.22 | 2.04 |
| M + E *1 | /1000 C. | 0.4 | 0.3 | 0.5 | 0.4 | 0.4 | 0.4 | 0.3 |
| $\eta_0$ | P | 11,100 | 221,000 | 65,800 | 25,300 | 12,400 | 19,300 | 13,700 |
| GPC Mn | | 4,070 | 8,230 | 7,680 | 6,040 | 6,640 | 5,760 | 5,600 |
| Mw | | 79,300 | 211,000 | 184,000 | 154,000 | 136,000 | 91,400 | 84,600 |
| Mz | | 833,000 | 1,600,000 | 1,580,000 | 1,410,000 | 1,330,000 | 822,000 | 801,000 |
| Mw/Mn | | 19.46 | 25.58 | 23.93 | 25.50 | 20.41 | 15.87 | 15.11 |
| Mz/Mw | | 10.50 | 7.60 | 8.61 | 9.19 | 9.82 | 8.99 | 9.47 |
| *2 | | 20,500 | 569,900 | 357,800 | 195,300 | 128,000 | 33,100 | 25,500 |
| *3 | | 50 | 1270 | 800 | 430 | 280 | 70 | 60 |

*1: sum of Me branches and Et branches, minimum limit of detection (0.02/1000 C.)
*2: value of $4.5 \times 10^{-13} \times Mw^{3.4}$
*3: value of $0.01 \times 10^{-13} \times Mw^{3.4}$

TABLE 7

| | | \multicolumn{8}{c}{Preparation Example No.} |
|---|---|---|---|---|---|---|---|---|---|
| | | 17 | 18 | 19 | 20 | 21 | 22 | 23 | 24 |
| Type of comonomer | | 1-Hexene | 1-Hexene | 1-Hexene | 1-Hexene | 1-Hexene | 1-Hexene | 1-Hexene | 1-Hexene |
| MFR | g/10 min | 28.5 | 2.9 | 12.8 | 17.3 | 36.0 | 6.3 | 2.5 | 1.9 |
| Density | kg/m³ | 958 | 920 | 917 | 922 | 891 | 886 | 899 | 959 |
| [η] | dl/g | 0.93 | 1.24 | 1.10 | 1.04 | 0.88 | 1.14 | 1.35 | 1.41 |
| MT | g | 0.93 | 11.20 | 4.46 | 3.38 | 1.11 | 4.00 | 7.20 | 8.60 |
| $\eta^*$ | P | 4,800 | 26,860 | 7,360 | 6,080 | 2,670 | 12,100 | 24,320 | 48,000 |
| $(MT/\eta^*) \times 10^4$ | g/P | 1.93 | 4.17 | 6.06 | 5.56 | 4.15 | 3.31 | 2.96 | 1.79 |
| M + E *1 | /1000 C. | 0.4 | 0.4 | 0.5 | 0.4 | 0.8 | 0.5 | 0.3 | 0.5 |
| $\eta_0$ | P | 7,010 | 189,000 | 24,100 | 11,400 | 3,650 | 19,000 | 68,000 | 237,000 |
| GPC Mn | | 5,800 | 11,300 | 10,300 | 11,800 | 12,000 | 18,000 | 21,600 | 10,400 |
| Mw | | 96,600 | 156,000 | 112,000 | 120,000 | 66,900 | 93,000 | 115,000 | 166,000 |
| Mz | | 929,000 | 1,270,000 | 1,320,000 | 1,120,000 | 331,000 | 310,000 | 350,000 | 1,250,000 |
| Mw/Mn | | 16.66 | 13.82 | 10.94 | 10.22 | 5.58 | 5.17 | 5.32 | 15.93 |
| Mz/Mw | | 9.62 | 8.12 | 11.75 | 9.32 | 4.95 | 3.30 | 3.04 | 7.55 |
| *2 | | 40,000 | 204,100 | 66,200 | 83,600 | 11,500 | 35,200 | 72,400 | 252,100 |
| *3 | | 90 | 450 | 150 | 190 | 30 | 80 | 160 | 560 |

*1: sum of Me branches and Et branches, minimum limit of detection (0.02/1000 C.)
*2: value of $4.5 \times 10^{-13} \times Mw^{3.4}$
*3: value of $0.01 \times 10^{-13} \times Mw^{3.4}$

TABLE 8

| | | \multicolumn{7}{c}{Preparation Example No.} |
|---|---|---|---|---|---|---|---|---|
| | | 25 | 26 | 27 | 28 | 29 | 30 | 31 |
| Type of comonomer | | 1-Hexene | 1-Hexene | 1-Hexene | 1-Hexene | 1-Hexene | 1-Hexene | 1-Hexene |
| MFR | g/10 min | 3.2 | 10.2 | 18.0 | 10.0 | 22.8 | 18.1 | 11.8 |
| Density | kg/m³ | 916 | 913 | 916 | 919 | 947 | 913 | 962 |
| [η] | dl/g | 1.27 | 1.05 | 1.01 | 1.07 | 0.99 | 1.07 | 1.26 |
| MT | g | 9.30 | 2.88 | 1.33 | 3.84 | 1.96 | 1.33 | 2.70 |
| $\eta^*$ | P | 26,940 | 9,970 | 5,860 | 9,850 | 6,190 | 5,480 | 16,000 |
| $(MT/\eta^*) \times 10^4$ | g/P | 3.45 | 2.88 | 2.27 | 3.90 | 3.17 | 2.43 | 1.69 |
| M + E *1 | /1000 C. | 0.4 | 0.3 | 0.3 | 0.4 | 0.4 | 0.3 | 0.5 |
| $\eta_0$ | P | 109,000 | 17,600 | 8,690 | 18,900 | 10,500 | 8,560 | 50,400 |
| GPC Mn | | 12,000 | 11,500 | 9,800 | 11,300 | 5,500 | 21,200 | 4,410 |
| Mw | | 146,000 | 108,000 | 93,000 | 132,000 | 69,800 | 84,900 | 203,000 |
| Mz | | 1,090,000 | 723,000 | 724,000 | 1,020,000 | 645,000 | 618,000 | 1,250,000 |
| Mw/Mn | | 12.16 | 9.42 | 9.49 | 11.64 | 12.69 | 4.00 | 46.03 |
| Mz/Mw | | 7.49 | 6.70 | 7.79 | 7.76 | 9.24 | 7.28 | 6.14 |
| *2 | | 162,900 | 58,500 | 35,200 | 115,700 | 13,300 | 25,800 | 499,700 |
| *3 | | 360 | 130 | 80 | 260 | 30 | 60 | 1110 |

*1: sum of Me branches and Et branches, minimum limit of detection (0.02/1000 C.)
*2: value of $4.5 \times 10^{-13} \times Mw^{3.4}$
*3: value of $0.01 \times 10^{-13} \times Mw^{3.4}$

TABLE 9

| | | Preparation Example No. | | | | | | | | Comparative Preparation Example No. | | |
|---|---|---|---|---|---|---|---|---|---|---|---|---|
| | | 1 | 2 | 3 | 4 | 5 | 7 | 8 | 9 | 1 | 2 | 3 |
| Neck-in | | | | | | | | | | | | |
| Take-off rate 80 m/min | mm | 67 | 68 | 68 | 75 | 57 | 57 | 59 | 54 | 185 | 40 | 106 |
| Take-off rate 120 m/min | mm | 59 | 60 | 59 | 64 | | 52 | | | * | | * |
| Take-off rate 200 m/min | mm | 55 | 54 | 53 | 58 | | | | | * | | * |
| Take-off surge occurrence rate | m/min | No surge | No surge | No surge | No surge | No surge | No surge | No surge | No surge | 30 | No surge | 50 |
| Film breaking rate | m/min | 200 | 220 | 210 | 250 | 100 | 120 | 80 | 100 | >350 | 110 | 240 |
| Resin pressure | MPa | 2.0 | 2.0 | 2.0 | 2.1 | 4.3 | 3.0 | 7.7 | 3.4 | 10.8 | 5.9 | 5.1 |
| Heat-sealing strength | | | | | | | | | | | | | |
| 120° C. | N/15 mm width | 1.5 | 0.4 | 0.9 | 7.7 | 0.5 | 2.2 | 0.3 | 43.5 | 20.8 | 30.8 | 36.8 |
| 130° C. | N/15 mm width | 12.8 | 11.3 | 11.1 | 25.5 | 11.3 | 17.5 | 10.5 | 44.8 | 47.5 | 32.8 | 46.2 |
| 140° C. | N/15 mm width | 29.0 | 28.0 | 29.5 | 39.8 | 31.2 | 40.3 | 42.8 | 44.1 | 48.9 | 34.7 | 48.8 |
| 150° C. | N/15 mm width | 40.5 | 39.2 | 38.0 | 40.4 | 41.4 | 40.9 | 46.8 | 44.6 | 49.5 | 33.6 | 49.7 |
| 160° C. | N/15 mm width | 41.1 | 40.2 | 40.8 | 41.0 | 42.3 | 41.6 | 47.2 | 43.8 | 50.5 | 34.8 | 49.9 |

*: Immeasurable because of violent take-off surge

TABLE 10

| | | Comparative Preparation Example NO. | | | | |
|---|---|---|---|---|---|---|
| | | 1 | 2 | 3 | 4 | 5 |
| Type of comonomer | | 4-methyl-1-pentene | — | 1-hexene | 1-hexene | 1-Octene |
| MFR | g/10 min | 8.7 | 7.1 | 13.3 | 7.1 | 1.7 |
| Density | kg/m$^3$ | 918 | 918 | 913 | 931 | 899 |
| [η] | dl/g | 1.35 | 1.14 | 1.00 | 1.18 | 1.53 |
| MT | g | 0.23 | 3.60 | 1.00 | 1.60 | 1.96 |
| η* | P | 8,280 | 13,200 | 7,400 | 20,800 | 44,700 |
| (MT/η*) × 10$^4$ | g/P | 0.28 | 2.73 | 1.35 | 0.77 | 0.44 |
| M + E *1 | /1000 C. | * | 9.4 | * | * | * |
| η$_0$ | P | 8,620 | 19,600 | 10,700 | 46,000 | 68,200 |
| GPC | Mn | 19,000 | 16,000 | 7,600 | 9,000 | 28,700 |
| | Mw | 64,000 | 470,000 | 64,000 | 91,500 | 85,300 |
| | Mz | 146,000 | 3,700,000 | 280,000 | 652,000 | 164,000 |
| | Mw/Mn | 3.37 | 29.38 | 8.42 | 10.17 | 2.97 |
| | Mz/Mw | 2.28 | 7.87 | 4.38 | 7.13 | 1.92 |
| *2 | | 9,900 | 8,676,500 | 9,900 | 33,300 | 26,200 |
| *3 | | 20 | 19,300 | 20 | 70 | 60 |

*1: sum of Me branches and Et branches The symbol "*" indicates minimum limit of detection (0.02/1000 C.) or below.
*2: value of 4.5 × 10$^{-13}$ × Mw$^{3.4}$
*3: value of 0.01 × 10$^{-13}$ × Mw$^{3.4}$ Preparation Example 32

Ethylene-based Polymer [R1-1]

An ethylene-based polymer [R1-1] was prepared in the same manner as in Preparation Example 11. Using the resulting ethylene-based polymer [R1-1], test samples were prepared in the same manner as in Preparation Example 10. The samples were subjected to physical property measurements. The results are set forth in Table 11.

Ethylene-based Polymer [R2-1]

A commercially available ethylene/4-methyl-1-pentene copolymer (trade name: Ultozex 15150J), which is available from Prime Polymer Co., Ltd., was used as an ethylene-based polymer [R2-1]. The product pellets were used as test samples, and the test samples were subjected to physical property evaluation. The results are set forth in Table 11.

Ethylene-based Resin

The ethylene-based polymer [R1-1] and the ethylene-based polymer [R2-1] were dry blended in a weight ratio of 30/70 ([R1-1]/[R2-1]), and then using a lab-plastomill manufactured by Toyo Seiki Seisaku-sho Ltd., the blend was melt kneaded at a resin temperature of 180° C. and a rotational speed of 50 rpm for 5 minutes to obtain an ethylene-based resin. This molten polymer was cooled by the use of a press molding machine, manufactured by Shinto Metal Industries Corporation, under the conditions of a cooling temperature of 20° C., a cooling time of 5 minutes and a cooling pressure of 100 kg/cm$^2$. The samples were subjected to physical property measurements. The results are set forth in Table 12.

TABLE 11

| | Ethylene-based polymer [R1] | Ethylene-based polymer [R2] |
|---|---|---|
| Code No. | [R1-1] | [R2-1] |
| Type of comonomer | 1-hexene | 4-methyl-1-pentene |

TABLE 11-continued

|  |  | Ethylene-based polymer [R1] | Ethylene-based polymer [R2] |
|---|---|---|---|
| MFR | g/10 min | 1.8 | 15.4 |
| Density | kg/m³ | 940 | 915 |
| [η] | dl/g | 1.36 | 1.05 |
| MT | g | 14.50 | 0.20 |
| η* | P | 43,160 | 5,700 |
| (MT/η*) × 10⁴ | g/P | 3.36 | 0.35 |
| M + E *1 | /1000 C. | 0.3 | *1 |
| η₀ | P | 221,000 | 5,720 |
| GPC | Mn | 8,230 | 16,000 |
|  | Mw | 211,000 | 41,000 |
|  | Mz | 1,600,000 | 89,000 |
|  | Mw/Mn | 25.58 | 2.50 |
|  | Mz/Mw | 7.60 | 2.15 |
| *2 |  | 569,900 | 2,200 |
| *3 |  | 1,270 | 5 |

*1: minimum limit of detection (0.02/1000 C) or below
*2: value of $4.5 \times 10^{-13} \times Mw^{3.4}$
*3: value of $0.01 \times 10^{-13} \times Mw^{3.4}$

TABLE 12

|  |  | Preparation Example 32 |
|---|---|---|
| Ethylene-based polymer [R1] Code No. |  | [R1-1] |
| Ethylene-based polymer [R2] Code No. |  | [R2-1] |
| Weight ratio [R1]/[R2] |  | 30/70 |
| MFR | g/10 min | 9.6 |
| Density | kg/m³ | 923 |
| [η] | dl/g | 1.17 |
| MT | g | 2.25 |
| η* | P | 9,310 |
| (MT/η*) × 10⁴ | g/P | 2.42 |
| M + E *1 | /1000 C. | 0.1 |
| η₀ | P | 13,300 |
| GPC | Mn | 11,500 |
|  | Mw | 89,800 |
|  | Mz | 1,140,000 |
|  | Mw/Mn | 7.81 |
|  | Mz/Mw | 12.74 |
| *2 |  | 31,200 |
| *3 |  | 70 |

*2: value of $4.5 \times 10^{-13} \times Mw^{3.4}$
*3: value of $0.01 \times 10^{-13} \times Mw^{3.4}$

Preparation Example 33

Preparation of Solid Component (S-4)

In a reactor having an internal volume of 180 liters and equipped with a stirrer, 10 kg of silica (SiO₂, mean particle diameter: 55 μm) having been dried at 250° C. for 10 hours was suspended in 77 liters of toluene in a nitrogen atmosphere, and then the suspension was cooled down to 0 to 5° C. To this suspension, 39.5 liters of a toluene solution of methylalumoxane (1.79 mmol/ml in terms of Al atom) were added dropwise over a period of 1 hour. During the addition, the temperature in the system was maintained at 0 to 5° C. Successively, the reaction was carried out at 0 to 5° C. for 30 minutes, then the temperature was raised up to 95 to 100° C. over a period of 1.5 hours, and the reaction was consecutively carried out at this temperature for 4 hours. Thereafter, the temperature was lowered down to 55 to 60° C., and the supernatant liquid was removed by decantation. The solid component thus obtained was washed with toluene four times, and then toluene was added to give a total amount of 166.3 liters. Thus, a toluene slurry of the solid component (S-4) was prepared. A part of the resulting solid component (S-4) was withdrawn, and the concentration was examined. As a result, the slurry concentration was 84.6 g/liter, and the Al concentration was 0.422 mol/liter.

Preparation of Solid Catalyst Component (X-18)

In a reactor having an internal volume of 114 liters and equipped with a stirrer, 22.6 liters of toluene and 8.2 liters (695 g in terms of solid component) of the toluene slurry of the solid component (S-4) prepared above were placed in a nitrogen atmosphere. Further, 4.0 liters of a toluene solution of the metallocene compound (A-2) and a metallocene compound (B-3) (4.4 mmol in terms of Zr atom) were further introduced ((A-2)/(B-3) molar ratio=20/80). The reaction was carried out at an internal temperature of 20 to 25° C. for 1 hour. Thereafter, the supernatant liquid was removed by decantation. The solid catalyst component thus obtained was washed with hexane four times, and then hexane was added to give a total amount of 45 liters. Thus, a hexane slurry of the solid catalyst component (X-18) was prepared.

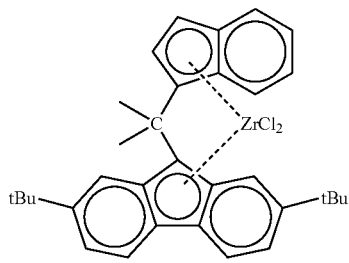

(B-3)

Preparation of Prepolymerized Catalyst (XP-18)

Successively, the hexane slurry of the solid catalyst component (X-18) obtained above was cooled down to 10° C., and then ethylene was continuously fed to the system for several minutes at atmospheric pressure. During the feeding, the temperature in the system was maintained at 10 to 15° C. Thereafter, 1.4 mol of diisobutylaluminum hydride (DiBAl—H) and 45 ml of 1-hexene were added. After the addition of 1-hexene, ethylene was fed again at 0.5 to 1.0 kg/hr to initiate prepolymerization. After 100 minutes from the initiation of prepolymerization, the temperature in the system rose up to 30° C., and thereafter, the temperature in the system was maintained at 30 to 35° C. After 40 minutes from the initiation of prepolymerization, 23.0 ml of 1-hexene was added, and also after 110 minutes, 23.0 ml of 1-hexene was added.

After 140 minutes from the initiation of prepolymerization, feed of ethylene was stopped, and the system was replaced with nitrogen to terminate prepolymerization. Thereafter, the supernatant liquid was removed by decantation. The prepolymerized catalyst thus obtained was washed with hexane three times to obtain a prepolymerized catalyst (XP-18) in which 3.00 g of a polymer was produced based on 1 g of the solid catalyst component. A part of the resulting prepolymerized catalyst component was dried, and the composition was examined. As a result, 0.47 mg of Zr atom was contained based of 1 g of the solid catalyst component.

Polymerization

Using a continuous fluidized bed gas phase polymerization apparatus, copolymerization of ethylene and 1-hexene was carried out under the conditions of a total pressure of 2.0 MPa-G, a polymerization temperature of 75° C. and a gas linear velocity of 0.8 m/sec. The prepolymerized catalyst (XP-18) prepared above was dried and continuously fed at 3 g/hr. In order to maintain the gas composition constant during the polymerization, ethylene, 1-hexene, hydrogen and nitrogen were continuously fed (gas composition: 1-hexene/ethylene=0.008 m.r., ethylene concentration=56.2%). The yield of the resulting ethylene-based polymer was 2.8 kg/hr.

To the resulting ethylene-based polymer, 0.1% by weight of Irganox 1076 (product of Ciba Specialty Chemicals Inc.) and 0.1% by weight of Irgafos 168 (product of Ciba Specialty Chemicals Inc.) were added as heat stabilizers, and the mixture was melt kneaded by the use of a single screw extruder having a screw diameter of 65 mm (manufactured by Placo Co., Ltd.) under the conditions of a preset temperature of 180° C. and a screw rotational speed of 50 rpm. Thereafter, the resulting kneaded mixture was extruded into strands, and the strands were cut with a cutter to give pellets as test samples. The samples were subjected to physical property measurements and extrusion lamination molding. The results are set forth in the table.

Preparation Example 34

Preparation of Solid Catalyst Component (X-19)

In a reactor having an internal volume of 114 liters and equipped with a stirrer, 28.9 liters of toluene and 4.1 liters (350 g in terms of solid component) of the toluene slurry of the solid component (S-4) prepared above were placed in a nitrogen atmosphere. Further, 2.0 liters of a toluene solution of the metallocene compound (A-2) and the metallocene compound (B-3) (0.004 mmol in terms of Zr atom) were further introduced ((A-2)/(B-3) molar ratio=27/73). The reaction was carried out at an internal temperature of 20 to 25° C. for 1 hour. Thereafter, the supernatant liquid was removed by decantation. The solid catalyst component thus obtained was washed with hexane four times, and then hexane was added to give a total amount of 37 liters. Thus, a hexane slurry of the solid catalyst component (X-19) was prepared.

Preparation of Prepolymerized Catalyst (XP-19)

Successively, the hexane slurry of the solid catalyst component (X-19) obtained above was cooled down to 10° C., and then ethylene was continuously fed to the system for several minutes at atmospheric pressure. During the feeding, the temperature in the system was maintained at 10 to 15° C. Thereafter, 0.9 mol of diisobutylaluminum hydride (DiBAl—H) and 22 ml of 1-hexene were added. After the addition of 1-hexene, ethylene was fed again at 0.5 kg/hr to initiate prepolymerization. After 30 minutes from the initiation of prepolymerization, the temperature in the system rose up to 16° C., and thereafter, the temperature in the system was maintained at 16 to 20° C. After 40 minutes from the initiation of prepolymerization, 12.0 ml of 1-hexene was added, and also after 90 minutes, 12.0 ml of 1-hexene was added.

After 140 minutes from the initiation of prepolymerization, feed of ethylene was stopped, and the system was replaced with nitrogen to terminate prepolymerization. Thereafter, the supernatant liquid was removed by decantation. The prepolymerized catalyst thus obtained was washed with hexane three times to obtain a prepolymerized catalyst (XP-19) in which 3.00 g of a polymer was produced based on 1 g of the solid catalyst component. A part of the resulting prepolymerized catalyst component was dried, and the composition was examined. As a result, 0.53 mg of Zr atom was contained based of 1 g of the solid catalyst component.

Polymerization

An ethylene-based polymer was obtained in the same manner as in Preparation Example 33, except that the prepolymerized catalyst (XP-19) was used and the ethylene/1-hexene copolymerization conditions were changed to the conditions shown in Table 13. Using the resulting ethylene-based polymer, test samples were prepared in the same manner as in Preparation Example 33. The samples were subjected to physical property measurements and extrusion lamination molding. The results are set forth in Table 13.

Preparation Examples 35 and 36

Polymerization

An ethylene-based polymer was obtained in the same manner as in Preparation Example 34, except that the ethylene/1-hexene copolymerization conditions were changed to the conditions shown in Table 13. Using the resulting ethylene-based polymer, test samples were prepared in the same manner as in Preparation Example 33. The samples were subjected to physical property measurements and extrusion lamination molding. The results are set forth in Table 13.

Preparation Example 37

Polymerization

An ethylene-based polymer was obtained in the same manner as in Preparation Example 34, except that the ethylene/1-hexene copolymerization conditions were changed to the conditions shown in Table 13. Using the resulting ethylene-based polymer, test samples were prepared in the same manner as in Preparation Example 33. The samples were subjected to physical property measurements and extrusion lamination molding. The results are set forth in Table 13.

TABLE 13

| | | | Preparation Example NO. | | | | |
|---|---|---|---|---|---|---|---|
| | | | 33 | 34 | 35 | 36 | 37 |
| | Component (A) | | A-2 | A-2 | A-2 | A-2 | A-2 |
| | Component (B) | | B-3 | B-3 | B-3 | B-3 | B-3 |
| Component (A)/Component (B) | | molar ratio | 20/80 | 27/73 | 27/73 | 27/73 | 20/80 |
| Polymerization conditions | Catalytic amount | mmol/hr | 0.018 | 0.03 | 0.05 | 0.04 | 0.05 |
| | Ethylene | kg/hr | 3.5 | 7 | 6.4 | 6.9 | 5.3 |
| | TIBAL | mmol/hr | 0 | 0 | 0 | 0 | 0 |
| | 1-Hexene | g/hr | 400 | 600 | 600 | 400 | 200 |
| | Polymerization temperature | ° C. | 75 | 80 | 80 | 80 | 80 |
| | Polymerization pressure | MPa-G | 2.0 | 2.0 | 2.0 | 2.0 | 2.0 |
| | Residence time | hr | 6.5 | 4.4 | 3.9 | 4.3 | 7.7 |
| | Gas phase H/E | m.r. | 0.0080 | 0.0070 | 0.0070 | 0.0060 | 0.0080 |
| Yield of polymer | | kg/hr | 2.8 | 5.5 | 6.2 | 5.6 | 3.1 |

Example 1

Preparation of Solid Component (S-5)

In a reactor having an internal volume of 260 liters and equipped with a stirrer, 10 kg of silica ($SiO_2$, mean particle diameter: 65 μm) having been dried at 250° C. for 10 hours was suspended in 88.5 liters of toluene in a nitrogen atmosphere, and then the suspension was cooled down to 0 to 5° C. To this suspension, 78.2 liters of a toluene solution of methylalumoxane (3.0 mmol/ml in terms of Al atom) were added dropwise over a period of 60 minutes. During the addition, the temperature in the system was maintained at 0 to 5° C. Successively, the reaction was carried out at 0 to 5° C. for 30 minutes, then the temperature was raised up to 95 to 100° C. over a period of about 1.5 hours, and the reaction was consecutively carried out at 95 to 100° C. for 4 hours. Thereafter, the temperature was lowered down to 60° C., and the supernatant liquid was removed by decantation. The solid component thus obtained was washed with toluene four times, and then toluene was added to give a total amount of 130 liters. Thus, a toluene slurry of a solid component (S-5) was prepared. A part of the resulting solid component was withdrawn, and the concentration was examined. As a result, the slurry concentration was 138.5 g/liter, and the Al concentration was 1.0 mol/liter.

Preparation of Solid Catalyst Component (X-20)

In a reactor having an internal volume of 114 liters and equipped with a stirrer, 21.0 liters of toluene and 16.2 liters (1865 g in terms of solid component) of the toluene slurry of the solid component (S-5) prepared above were placed in a nitrogen atmosphere. On the other hand, in a reactor having an internal volume of 100 liters and equipped with a stirrer, 36.1 liters of toluene were placed in a nitrogen atmosphere, then with stirring, 5.5 liters of a toluene solution of the metallocene compound (A-1) (7.40 mmol/liter in terms of Zr atom) were introduced, and subsequently, 5.0 liters of a toluene solution of the metallocene compound (B-1) (3.20 mmol/liter in terms of Zr atom) were further introduced, followed by mixing for several minutes ((A-1)/(B-1) molar ratio=70/30). Subsequently, the mixed solution thus prepared was forcedly fed to the aforesaid reactor being filled with the toluene slurry of the solid component (S-5) in advance. After the forced feeding, the reaction was carried out at an internal temperature of 20 to 25° C. for 1 hour. Thereafter, the supernatant liquid was removed by decantation. The solid catalyst component thus obtained was washed with hexane three times, and then hexane was added to give a total amount of 47 liters. Thus, a hexane slurry of the solid catalyst component (X-20) was prepared.

Preparation of Prepolymerized Catalyst (XP-20)

Successively, the hexane slurry of the solid catalyst component (X-20) obtained above was cooled down to 10° C., and then ethylene was continuously fed to the system for several minutes at atmospheric pressure. During the feeding, the temperature in the system was maintained at 10 to 15° C. Thereafter, 2.5 mol of triisobutylaluminum (TIBAL) and 123 ml of 1-hexene were added. After the addition of 1-hexene, ethylene was fed again at 1.8 kg/hr to initiate prepolymerization. After 35 minutes from the initiation of prepolymerization, the temperature in the system rose up to 23° C., and thereafter, the temperature in the system was maintained at 24 to 26° C. After 87 minutes from the initiation of prepolymerization, 61.0 ml of 1-hexene was added, and also after 150 minutes, 61.0 ml of 1-hexene was added.

After 212 minutes from the initiation of prepolymerization, feed of ethylene was stopped, and the system was replaced with nitrogen to terminate prepolymerization. Thereafter, the supernatant liquid was removed by decantation. The prepolymerized catalyst thus obtained was washed with hexane six times to obtain a prepolymerized catalyst (XP-20) in which 3.03 g of a polymer was produced based on 1 g of the solid catalyst component. A part of the resulting prepolymerized catalyst component was dried, and the composition was examined. As a result, 0.60 mg of Zr atom was contained based of 1 g of the solid catalyst component.

Into an evaporation dryer having an internal volume of 43 liters and equipped with a starrier, 25 liters (3330 g in terms of solid prepolymerized catalyst) of the hexane slurry of the prepolymerized catalyst (XP-20) was transferred in a nitrogen atmosphere. After the transferring, the pressure in the dryer was reduced to −65 KPaG over a period of about 3.5 hours, and when the pressure reached −65 KPaG, vacuum drying was carried out for about 4.0 hours to remove hexane and a volatile component of the prepolymerized catalyst. The pressure was further reduced to −100 KPaG, and when the pressure reached −100 KPaG, vacuum drying was carried out for 6 hours. The total volatile content of the resulting prepolymerized catalyst (XP-20) was 0.3% by weight.

Polymerization

To a fluidized bed gas phase polymerization reactor having an internal volume of 1.7 $m^3$, the prepolymerized catalyst component (XP-20) obtained above was fed at 0.06 mmol/hr in terms of Zr atom. Then, nitrogen, ethylene and 1-hexene were fed so that the ethylene partial pressure would become 1.5 MPa·A, the gas phase 1-hexene/ethylene ratio would become 0.014 m.r., and the gas linear velocity in the reactor would become 0.7 m/sec. With continuously drawing the polymer out of the polymerization reactor so that the amount of the polymer in the polymerization reactor would become constant, polymerization was carried out under the conditions of a total pressure of 2.0 MPaG, a polymerization temperature of 80° C. and a residence time of 7.3 hours. From the polymer continuously drawn out of the polymerization reactor, unreacted ethylene was substantially removed by a flush hopper. Thereafter, the polymer was dried by a drying device, and an ethylene-based polymer was obtained at 3.3 kg/hr.

Preparation of Laminate

The resulting ethylene-based polymer [A] was extrusion laminated on a base material by the use of a laminator, manufactured by Sumitomo Heavy Industries, Ltd., having an extruder of 65 mm diameter and a T-die of 500 mm die width under the conditions of an air gap of 130 mm, an under-die resin temperature of 295° C. and a take-off rate of 80 m/min so that the film thickness would become 25 μm. As the base material, a laminate obtained by coating one surface of a biaxially stretched nylon film (trade name: Emblem ONM, product of Unitika Ltd.) of 15 μm thickness with a urethane-based anchor coating agent and then extrusion laminating an ethylene-based mixed resin obtained by blending 50 parts by weight of linear low-density polyethylene obtained by the use of a Ziegler catalyst with 50 parts by weight of high-pressure-processed low density polyethylene in a thickness of 25 μm was used. The above extrusion lamination of the ethylene-based polymer was carried out on the side of the ethylene-based mixed resin layer of the above laminate.

Heat-sealing strength between the ethylene-based polymer layers of the extrusion laminated film and bag breaking strength of a bag prepared from the extrusion laminated film were measured and evaluated in accordance with the aforesaid methods.

Examples 2 to 5

Heat-sealing strength and bag breaking strength were measured and evaluated in the same manner as in Example 1, except that each of the ethylene-based polymers prepared in Preparation Examples 34 to 37 was used instead of the ethylene-based polymer used in Preparation Example 1.

Comparative Example 1

Heat-sealing strength and bag breaking strength were measured and evaluated in the same manner as in Example 1, except that high-pressure-processed low-density polyethylene (trade name: Mirason 11P, product of Prime Polymer Co., Ltd.) was used instead of the ethylene-based polymer used in Preparation Example 1.

Comparative Example 2

Heat-sealing strength and bag breaking strength were measured and evaluated in the same manner as in Example 1, except that low-density polyethylene (trade name: Ultozex 20100J, product of Prime Polymer Co., Ltd.) was used instead of the ethylene-based polymer used in Preparation Example 1.

Comparative Example 3

Heat-sealing strength was measured and evaluated in the same manner as in Example 1, except that the ethylene-based polymer of Comparative Preparation Example 3 was used.

The results are set forth in Table 14.

manufactured by Sumitomo Heavy Industries, Ltd., having an extruder of 65 mm diameter and a T-die of 500 mm die width under the following conditions.
Air gap: 130 mm
Under-die resin temperature: 325° C.
Take-off rate: 200 m/min, 250 m/min, 300 m/min
Film thickness: 10 μm The resulting laminated paper was evaluated on paper adhesion.

Comparative Example 4

A laminated paper was prepared in the same manner as in Example 6, except that high-pressure-processed low-density polyethylene (trade name: Mirason 11P, product of Prime Polymer Co., Ltd.) was used instead of the ethylene-based polymer used in Preparation Example 6. The resulting laminated paper was evaluated on paper adhesion.

Comparative Example 5

A laminated paper was prepared in the same manner as in Example 6, except that low-density polyethylene (trade name: Ultozex 20100J, product of Prime Polymer Co., Ltd.) was used instead of the ethylene-based polymer used in Preparation Example 6. The resulting laminated paper was evaluated on paper adhesion.

TABLE 14

| Items | | Example 1 | Example 2 | Example 3 | Example 4 | Example 5 | Comparative Example 1 | Comparative Example 2 | Comparative Example 3 |
|---|---|---|---|---|---|---|---|---|---|
| MFR | g/10 min | 30.7 | 13.8 | 27 | 11 | 11.9 | 7.1 | 8.7 | 13.3 |
| Density | kg/m$^3$ | 917 | 922 | 924 | 923 | 926 | 917 | 918 | 913 |
| MT | g | 0.56 | 1.47 | 0.77 | 1.72 | 1.62 | 3.6 | 0.23 | 1.00 |
| $\eta^*$ | P | 3000 | 8900 | 3600 | 8800 | 10700 | 13200 | 8280 | 7400 |
| MT/$\eta^*$ × 10$^4$ | — | 1.87 | 1.66 | 2.14 | 1.95 | 1.52 | 2.73 | 0.28 | 1.35 |
| A + B | /1000 C. | 0.4 | 0.5 | 0.4 | 0.5 | 0.5 | 9.4 | — | *1 |
| $\eta_0$ | P | 3500 | 17400 | 5400 | 16600 | 25200 | 19600 | 8620 | 10700 |
| Mw | — | 86300 | 89900 | 82600 | 104000 | 93000 | 470000 | 64000 | 64000 |
| Under-die resin temperature | ° C. | 295 | 295 | 295 | 295 | 295 | 295 | 295 | 295 |
| Screw rotational speed | rpm | 60 | 60 | 59 | 60 | 63 | 61 | 62 | 60 |
| Resin pressure | kg/cm$^2$ | 29 | 60 | 38 | 80 | 68 | 46 | 106 | 42 |
| Motor load | A | 39 | 40 | 32 | 49 | 41 | 44 | 58 | 27 |
| Neck-in 80 m/min | mm | 90 | 68 | 73 | 73 | 71 | 40 | 185 | 106 |
| 120 m/min | mm | 83 | 63 | 68 | — | — | *2 | *2 | *2 |
| 200 m/min | mm | 72 | — | 63 | — | — | *2 | *2 | *2 |
| Film breaking rate | m/min | >350 | | 170 | 290 | 90 | 100 | >350 | 240 |
| Take-off surge occurrence rate | m/min | No occurrence | | No occurrence | No occurrence | No occurrence | No occurrence | 30 | 50 |
| Heat-sealing strength 130° C. | N/15 mm width | 43.4 | 45.0 | 44.5 | 42.0 | 33.7 | 34.1 | *2 | 46.2 |
| 140° C. | N/15 mm width | 48.4 | 51.3 | 49.0 | 54.9 | 50.7 | 33.8 | *2 | 49.8 |
| 150° C. | N/15 mm width | 50.4 | 50.3 | 49.0 | 53.9 | 50.6 | 35 | *2 | 49.7 |
| 160° C. | N/15 mm width | 51.3 | 49.7 | 48.7 | 53.9 | 50.5 | 34.8 | *2 | 49.9 |
| Bag breaking strength | N | 6730 | 6274 | 6508 | 6402 | 6081 | 5900 | *2 | 6120 |

*1: minimum limit of detection (0.02/1000 C.) or below
*2: Measurement is impossible because any film sample capable of evaluation is unobtainable.

Example 6

Extrusion Lamination

An ethylene-based polymer obtained in the same manner as in Example 1 was extrusion laminated on a craft paper of 50 g/m$^2$, which was a base material, by the use of a laminator, Comparative Example 6

A laminated paper was prepared in the same manner as in Example 6, except that the ethylene-based polymer of Comparative Preparation Example 3 was used. The resulting laminated paper was evaluated on paper adhesion.

The results are set forth in Table 15.

TABLE 15

| Items | | Example 6 | Comparative Example 4 | Comparative Example 5 | Comparative Example 6 |
|---|---|---|---|---|---|
| MFR | g/10 min | 30.7 | 7.1 | 8.7 | 13.3 |
| Density | kg/m$^3$ | 917 | 917 | 918 | 913 |
| MT | g | 0.56 | 3.6 | 0.23 | 1.00 |
| $\eta^*$ | P | 3000 | 13200 | 8280 | 7400 |
| MT/$\eta^*$ × 10$^4$ | — | 1.87 | 2.73 | 0.28 | 1.35 |
| A + B | /1000 C. | 0.4 | 9.4 | — | *1 |
| $\eta_0$ | P | 3500 | 19600 | 8620 | 10700 |
| Mw | — | 86300 | 470000 | 64000 | 64000 |
| Under-die resin temperature | ° C. | 325 | 325 | 325 | 325 |
| Resin thickness | μm | 6 | 6 | 6 | 6 |
| Film breaking rate | m/min | >350 | 240 | >350 | >350 |
| Take-off surge occurrence rate | m/min | No occurrence | No occurrence | 30 | 50 |
| Paper adhesion | 200 m/min | — | Picking | Polymer separation | *2 | *2 |
| | 250 m/min | — | Picking | *2 | *2 | *2 |
| | 300 m/min | — | Polymer separation | *2 | *2 | *2 |

*1: minimum limit of detection (0.02/1000 C.) or below
*2: Measurement is impossible because any film sample capable of evaluation is unobtainable.

Example 7

Preparation of External Layer

A biaxially stretched nylon film (trade name: Emblem ONM, product of Unitika Ltd., abbreviated to "ONy") of 15 μm thickness was coated with a urethane-based anchor coating agent as an external layer, and the solvent was evaporated. Thereafter, with extrusion laminating high-pressure-processed low-density polyethylene (Mirason 11P, product of Prime Polymer Co., Ltd.), a 9-μm aluminum foil, product of Showa Aluminum K.K., was bonded to prepare a multilayer film. This multilayer film was used as an external layer. The above extrusion lamination was carried out by the use of a laminator (manufactured by Sumitomo Heavy Industries, Ltd.) having an extruder of 65 mm diameter and a T-die of 500 mm width under the conditions of a take-off rate of 80 m/min, an under-die resin temperature of 325° C. and an air gap of 190 mm.

Preparation of Laminate

With extrusion laminating an ethylene-based polymer [A] obtained in the same manner as in Example 1 in a thickness of 25 μm on the aluminum surface of the above external layer film, a 25-μm film, TUX-FCS available from Tohcello Co., Ltd., was bonded as an internal layer to obtain a laminate. The above extrusion lamination was carried out by the use of a laminator (manufactured by Sumitomo Heavy Industries, Ltd.) having an extruder of 65 mm diameter and a T-die of 500 mm width under the conditions of a take-off rate of 50, 100, 150, 200 and 250 m/min, an under-die resin temperature of 325° C. and an air gap of 190 mm.

Aluminum Adhesion Strength Measurement

Adhesion strength between the aluminum surface of the external layer and the resin layer obtained by extrusion lamination molding in the laminate obtained above was measured as aluminum adhesion strength.

Width of test specimen: 15 mm
Peel angle: 180 degrees
Peel rate: 300 mm/min

Examples 8 to 11

Aluminum adhesion strength was measured in the same manner as in Example 7, except that each of the ethylene-based polymers prepared in Preparation Examples 34 to 37 was used instead of the ethylene-based polymer used in Example 7.

Comparative Example 7

A laminate was prepared in the same manner as in Example 7, except that the ethylene/1-hexene copolymer was replaced with high-pressure-processed low-density polyethylene (Mirason 11P, product of Prime Polymer Co., Ltd.). Then, adhesion strength between the aluminum surface of the external layer and the resin layer obtained by extrusion lamination molding in the resulting laminate was measured in the same manner as in Example 7.

Comparative Example 8

A laminate was prepared in the same manner as in Example 7, except that the ethylene/1-hexene copolymer was replaced with low-density polyethylene (Ultozex 20100J, product of Prime Polymer Co., Ltd.). Then, adhesion strength between the aluminum surface of the external layer and the resin layer obtained by extrusion lamination molding in the resulting laminate was measured in the same manner as in Example 7.

Comparative Example 9

A laminate was prepared in the same manner as in Example 7, except that the ethylene-based polymer of Comparative Preparation Example 3 was used. Then, adhesion strength between the aluminum surface of the external layer and the resin layer obtained by extrusion lamination molding in the resulting laminate was measured in the same manner as in Example 7.

The results are set forth in Table 16.

TABLE 16

| Items | | Example 7 | Example 8 | Example 9 | Example 10 | Example 11 | Comparative Example 7 | Comparative Example 8 | Comparative Example 9 |
|---|---|---|---|---|---|---|---|---|---|
| MFR | g/10 min | 30.7 | 13.8 | 27 | 11 | 11.9 | 7.1 | 8.7 | 13.3 |
| Density | kg/m³ | 917 | 922 | 924 | 923 | 926 | 917 | 918 | 913 |
| MT | g | 0.56 | 1.47 | 0.77 | 1.72 | 1.62 | 3.6 | 0.23 | 1.00 |
| $\eta^*$ | P | 3000 | 8900 | 3600 | 8800 | 10700 | 13200 | 8280 | 7400 |
| $MT/\eta^* \times 10^4$ | — | — | 1.87 | 1.66 | 2.14 | 1.95 | 1.52 | 2.73 | 0.28 | 1.35 |
| M + E | /1000 C. | 0.4 | 0.5 | 0.4 | 0.5 | 0.5 | 9.4 | — | *1 |
| $\eta_0$ | P | 3500 | 17400 | 5400 | 16600 | 25200 | 19600 | 8620 | 10700 |
| Mw | — | 86300 | 89900 | 82600 | 104000 | 93000 | 470000 | 64000 | 64000 |
| Under-die resin temperature | ° C. | 325 | 295 | 295 | 295 | 295 | 325 | 325 | 325 |
| Screw rotational speed | rpm | 59 | 60 | 59 | 60 | 63 | 60 | 58 | 75 |
| Resin pressure | kg/cm² | 11 | 60 | 38 | 80 | 68 | 23 | 62 | 40 |
| Motor load | A | 30 | 40 | 32 | 49 | 41 | 39 | 54 | 28 |
| Film breaking rate | m/min | >350 | 170 | 290 | 90 | 100 | 250 | >350 | >350 |
| Take-off surge occurrence rate | m/min | No occurrence | No occurrence | No occurrence | No occurrence | No occurrence | No occurrence | 100 | 90 |
| Aluminum adhesion strength | 50 m/min N/15 mm width | 3.0 | 3.0 | 3.1 | 3.0 | 3.0 | 3.0 | *2 | 2.5 |
| | 100 m/min N/15 mm width | 2.9 | 3.0 | 3.1 | 2.9 | 2.9 | 2.8 | *2 | *2 |
| | 150 m/min N/15 mm width | 2.8 | 2.7 | 2.8 | 2.6 | 2.7 | 2.2 | *2 | *2 |
| | 200 m/min N/15 mm width | 2.5 | 2.5 | 2.6 | 2.5 | 2.4 | 1.2 | *2 | *2 |
| | 250 m/min N/15 mm width | 2.2 | 2.3 | 2.5 | 2.3 | 2.4 | *2 | *2 | *2 |

*1: minimum limit of detection (0.02/1000 C.) or below
*2: Measurement is impossible because any film sample capable of evaluation is unobtainable.

Example 12

Process for Preparing Ethylene-based Polymer

Preparation of an Ethylene-Based Polymer was Carried Out by the process described in Preparation Example 8.

Preparation of Resin Composition

The resulting ethylene-based polymer and product pellets of GD1588, which are product of Prime Polymer Co., Ltd., were blended in a weight ratio of 15:85. To the blend, 0.1% by weight of Irganox 1076 (product of Ciba Specialty Chemicals Inc.) and 0.1% by weight of Irgafos 168 (product of Ciba Specialty Chemicals Inc.) were further added as heat stabilizers, and the mixture was melt kneaded by the use of a single screw extruder having a screw diameter of 65 mm, manufactured by Placo Co., Ltd., under the conditions of a preset temperature of 180° C. and a screw rotational speed of 50 rpm. Thereafter, the resulting kneaded mixture was extruded into strands, and the strands were cut with a cutter to give pellets as test samples.

Inflation Molding (Single Layer)

Using the resulting pellets, air-cooling inflation molding was carried out under the following molding conditions to prepare a film having a thickness of 40 μm and a width of 320 mm, and molding properties (motor load, bubble stability, etc.) were evaluated.

Film Molding Conditions

Molding machine: inflation molding machine of 50 mm diameter manufactured by Modern Machinery Co., Ltd.

Screw: barrier type screw

Die: 100 mm (diameter), 2.0 mm (lip width)

Air ring: 2-gap type

Molding temperature: 190° C. or 170° C.

Extrusion rate: 28.8 kg/hr

Take-off rate: 20 m/min

Transparency and tear strength of the film obtained as above were measured.

Comparative Example 10

Pellets were prepared in the same manner as in Example 12, except that product pellets of UZ5010, which is a product of Prime Polymer Co., ltd., were used instead of the ethylene-based polymer. Using these pellets, air-cooling inflation molding was carried out in the same manner as in Example 12 to prepare a film, and transparency and tear strength of the film were measured.

TABLE 17

| Items | | Example 12 | Comparative Example 10 |
|---|---|---|---|
| Density | kg/m³ | 947 | 946 |
| MFR | g/10 min | 5 | 1.1 |
| MT | g | 4.2 | 1.82 |
| $\eta^*$ | P | 23300 | 49700 |
| $MT/\eta^* \times 10^4$ | — | 1.82 | 0.37 |
| M + E | /1000 C. | 0.6 | — |
| $\eta_0$ | P | 62400 | 66100 |
| Mw | — | 173000 | 115000 |
| Base resin | | GD1588 | GD1588 |
| Modifier blending quantity | | 15% | 15% |
| Molding temperature | ° C. | 170 | 190 |
| Motor load | A | 32 | 35 |
| Resin pressure | kg/cm² | 247 | 285 |
| Bubble stability | | BB | CC |
| Haze | % | 17 | 19 |
| Elmendorf tear strength (MD/TD) | N/cm | 800/1550 | 420/2900 |

Preparation Example 1

To an ethylene-based polymer obtained by the process described in Preparation Example 8, Irganox 1076 (product of Ciba Specialty Chemicals Inc.) and Irgafos 168 (product of Ciba Specialty Chemicals Inc.) were added as heat stabilizers so that the amounts thereof would become 0.1% by weight and 0.1% by weight, respectively, and the mixture was melt kneaded by the use of a single screw extruder having a screw diameter of 65 mm (manufactured by Placo Co., Ltd.) under the conditions of a preset temperature of 180° C. and a screw rotational speed of 50 rpm. Thereafter, the resulting kneaded mixture was extruded into strands, and the strands were cut with a cutter to give pellets as test samples.

Example 13

Preparation of Film

Using the ethylene-based resin composition obtained in Preparation Example 1, air-cooling inflation molding (single layer) was carried out under the following molding conditions to prepare a film having a thickness of 40 μm and a width of 320 mm.

Film Molding Conditions

Molding machine: inflation molding machine of 50 mm diameter manufactured by Modern Machinery Co., Ltd.
Screw: barrier type screw
Die: 100 mm (diameter), 2.0 mm (lip width)
Air ring: 2-gap type
Molding temperature: 130° C.
Extrusion rate: 28.8 kg/hr
Take-off rate: 20 m/min
Film thickness: 40 μm The resulting ethylene-based resin composition and the resulting film were subjected to physical property measurements and molding evaluation. The results are set forth in Table 18.

Comparative Example 11

Using product pellets of UZ5019F, which is a product of Prime Polymer Co., Ltd., as test samples, a film was prepared in the same manner as in Example 13, and physical property measurements and molding evaluation were carried out. The results are set forth in Table 18. Since the resin pressure increased at 130° C., inflation molding was impossible.

TABLE 18

|  |  | Example 13 | Comparative Example 11 |
| --- | --- | --- | --- |
| MFR | g/10 min | 5 | 1.1 |
| Density | kg/m³ | 947 | 946 |
| [η] | dl/g | 1.45 | 1.95 |
| MT | g | 4.24 | 2.5 |
| η* | P | 23300 | 49700 |
| (MT/η*) × 10⁴ | g/P | 1.82 | 0.37 |
| M + E *1 | /1000 C. | 0.6 | — |
| η₀ | P | 64100 | 66100 |
| GPC | Mw | 173000 | 115000 |
| *2 |  | 290114 | 72374 |
| *3 |  | 645 | 161 |
| Molding temperature | ° C. | 130 | 130 |
| Motor load | A | 32 | Incapable of molding |
| Resin pressure | kg/cm² | 210 |  |
| Bubble stability (40 μm × 320 mm) |  | AA |  |
| Film properties (40 μm) |  |  |  |
| Taste |  | AA |  |

*1: sum of Me branches and Et branches, minimum limit of detection (0.02/1000 C)
*2: value of $4.5 \times 10^{-13} \times Mw^{3.4}$
*3: value of $0.01 \times 10^{-13} \times Mw^{3.4}$ Preparation of Film Using the ethylene-based resin composition obtained in Preparation Example 1, air-cooling inflation molding (single layer) was carried out under the following molding conditions to prepare a film having a thickness of 40 μm and a width of 320 mm.

Film Molding Conditions

Molding machine: inflation molding machine of 50 mm diameter manufactured by Modern Machinery Co., Ltd.
Screw: barrier type screw
Die: 100 mm (diameter), 2.0 mm (lip width)
Air ring: 2-gap type
Molding temperature: 190° C.
Extrusion rate: 28.8 kg/hr
Take-off rate: 20 m/min
Film thickness: 40 μm The resulting ethylene-based resin composition and the resulting film were subjected to physical property measurements and molding evaluation. The results are set forth in Table 19.

Comparative Example 12

Using product pellets of UZ5019F, which is a product of Prime Polymer Co., Ltd., as test samples, a film was prepared in the same manner as in Example 14, and physical property measurements and molding evaluation were carried out. The results are set forth in Table 19.

TABLE 19

|  |  | Example 14 | Comparative Example 12 |
| --- | --- | --- | --- |
| MFR | g/10 min | 5 | 1.1 |
| Density | kg/m³ | 947 | 946 |
| [η] | dl/g | 1.45 | 1.95 |
| MT | g | 4.24 | 1.82 |
| η* | P | 23300 | 49700 |
| (MT/η*) × 10⁴ | g/P | 1.82 | 0.37 |
| M + E *1 | /1000 C. | 0.6 | — |
| η₀ | P | 64100 | 66100 |
| GPC | Mw | 173000 | 115000 |
| *2 |  | 290114 | 72374 |
| *3 |  | 645 | 161 |
| Molding temperature | ° C. | 190 | 190 |
| Motor load | A | 19 | 40 |
| Resin pressure | kg/cm² | 72 | 290 |
| Bubble stability (40 μm × 320 mm) |  | AA | CC |
| Film properties (40 μm) |  |  |  |
| Elmendorf tear strength (MD/TD) | N/cm | 42/67 | 100/480 |
| Hand tear property |  | AA | CC |

*1: sum of Me branches and Et branches, minimum limit of detection (0.02/1000 C)
*2: value of $4.5 \times 10^{-13} \times Mw^{3.4}$
*3: value of $0.01 \times 10^{-13} \times Mw^{3.4}$

The invention claimed is:

1. A film including, in at least a part thereof, a layer comprising an ethylene-based resin (R) which is a copolymer of ethylene and an α-olefin of 4 to 10 carbon atoms and satisfies the following requirements (1) to (6) at the same time or an ethylene-based resin composition (R') containing the resin (R);

(1) the melt flow rate (MFR) at 190° C. under a load of 2.16 kg is in the range of 0.1 to 50 g/10 min, (2) the density (d) is in the range of 875 to 970 kg/m³, (3) the ratio [MT/η*(g/P)] of a melt tension [MT(g)] at 190° C. to a shear viscosity [η*(P)] at 200° C. and at an angular velocity of 1.0 rad/sec is in the range of 1.00× $10^{-4}$ to 9.00×$10^{-4}$, (4) the sum [(M+E)(/1000C)] of the number of methyl branches [M(/1000C)] and the number of ethyl branches [E(/1000C)] as measured by 13C-NMR, each number being based on 1000 carbon atoms, is not more than 1.8, (5) the zero shear viscosity [$η_0$(P)] at 200° C. and the weight-average molecular weight (Mw) as measured by a GPC-viscosity detector method (GPC-VISCO) satisfy the following relational formula (Eq-1):

$$0.01 \times 10^{-13} \times Mw^{3.4} \leq η_0 \leq 4.5 \times 10^{-13} \times Mw^{3.4} \quad \text{(Eq-1), and}$$

(6) the intrinsic viscosity ([η](dl/g)) as measured in decalin at 135° C. and the weight-average molecular weight Mw as measured by the GPC-viscosity detector method (GPC-VISCO) of the ethylene-based resin (R) satisfy the following relational formula (Eq-7):

$$0.80 \times 10^{-4} \times Mw^{0.776} \leq [η] \leq 1.65 \times 10^{-4} \times Mw^{0.776} \quad \text{(Eq-7).}$$

2. The film as claimed in claim 1, wherein on one surface of the layer comprising the ethylene-based resin (R) or the resin composition (R') is laminated an ethylene-based resin (P1) that is different from the ethylene-based resin (R) or the resin composition (R').

3. The film as claimed in claim 2, wherein on the other surface of said layer is laminated an ethylene-based resin (P2) that is different from the ethylene-based resin (R) or the resin composition (R') ((P1) and (P2) may be the same or different).

4. The film as claimed in claim 1, claim 2 or claim 3, which is a film for a sealant.

5. The film as claimed in claim 1, claim 2 or claim 3, which is a surface protective film.

6. The film as claimed in claim 1, claim 2 or claim 3, wherein the layer comprising the ethylene-based resin (R) or the resin composition (R') is an adhesive layer for a surface protective film.

7. The film as claimed in claim 1, claim 2 or claim 3, which is a thick film for heavy-duty packaging or agriculture having a thickness of not less than 60 μm.

8. A laminate obtained by laminating a layer selected from a paper in the form of a sheet, an engineering plastic layer and an aluminum layer on one surface of a layer comprising an ethylene-based resin (R) or an ethylene-based resin composition (R') through an anchor coating agent, or further laminating a layer of an ethylene-based resin (P3) that is different from the ethylene-based resin (R) or the resin composition (R') on the other surface, wherein, the ethylene-based resin (R) is a copolymer of ethylene and an α-olefin of 4 to 10 carbon atoms and satisfies the following requirements (1) to (6) at the same time or an ethylene-based resin composition (R') containing the resin (R);

(1) the melt flow rate (MFR) at 190° C. under a load of 2.16 kg is in the range of 0.1 to 50 g/10 min, (2) the density (d) is in the range of 875 to 970 kg/m$^3$, (3) the ratio [MT/η*(g/P)] of a melt tension [MT(g)] at 190° C. to a shear viscosity [η*(P)] at 200° C. and an angular velocity of 1.0 rad/sec is in the range of 1.00× $10^{-4}$ to 9.00×$10^{-4}$, (4) the sum [(M+E)(/1000C)] of the number of methyl branches [M(/1000C)] and the number of ethyl branches [E(/1000C)] as measured by $^{13}$C-NMR, each number being based on 1000 carbon atoms, is not more than 1.8, (5) the zero shear viscosity [$η_0$(P)] at 200° C. and the weight-average molecular weight (Mw) as measured by a GPC-viscosity detector method (GPC-VISCO) satisfy the following relational formula (Eq-1):

$$0.01 \times 10^{-13} \times Mw^{3.4} \leq η_0 \leq 4.5 \times 10^{-13} \times Mw^{3.4} \quad \text{(Eq-1), and}$$

(6) the intrinsic viscosity ([η] (dl/g)) as measured in decalin at 135° C. and the weight-average molecular weight Mw as measured by the GPC-viscosity detector method (GPC-VISCO) of the ethylene-based resin (R) satisfy the following relational formula (Eq-7):

$$0.80 \times 10^{-4} \times Mw^{0.776} \leq [η] \leq 1.65 \times 10^{-4} \times Mw^{0.776} \quad \text{(Eq-7).}$$

9. A laminate obtained by laminating a layer selected from a paper in the form of a sheet, an engineering plastic layer and an aluminum layer on one surface of a layer of an ethylene-based resin (P3) that is different from an ethylene-based resin (R) or an ethylene-based resin composition (R') containing the resin (R) through an anchor coating agent and laminating a layer comprising the ethylene-based resin (R) or the resin composition (R') on the other surface, wherein, the ethylene-based resin (R) is a copolymer of ethylene and an α-olefin of 4 to 10 carbon atoms and satisfies the following requirements (1) to (6) at the same time or an ethylene-based resin composition (R') containing the resin (R);

(1) the melt flow rate (MFR) at 190° C. under a load of 2.16 kg is in the range of 0.1 to 50 g/10 min, (2) the density (d) is in the range of 875 to 970 kg/m$^3$, (3) the ratio [MT/η*(g/P)] of a melt tension [MT(g)] at 190° C. to a shear viscosity [η*(P)] at 200° C. and an angular velocity of 1.0rad/sec is in the range of 1.00× $10^{-4}$ to 9.00×$10^{-4}$, (4) the sum [(M+E)(/1000C)] of the number of methyl branches [M(/1000C)] and the number of ethyl branches [E(/1000C)] as measured by $^{13}$C-NMR, each number being based on 1000 carbon atoms, is not more than 1.8, (5) the zero shear viscosity [$η_0$(P)] at 200° C. and the weight-average molecular weight (Mw) as measured by a GPC-viscosity detector method (GPC-VISCO) satisfy the following relational formula (Eq-1):

$$0.01 \times 10^{-13} \times Mw^{3.4} \leq η_0 \leq 4.5 \times 10^{-13} \times Mw^{3.4} \quad \text{(Eq-1), and}$$

(6) the intrinsic viscosity ([η] (dl/g)) as measured in decalin at 135° C. and the weight-average molecular weight Mw as measured by the GPC-viscosity detector method (GPC-VISCO) of the ethylene-based resin (R) satisfy the following relational formula (Eq-7):

$$0.80 \times 10^{-4} \times Mw^{0.776} \leq [η] \leq 1.65 \times 10^{-4} \times Mw^{0.776} \quad \text{(Eq-7).}$$

10. The laminate as claimed in claim 8 or 9, which is a liquid packaging material or a viscous substance packaging material.

11. The laminate as claimed in claim 8 or 9, which is a laminated paper.

12. The laminate as claimed in claim 8 or 9, which is an adhesive tape.

* * * * *